US012784091B2

(12) United States Patent
Cameron et al.

(10) Patent No.: US 12,784,091 B2
(45) Date of Patent: Nov. 3, 2026

(54) SYSTEMS AND METHODS FOR RECOMMENDING A FOOD PRODUCT BASED ON CHARACTERISTICS OF AN ANIMAL

(71) Applicant: Mars, Incorporated, McLean, VA (US)

(72) Inventors: Gordon Craig Cameron, Nashville, TN (US); Richard Fulton Butterwick, Leicestershire (GB); Amanda Davies, Nottingham (GB); Sally Perea, Mason, OH (US)

(73) Assignee: Mars, Incorporated, McLean, VA (US)

( * ) Notice: Subject to any disclaimer, the term of this patent is extended or adjusted under 35 U.S.C. 154(b) by 52 days.

(21) Appl. No.: 18/858,819

(22) PCT Filed: Apr. 19, 2023

(86) PCT No.: PCT/US2023/019106
§ 371 (c)(1),
(2) Date: Oct. 22, 2024

(87) PCT Pub. No.: WO2023/211736
PCT Pub. Date: Nov. 2, 2023

(65) Prior Publication Data

US 2025/0285162 A1 Sep. 11, 2025

Related U.S. Application Data

(60) Provisional application No. 63/363,551, filed on Apr. 25, 2022.

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0633* (2013.01); *G06Q 30/0643* (2013.01)

(58) Field of Classification Search
CPC .................................................. G06Q 30/0631
See application file for complete search history.

(56) References Cited

U.S. PATENT DOCUMENTS

2020/0250733 A1 8/2020 Hullverson et al.
2021/0035289 A1* 2/2021 Zedayko ................ G16H 30/20
(Continued)

FOREIGN PATENT DOCUMENTS

WO 2021207370 A1 10/2021

OTHER PUBLICATIONS

Qasim, Muhammad, et al. "Innovations in Pet Nutrition: Formulation, Palatability, and Health Outcomes." (Year: 2025).*
(Continued)

*Primary Examiner* — Kathleen Palavecino
(74) *Attorney, Agent, or Firm* — Bookoff McAndrews, PLLC

(57) ABSTRACT

A computer-implemented method for providing one or more personalized pet product recommendations based on a microbiome result and pet metadata to a user is disclosed. The method includes receiving, by one or more processors, the pet metadata and a pet fecal sample from the user, analyzing, by the one or more processors, the pet fecal sample to determine a microbiome result, processing, by the one or more processors, the pet metadata based on the microbiome result to determine one or more pet product recommendations, and displaying, by the one or more processors, the one or more pet product recommendations to the user.

20 Claims, 101 Drawing Sheets

(56) References Cited

U.S. PATENT DOCUMENTS

| | | | | |
|---|---|---|---|---|
| 2022/0177946 | A1* | 6/2022 | Ikeda | A61K 35/744 |
| 2022/0394999 | A1* | 12/2022 | Jackson | A23K 20/147 |

OTHER PUBLICATIONS

International Search Report issued in International Application No. PCT/US2023/019106 dated Jun. 14, 2023 (11 pages).

* cited by examiner

FIG. 1C
BEFORE WE DIVE IN...
THIS APP IS DESIGNED TO HELP YOU MONITOR THE WELLBEING OF YOUR PET. IT IS NOT A DIAGNOSTIC TOOL AND DOES NOT REPLACE REGULAR CONSULTATIONS WITH YOUR VET.
IF YOU ARE AT ALL CONCERNED ABOUT YOUR DOG'S HEALTH YOU SHOULD SEEK ADVICE FROM A QUALIFIED VET.
BY CHECKING "OK, LET'S GO!" BELOW, YOU ARE CONFIRMING THAT YOU ARE OVER 16 AND AGREEING TO THE TERMS AND CONDITIONS.
OK, LET'S GO!
YOUR DATA IS COLLECTED AND PROCESSED IN ACCORDANCE WITH OUR PRIVACY STATEMENT

FIG. 1D
< BACK
HEALTHY GUT,
HEALTHY BODY
A HEALTHY GUT IS IMPORTANT TO YOUR DOG'S OVERALL HEALTH. BUT THEY CAN'T TELL YOU WHAT THEY NEED. WHAT IS GOING ON IN THERE?
NEXT

FIG. 1X
TESSIE
TRACKER
INCLUDE POOP PHOTOS
DO YOU WANT TO INCLUDE THE PHOTOS OF THE POOPS YOU HAVE TRACKED?
THIS MAY BE HELPFUL IF SHARING THESE RESULTS WITH YOUR DOG'S VET OR OTHER HEALTH PROFESSIONAL.
INCLUDE POOP PHOTOS
CANCEL
NEXT
THIS IS A CUSTOM NOTE ADDED UNDER A POOP RECORD.
TESTS
TRACKER
CAPTURE
SUMMARY
PETS

FIG. 2D
HOME / KNOW YOUR PET
KNOW YOUR PET
WE UNDERSTAND YOUR PETS ARE A BIG PART OF YOUR FAMILY. WE ARE HERE FOR YOU EVERY STEP OF THE WAY WHEN IT COMES TO YOUR PET'S HEALTH. OUR VAST LIBRARY IS CONSISTENTLY UPDATED WITH HELPFUL ARTICLES, CASE STUDIES AND INFORMATION ON PET MEDICATION RELEVANT TO YOU AND YOUR PET.
SEARCH
FILTERS
FEATURED ARTICLES

*FIG. 5B*
GUT INTELLIGENCE REPORT
DISCOVER TESSIE'S MICROBIOME
SAMPLE DATE:
SAMPLE ID: HO0776.044
YOUR RESULTS ARE IN!
THE MICROBIOME IS AMAZINGLY COMPLEX, BUT TEST RESULTS DON'T HAVE TO BE.
WE HAVE TAILORED YOUR REPORT TO MAKE IT SIMPLE TO UNDERSTAND, INCLIDING RECOMMENDATIONS OF WAYS TO SUPPORT
CLOSE

THE BACTERIA INVOLVED IN HEALTHY WEIGHT AND EXERCISE ARE OUT OF RANGE SO TESSIE MAY NEED SOME SUPPORT IN THESE AREAS.

WHAT THIS MEANS

- WHILST TESSIE IS LIKELY TO BE BENEFITTING FROM THE GOOD THINGS THAT SOME OF THE DIFFERENT BUGS CAN DO FOR HER, SHE MAY NEED SOME HELP TO BALANCE HER MICROBIOME
- AS TESSIE IS A SENIOR AND THE DIVERSITY OF A DOG'S GUT MICROBIOME TENDS TO DECLINE AS A DOG AGES, TESSIE WILL LIKELY NEED SOME HELP TO KEEP IT ON TRACK.

WHY THIS IS IMPORTANT

- THE GUT MICROBIOME IMPACTS MANY AREAS OF HEALTH, INCLUDING DIGESTIVE HEALTH, IMMUNITY, ASPECTS OF HEALTHY LIFESTYLE AND ON-BOARD VITAMIN SUPPLY.
- AS SEVERAL JOBS IN THE GUT ARE SHARED BY DIFFERENT BUGS, IF NUMBERS OF CERTAIN BUGS ARE LOW, OTHER BUGS CAN

CLOSE

FIG. 5D

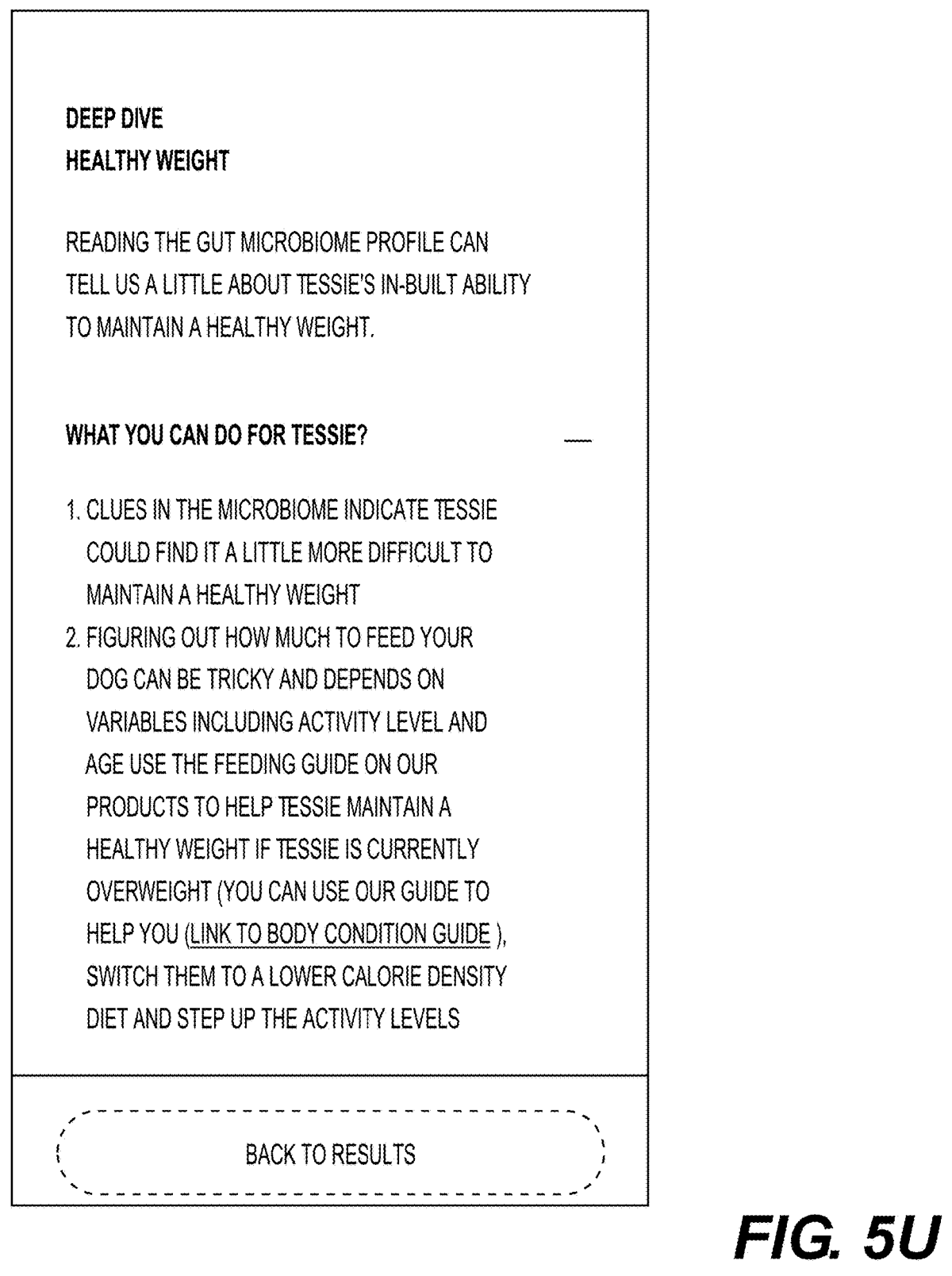

DEEP DIVE

HEALTHY WEIGHT

READING THE GUT MICROBIOME PROFILE CAN TELL US A LITTLE ABOUT TESSIE'S IN-BUILT ABILITY TO MAINTAIN A HEALTHY WEIGHT.

WHAT YOU CAN DO FOR TESSIE? —

1. CLUES IN THE MICROBIOME INDICATE TESSIE COULD FIND IT A LITTLE MORE DIFFICULT TO MAINTAIN A HEALTHY WEIGHT
2. FIGURING OUT HOW MUCH TO FEED YOUR DOG CAN BE TRICKY AND DEPENDS ON VARIABLES INCLUDING ACTIVITY LEVEL AND AGE USE THE FEEDING GUIDE ON OUR PRODUCTS TO HELP TESSIE MAINTAIN A HEALTHY WEIGHT IF TESSIE IS CURRENTLY OVERWEIGHT (YOU CAN USE OUR GUIDE TO HELP YOU (LINK TO BODY CONDITION GUIDE ), SWITCH THEM TO A LOWER CALORIE DENSITY DIET AND STEP UP THE ACTIVITY LEVELS

BACK TO RESULTS

FIG. 5U

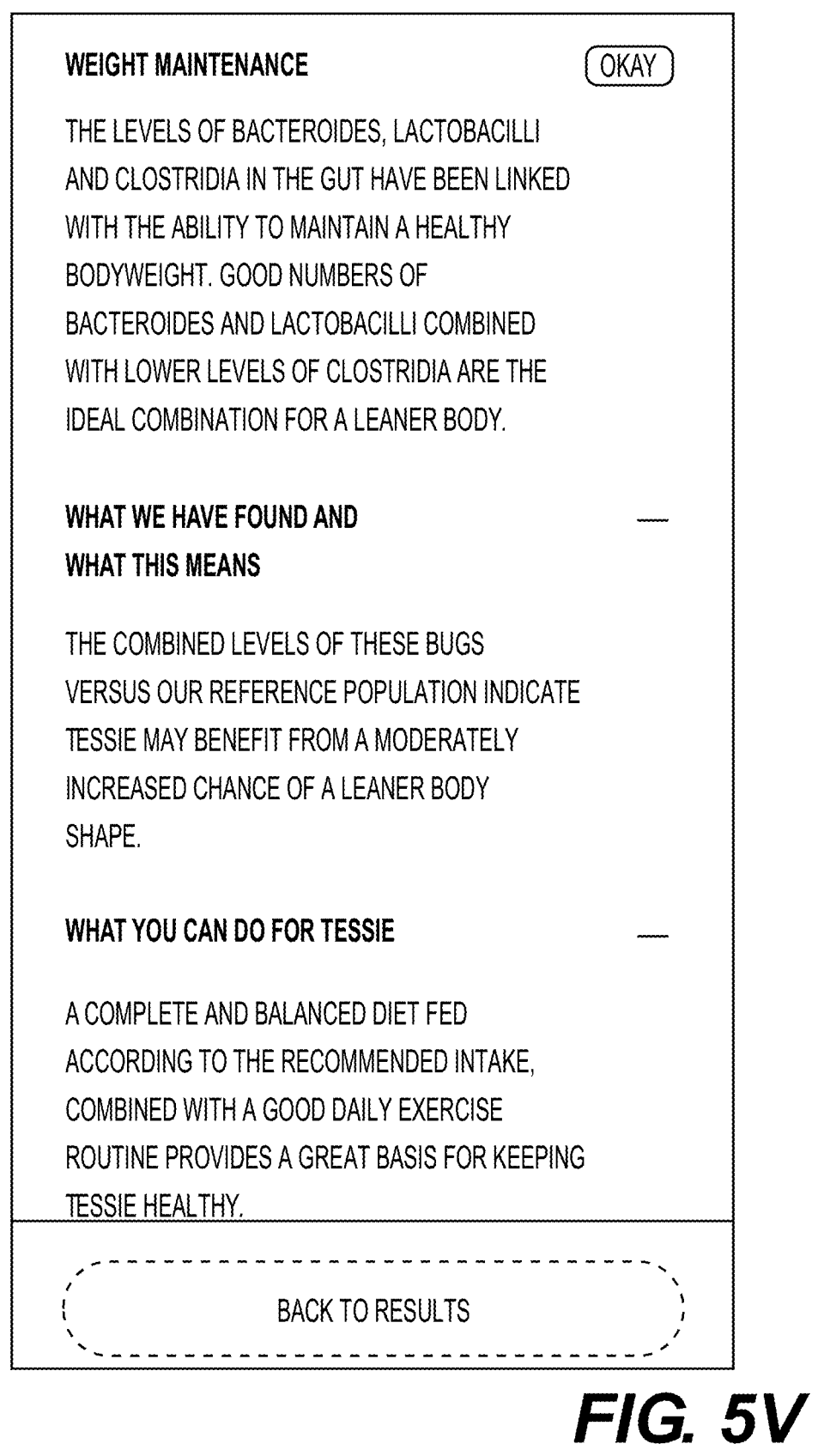

WEIGHT MAINTENANCE OKAY

THE LEVELS OF BACTEROIDES, LACTOBACILLI AND CLOSTRIDIA IN THE GUT HAVE BEEN LINKED WITH THE ABILITY TO MAINTAIN A HEALTHY BODYWEIGHT. GOOD NUMBERS OF BACTEROIDES AND LACTOBACILLI COMBINED WITH LOWER LEVELS OF CLOSTRIDIA ARE THE IDEAL COMBINATION FOR A LEANER BODY.

WHAT WE HAVE FOUND AND WHAT THIS MEANS —

THE COMBINED LEVELS OF THESE BUGS VERSUS OUR REFERENCE POPULATION INDICATE TESSIE MAY BENEFIT FROM A MODERATELY INCREASED CHANCE OF A LEANER BODY SHAPE.

WHAT YOU CAN DO FOR TESSIE —

A COMPLETE AND BALANCED DIET FED ACCORDING TO THE RECOMMENDED INTAKE, COMBINED WITH A GOOD DAILY EXERCISE ROUTINE PROVIDES A GREAT BASIS FOR KEEPING TESSIE HEALTHY.

BACK TO RESULTS

FIG. 5V

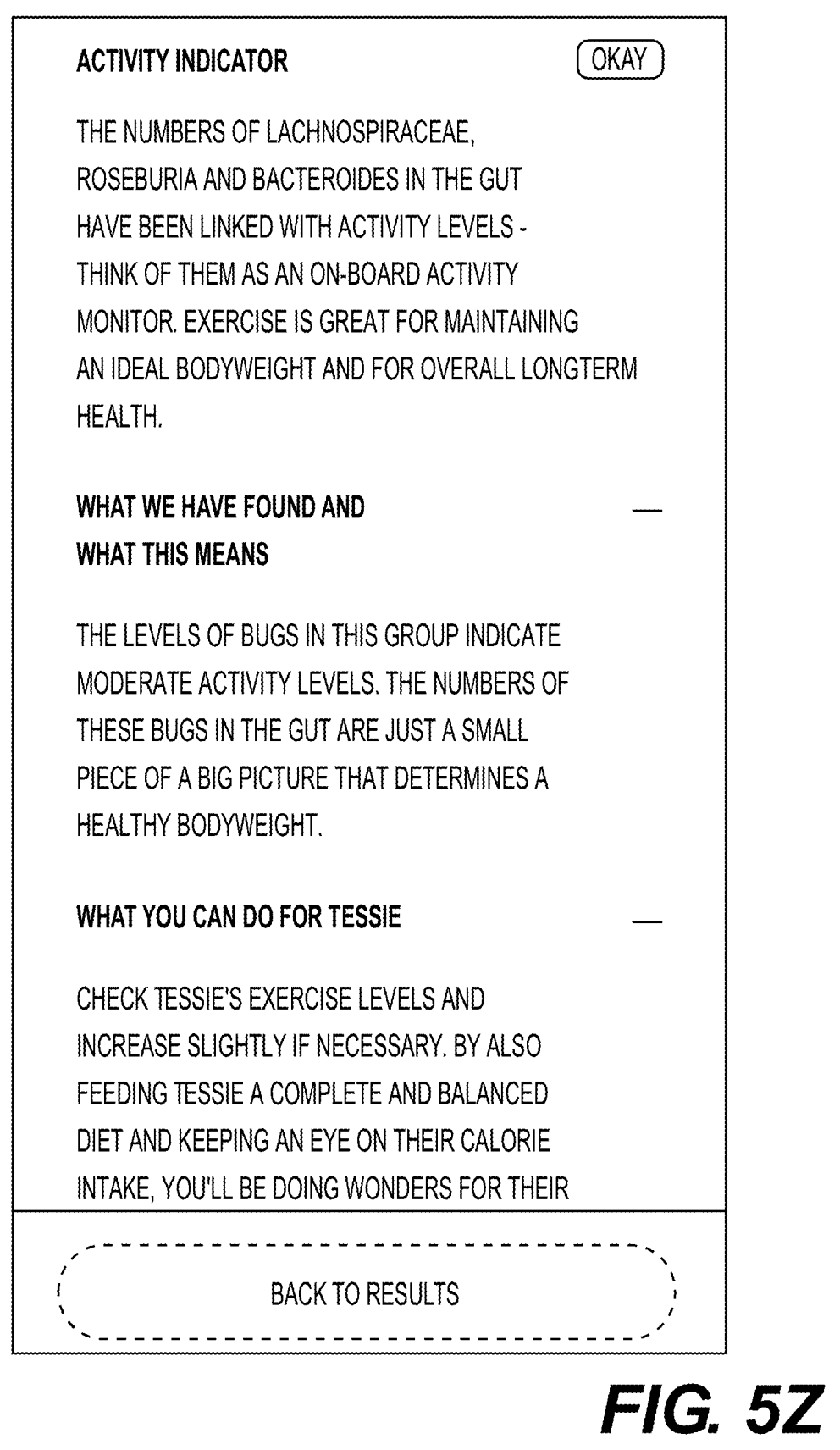

ACTIVITY INDICATOR OKAY

THE NUMBERS OF LACHNOSPIRACEAE, ROSEBURIA AND BACTEROIDES IN THE GUT HAVE BEEN LINKED WITH ACTIVITY LEVELS - THINK OF THEM AS AN ON-BOARD ACTIVITY MONITOR. EXERCISE IS GREAT FOR MAINTAINING AN IDEAL BODYWEIGHT AND FOR OVERALL LONGTERM HEALTH.

WHAT WE HAVE FOUND AND WHAT THIS MEANS

THE LEVELS OF BUGS IN THIS GROUP INDICATE MODERATE ACTIVITY LEVELS. THE NUMBERS OF THESE BUGS IN THE GUT ARE JUST A SMALL PIECE OF A BIG PICTURE THAT DETERMINES A HEALTHY BODYWEIGHT.

WHAT YOU CAN DO FOR TESSIE

CHECK TESSIE'S EXERCISE LEVELS AND INCREASE SLIGHTLY IF NECESSARY. BY ALSO FEEDING TESSIE A COMPLETE AND BALANCED DIET AND KEEPING AN EYE ON THEIR CALORIE INTAKE, YOU'LL BE DOING WONDERS FOR THEIR

BACK TO RESULTS

FIG. 5Z

MOBILITY

DOES TESSIE REQUIRE A HELPING HAND?

GOOD

SOME OF THE BUGS IN THE MICROBIOME GIVE US CLUES ON TESSIE'S JOINT MOBILITY AND HELP YOU UNDERSTAND WHETHER THEY NEED A HELPING HAND.

WHAT YOU CAN DO FOR TESSIE? —

TESSIE'S MICROBIOME SUGGESTS HIS JOINT MOBILITY IS NOT CURRENTLY IN NEED OF SUPPORT. KEEP AN EYE ON THIS AS IT IS LIKELY TO CHANGE AS TESSIE GETS OLDER. SIGNS OF MOBILITY PROBLEMS INCLUDE STIFFNESS WHEN GETTING UP, SLOWING DOWN ON WALKS OR STRUGGLING TO STAND OR SIT

VIEW DETAILS

CLOSE

FIG. 5BB

DEEP DIVE

VITAMIN PRODUCTION

FEEDING A COMPLETE AND BALANCED DIET IS NO DOUBT THE BEST WAY TO ENSURE TESSIE GETS ALL THE VITAMINS THEY NEED IN THE RIGHT AMOUNTS. GUT BACTERIA HAVE A PART TO PLAY IN TESSIE'S VITAMIN SUPPLY TOO, HELPING THEM STAY HEALTHY AND ACTIVE. THIS SECTION GIVES INSIGHTS INTO TESSIE'S ONBOARD BACTERIAL PRODUCTION OF B VITAMINS AND VITAMIN K AND OFFERS TIPS ON HOW TO BOOST THEIR SUPPLIES IF NEEDED.

WHAT YOU CAN DO FOR TESSIE? —

TESSIE HAS GREAT LEVELS OF VITAMIN PRODUCING BACTERIA VITAMINS ARE NEEDED TO HELP TESSIE STAY HEALTHY AND ACTIVE ENSURING TESSIE RECEIVES A NUTRITIONALLY COMPLETE AND BALANCED DIET WILL HELP KEEP HIS VITAMIN LEVELS SPOT ON AT ALL TIMES

BACK TO RESULTS

*FIG. 5HH*

TAPP INTO WHAT YOUR DOG
CAN'T TELL YOU.

WE LOVE OUR DOGS SO MUCH THAT WE KNOW AT THESE LITTLE QUIRKS, BUT WHILE WE KNOW THEM ON THE OUTSIDE, IT'S NOT ALWAYS EASY TO KNOW WHAT'S GOING ON INSIDE.

WE CAN'T SEE IT, BUT THERE'S A TINY UNIVERSE OF TRILLIONS OF BACTERIA AND OTHER MICROBES WHICH TOGETHER WITH THEIR GENES ARE CALLED THE MICROBIOME. IT IS AN INCREDIBLE LIVING ECOSYSTEM MADE UP FROM BUGS, OR MICROBES IN THE GUT WHICH HELP OUR DOGS STAY HEALTHY.

THANKS TO SCIENTIFIC RESEARCH LIKE COMPANY PETCARE BIOBANK, SCIENTISTS ARE CONTINUOUSLY DISCOVERING WAYS THE MICROBIOME IMPACTS DOGS' HEALTH. BY PARTICIPATING IN RESEARCH LIKE THIS, YOU NOT ONLY HELP US DELVE DEEPER THAN EVER BEFORE - YOU GET TO DISCOVER MORE ABOUT YOUR DOG'S GUT MICROBIOME AND IT'S POTENTIAL IMPACT ON THEIR HEALTH.

✓ COMPLEMENTARY TO COMPANY PETCARE BIOBARK PARTICIPANTS

FIG. 5JJ
(CONT.)

- ✓ CONVENIENT - USING THE POOP SAMPLE TAKEN AT YOUR BIOBARK APPOINTMENT
- ✓ DETAILED, PERSONALIZED REPORT
- ✓ RECEIVED IN-APP - ALWAYS KNOW WHERE TO FIND IT

KNOW YOUR PET'S MICROBIOME AS WELL AS YOU KNOW THEM

TESTING THE GUT MICROBIOME HELPS YOU UNDERSTAND WHAT'S GOING ON INSIDE YOUR DOG AND TO TAKE POSITIVE STEPS TOWARD IMPROVING YOUR PET'S WELLBEING.

---

WHAT WILL THE TEST COVER?

- AN ASSESSMENT OF THE OVERALL HEALTH OF YOUR DOG'S GUT MICROBIOME, RELATIVE TO OTHER DOGS IN OUR EXTENSIVE DATABASE.
- PERSONALIZED RECOMMENDATIONS OF HOW TO HELP IMPROVE YOUR DOG'S MICROBIOME

FIG. 5JJ (CONT.1)

FIG. 6C
BACK
RECOMMENDED DIETS
A COMPLETE AND BALANCED DIET PROVIDES ALL OF THE NUTRIENTS IN THE RIGHT AMOUNTS. HERE ARE OUR RECOMMEDATIONS ON THE RIGHT DIET FOR TESSIE TAILORED TO HIS NEEDS.
DISPLAYING 3 OF 6 PRODUCTS
BRAND
BRAND NATURAL CHOICE™ HEALTHY WEIGHT ADULT CHICKEN & BROWN RICE RECIPE
MORE DETAILS
GO BACK TO RESULTS

SYSTEMS AND METHODS FOR RECOMMENDING A FOOD PRODUCT BASED ON CHARACTERISTICS OF AN ANIMAL

CROSS-REFERENCE TO RELATED APPLICATION(S)

This is a National Stage Application under 35 U.S.C. § 371 of International Application No. PCT/US2023/019106, filed on Apr. 19, 2023, which claims priority to U.S. Patent Application No. 63/363,551, filed on Apr. 25, 2022, the entireties of which are incorporated herein by reference.

TECHNICAL FIELD

Various embodiments of the present disclosure relate generally to providing one or more personalized pet product recommendations based on a microbiome result and pet metadata to a user. In some embodiments, the disclosure relates to systems and methods for using a microbiome result and pet metadata to determine at least one personalized pet product recommendation.

BACKGROUND

Pet product companies typically offer many different pet products (e.g., food, supplements, etc.) for pets (e.g., dogs, cats, birds, etc.). Given these many choices, a pet owner may have difficulty choosing an appropriate pet product for the owner's pet. The owner may choose a particular pet product without any external aid. In this case, the particular pet product may be incorrect, or inadequate, for the pet's needs. In another case, the owner may use a "product finder" application that provides the owner with a particular pet product recommendation based on some general input information, such as the breed of the pet, the age of the pet, etc. However, the application might select the recommended product based on overly-general characteristics of the pet, and might not account for latent, or specific, characteristics of the pet. In this case, the recommended pet product may also be incorrect, or inadequate, for the pet's particularized needs.

The pet's health may not improve, or may even deteriorate in the event that the pet is provided with incorrect, or inadequate, products. Accordingly, there is a need for a platform that can more accurately and holistically determine and recommend a particular pet product based on more particularized characteristics of a specific pet.

The present disclosure is directed to addressing the above-referenced challenges. The background description provided herein is for the purpose of generally presenting the context of the disclosure. Unless otherwise indicated herein, the materials described in the background section are not prior art to the claims in the present application and are not admitted to be prior art, or suggestions of the prior art, by inclusion in the background section.

SUMMARY OF THE DISCLOSURE

According to certain aspects of the disclosure, methods and systems are disclosed for providing one or more personalized pet product recommendations based on a microbiome result and pet metadata to a user.

In one aspect, an exemplary embodiment of a method for providing one or more personalized pet product recommendations based on pet metadata to a user includes receiving, by one or more processors, pet metadata from a user. The method may further include processing, by the one or more processors, the pet metadata to determine one or more pet product recommendations. The method may further include displaying, by the one or more processors, the one or more pet product recommendations to the user.

In a further aspect, an exemplary embodiment of a computer system for providing one or more personalized pet product recommendations based on a microbiome result and pet metadata to a user is disclosed, the computer system comprising at least one memory storing instructions, and at least one processor configured to execute the instructions to perform operations. The operations may include receiving pet metadata and a pet fecal sample from a user, analyzing the pet fecal sample to determine a microbiome result, processing the pet metadata based on the microbiome result to determine one or more pet product recommendations, and displaying the one or more pet product recommendations to the user.

In a further aspect, a non-transitory computer-readable medium containing instructions that, when executed by a processor, cause the processor to perform operations for providing one or more personalized pet product recommendations based on a microbiome result and pet metadata to a user is disclosed. The operations may include receiving pet metadata and a pet fecal sample from a user, analyzing the pet fecal sample to determine a microbiome result, processing the pet metadata based on the microbiome result to determine one or more pet product recommendations, and displaying the one or more pet product recommendations to the user.

In one aspect, an exemplary embodiment of a method for providing one or more personalized pet product recommendations based on a microbiome result and pet metadata to a user includes receiving, by one or more processors, pet metadata and a pet fecal sample from a user. The method may further include analyzing, by the one or more processors, the pet fecal sample to determine a microbiome result. The method may further include processing, by the one or more processors, the pet metadata based on the microbiome result to determine one or more pet product recommendations. The method may further include displaying, by the one or more processors, the one or more pet product recommendations to the user.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of the present specification, illustrate various exemplary embodiments and together with the description, serve to explain the principles of the disclosed embodiments.

DETAILED DESCRIPTION OF EMBODIMENTS

As addressed above, some techniques for selecting a pet product might result in the selection of an incorrect, or inadequate, pet product. As a result, the pet's health may deteriorate, or worsen, based on an inappropriate diet. According to certain aspects of the disclosure, methods and systems are disclosed for providing one or more personalized pet product recommendations based on a microbiome result and pet metadata to a user. By determining a particular recommended pet product based on the microbiome condition of the pet, the embodiments herein provide an improvement in pet product selection technology by more accurately and holistically accounting for latent and particularized characteristics of a pet when determining recommended pet products. Further, and ultimately, the embodiments herein result in the improved health of pets by more accurately determining and recommending pet products in an individualized manner.

As will be discussed in more detail below, in various embodiments, systems and methods are described for providing one or more personalized pet product recommendations based on a microbiome result and pet metadata to a user. By receiving pet metadata and a pet fecal sample from a user, the systems and methods may be able to analyze the pet fecal sample to determine a microbiome result. The systems and methods may then use the microbiome result to process the pet metadata to determine one or more pet product recommendations. The systems and methods may then display the one or more pet product recommendations to the user.

As used herein, a "pet" may refer to any type of animal, such as a dog, a cat, a bird, a fish, etc., that an owner may feed using pet products. However, it should be understood that some embodiments herein are applicable to other types of animals that are less commonly used as "pets," such as cows, sheep, etc. In other words, some embodiments herein are applicable to any types of animals, including domesticated animals.

Exemplary Pet Fecal Sample Analysis Platform

FIGS. 1A-J describe exemplary environments of a platform for analyzing a pet's fecal sample and displaying the result of the analysis, according to one or more embodiments.

Figure 1A:
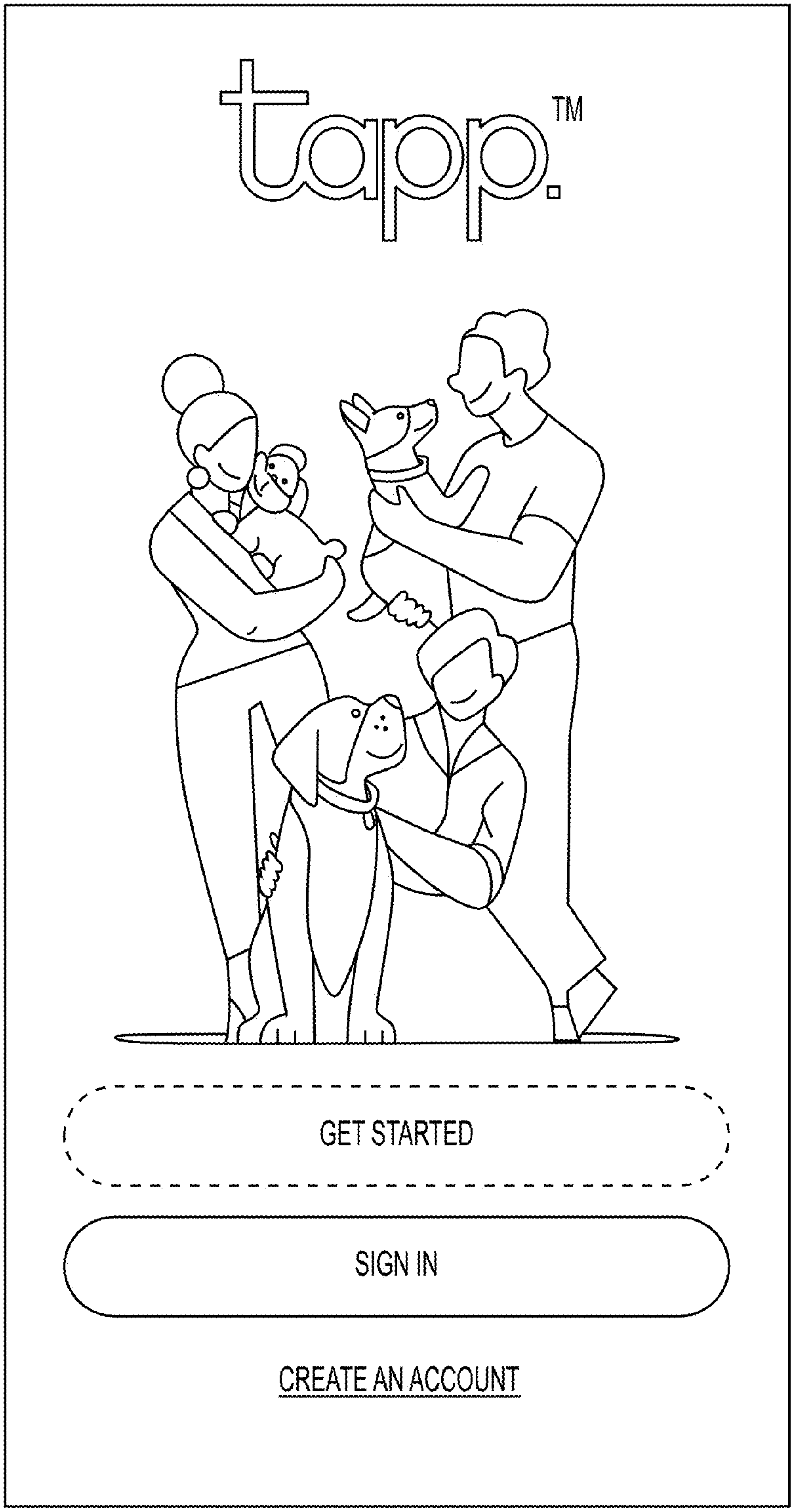
FIGS. 1A-1BB describe exemplary environments of a platform for analyzing a pet's fecal sample and displaying the result of the analysis, according to one or more embodiments.

FIG. 1A illustrates a "tapp" page of an exemplary environment of a platform for gathering, analyzing, and displaying results corresponding to a pet's fecal sample. The platform may display a page allowing for a user to "Get started," "Sign in," or "Create an account."

Figure 1B:
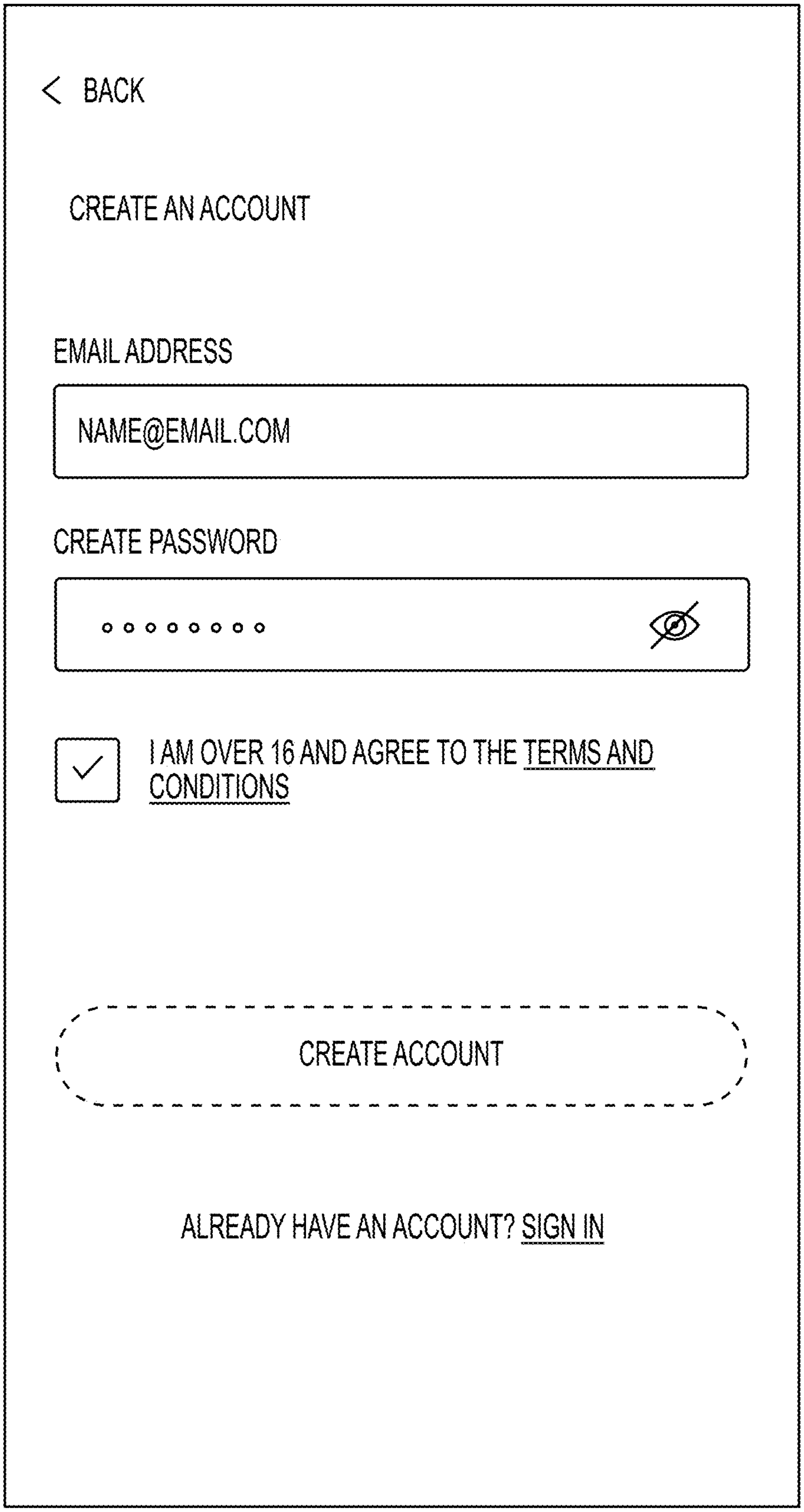

FIG. 1B further illustrates a "Create an account" page of an exemplary environment of a platform for gathering, analyzing, and displaying results corresponding to a pet's fecal sample. The platform may prompt the user to provide an "email address" and "create a password." The platform may also prompt the user to confirm that the user is a particular age (e.g., "over 16"). The platform may also prompt the user to confirm that the user agrees to the "terms and conditions" of the system.

Figure 1C:

FIG. 1C further illustrates a "Before we dive in . . . " page of an exemplary environment of a platform for gathering, analyzing, and displaying results corresponding to a pet's fecal sample. The platform may ask the user to acknowledge and agree to particular terms and conditions (e.g., "This app is designed to help you monitor the wellbeing of your pet. It is not a diagnostic tool and does not replace regular consultations with your vet.") by clicking an "Ok, let's go!" button.

Figure 1D:

FIG. 1D further illustrates a "Healthy gut, healthy body" page of an exemplary environment of a platform for gathering, analyzing, and displaying results corresponding to a pet's fecal sample. The platform may emphasize the importance of a pet's healthy gut (e.g., "A healthy gut is important to your dog's overall health.") The platform may prompt the user to go to the next screen by pressing a "Next" button.

Figure 1E:
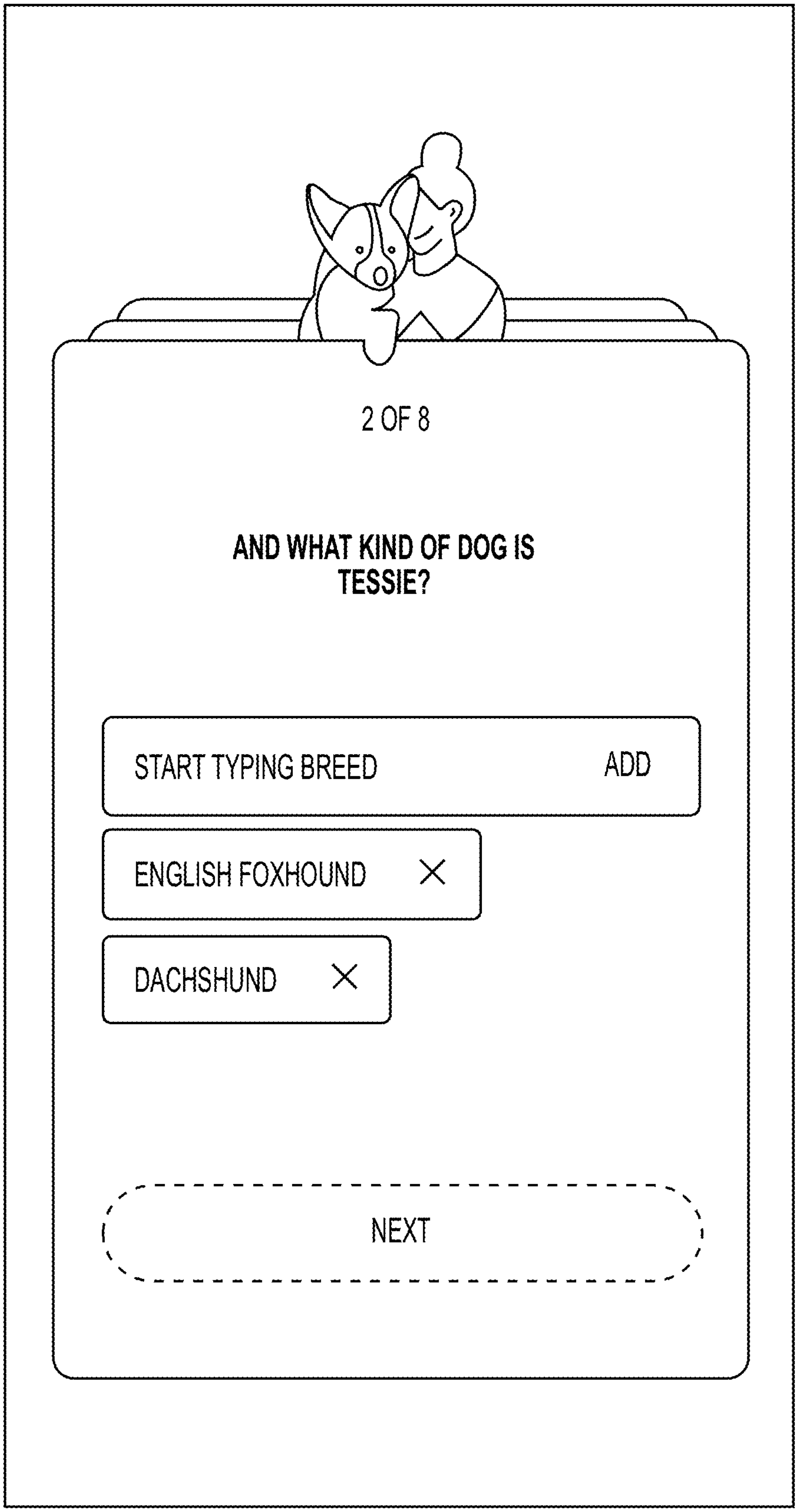

FIG. 1E further illustrates a "Breed" page of an exemplary environment of a platform for gathering, analyzing, and displaying results corresponding to a pet's fecal sample. The platform may prompt the user to enter at least one breed of the pet. In some embodiments, the user may enter more than one breed (e.g., "English Foxhound" and "Dachshund"). The platform may prompt the user to go to the next screen by pressing a "Next" button.

Figure 1F:
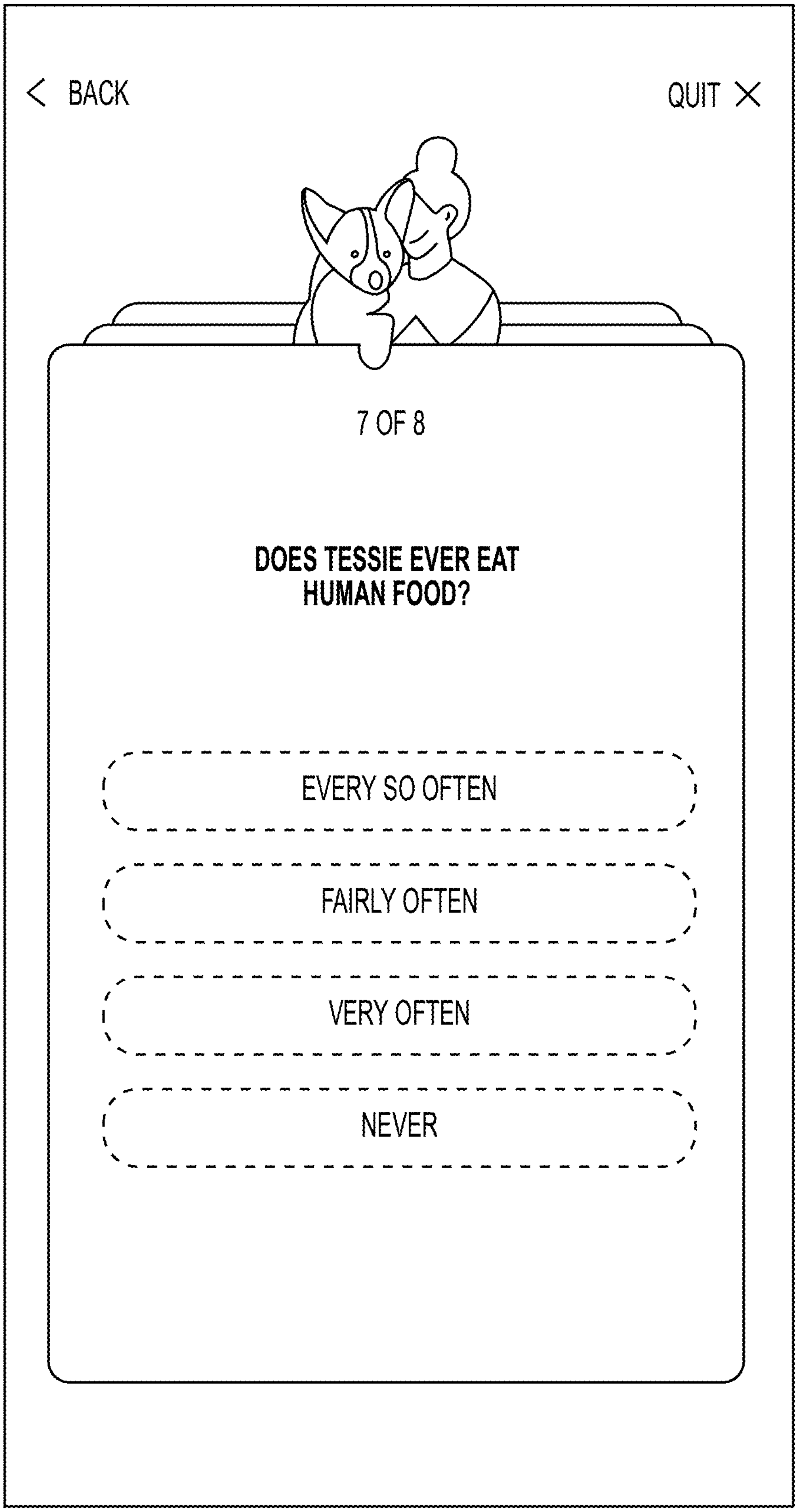

FIG. 1F further illustrates a "Human Food" page of an exemplary environment of a platform for gathering, analyzing, and displaying results corresponding to a pet's fecal sample. The platform may prompt the user to indicate if the pet eats human food, and if so, how frequently (e.g., "Every so often," "Fairly often," "Very often," or "Never").

Figure 1G:
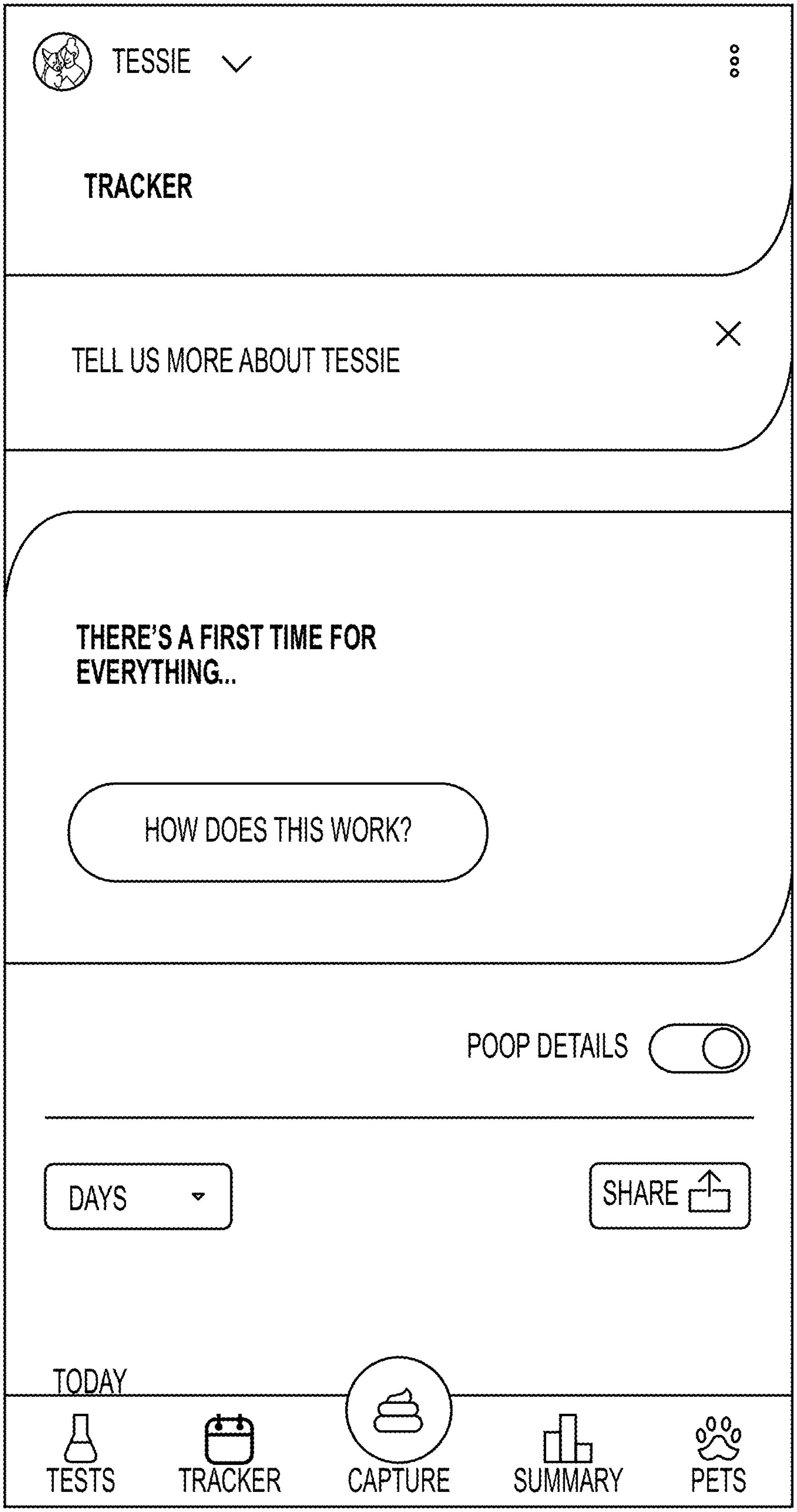

FIG. 1G further illustrates a "Tracker" page of an exemplary environment of a platform for gathering, analyzing, and displaying results corresponding to a pet's fecal sample. The platform may prompt the user to provide additional information about the pet (e.g., "Tessie"). The platform may walk the user through how the platform works via a "How does this work?" button. The platform may provide buttons for test results (e.g., "Tests"), a fecal tracker (e.g., "Tracker"), the ability to capture an image of the fecal sample (e.g., "Capture"), a summary of the fecal results (e.g., "Summary"), and further information about the pet (e.g., "Pets").

Figure 1H:
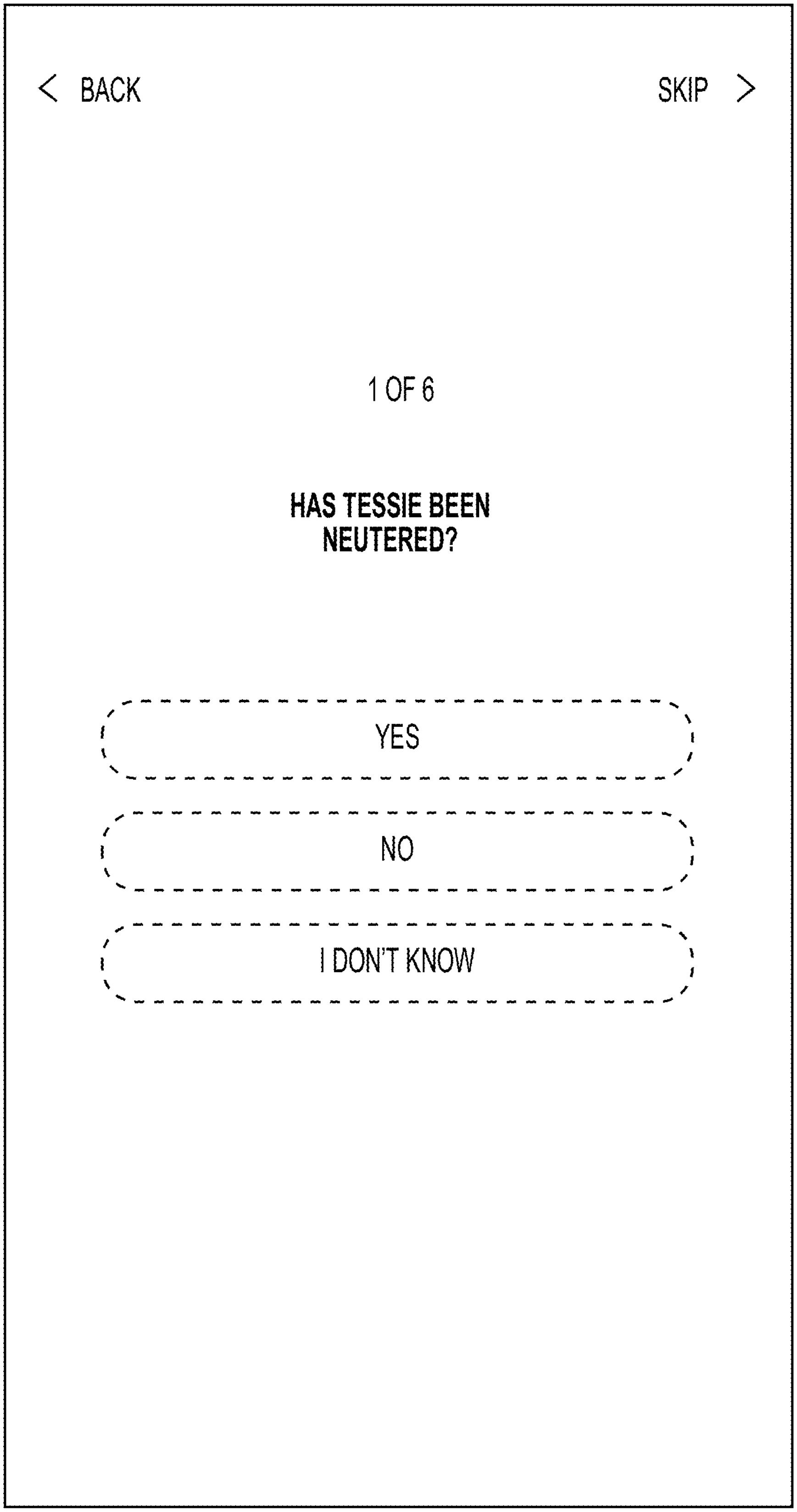

FIG. 1H further illustrates a "Neutered Information" page of an exemplary environment of a platform for gathering, analyzing, and displaying results corresponding to a pet's fecal sample. The platform may prompt the user to select a button corresponding to whether the pet is neutered (e.g., "Yes," "No," or "I don't know"). The platform may provide an option to the user to "Skip" entering such information.

Figure 1I:
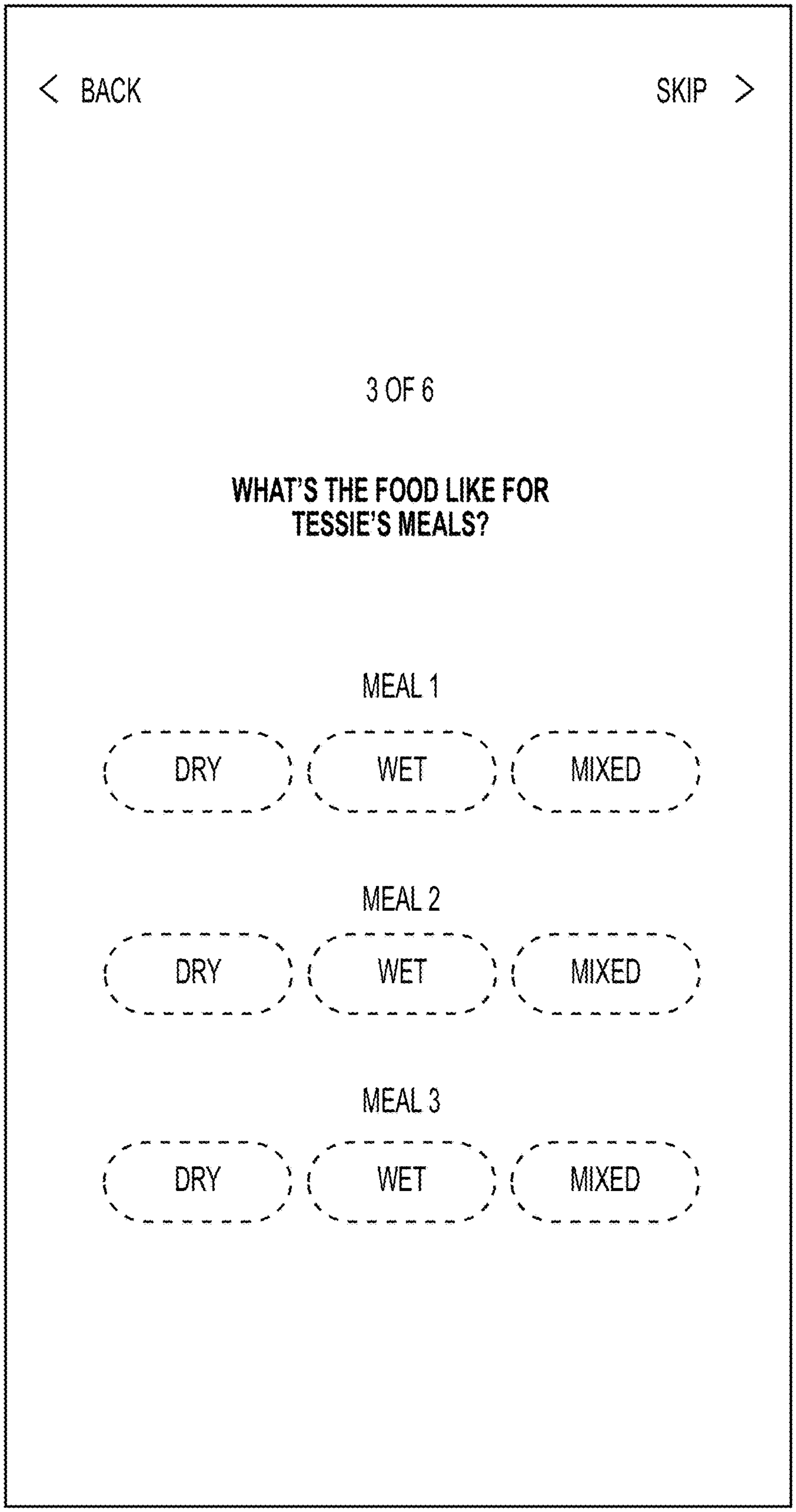

FIG. 1I further illustrates a "Food Type" page of an exemplary environment of a platform for gathering, analyzing, and displaying results corresponding to a pet's fecal sample. The platform may prompt the user to indicate the type of food (e.g., "Dry," "Wet," or "Mixed") that the pet is fed for each meal (e.g., "Meal 1," "Meal 2," or "Meal 3"). The platform may provide an option to the user to "Skip" entering such information.

Figure 1J:
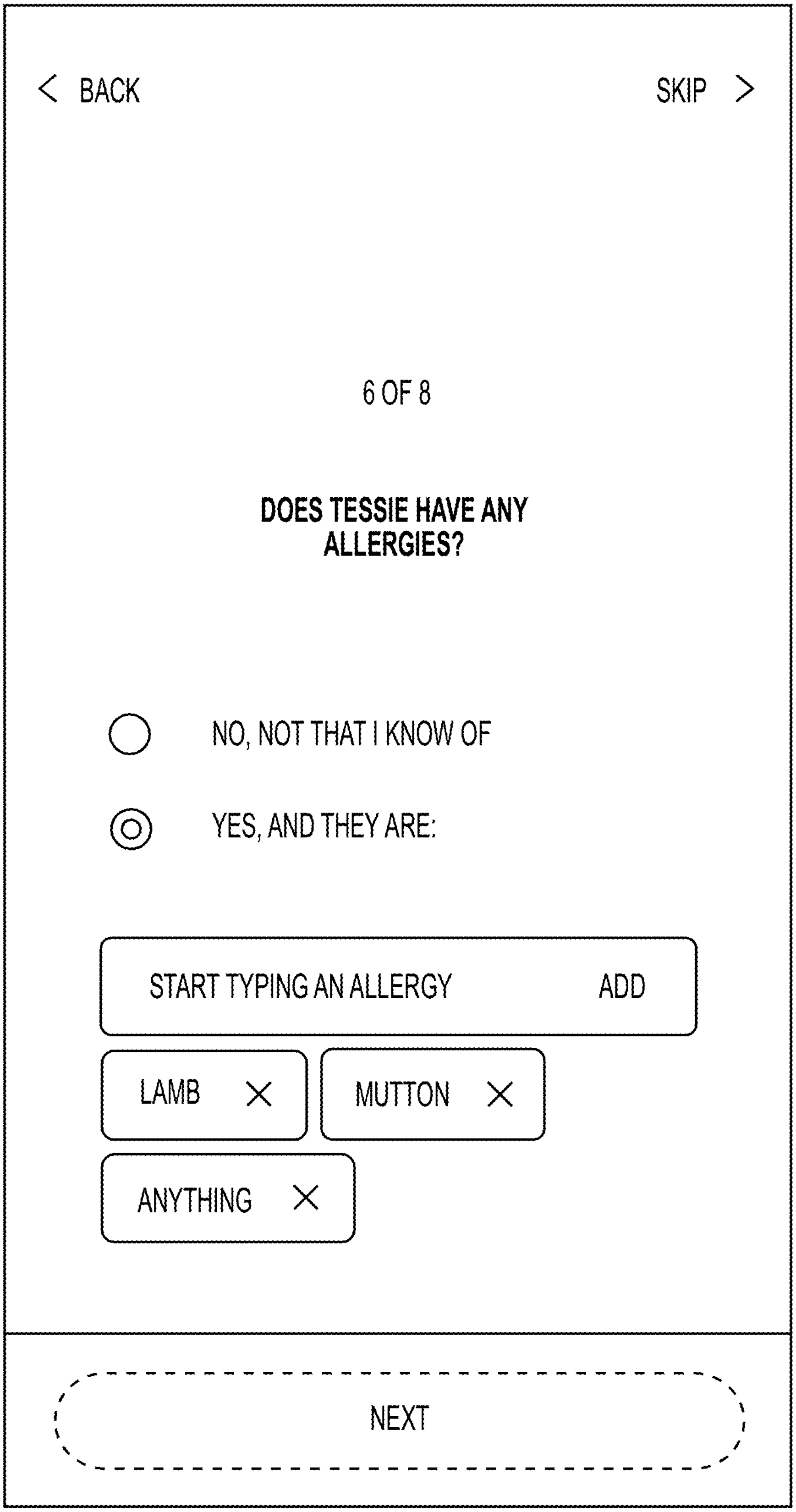

FIG. 1J further illustrates an "Allergies" page of an exemplary environment of a platform for gathering, analyzing, and displaying results corresponding to a pet's fecal sample. The platform may prompt the user to indicate whether the pet has any allergies (e.g., "No, not that I know of" or "Yes, and they are:"). The platform may also allow the user to enter one or more allergies that the pet may have (e.g., "Lamb," "Mutton," "Anything"). The platform may provide an option to the user to "Skip" entering such information.

Figure 1K:
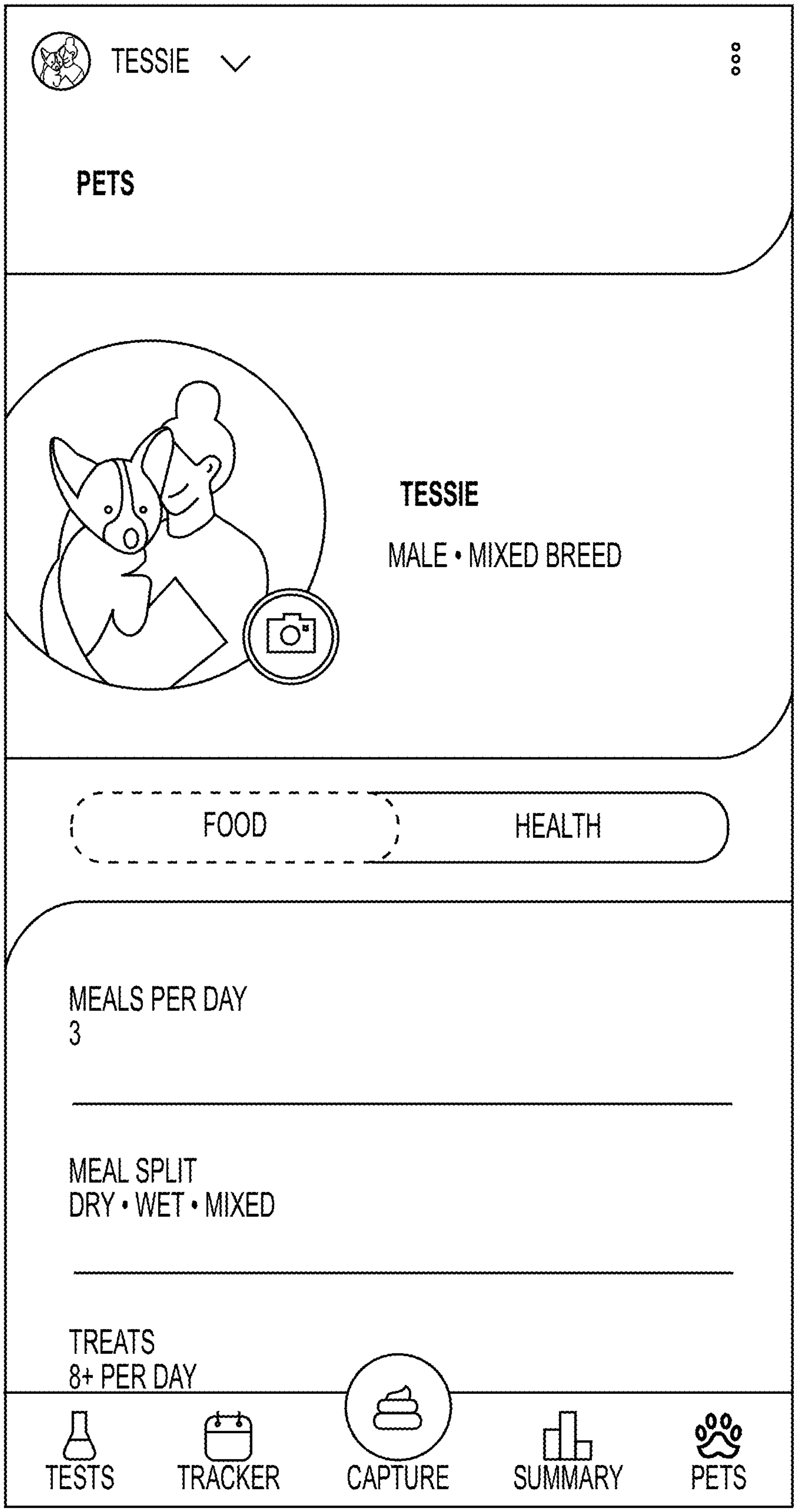
Figure 1L:
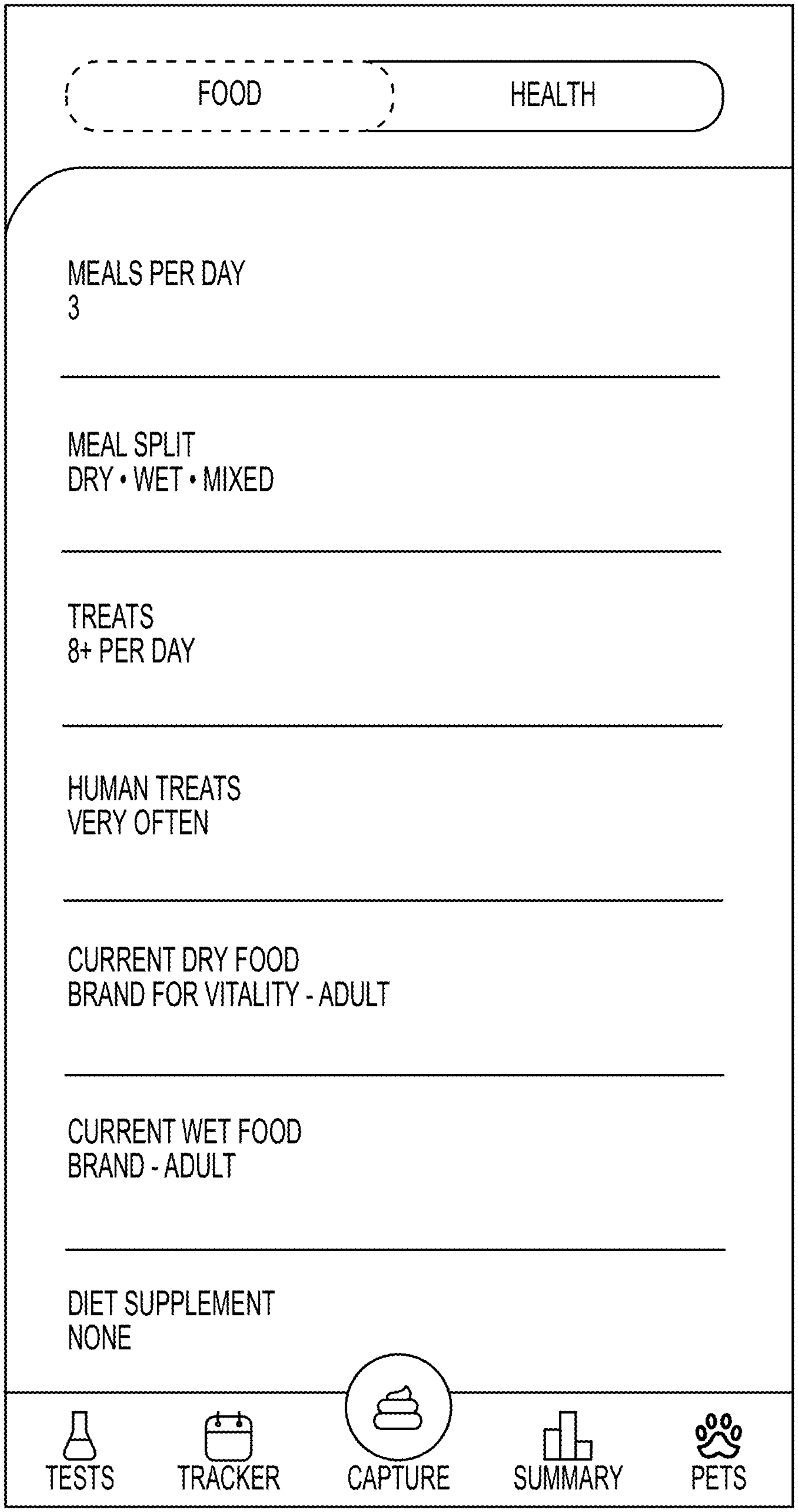
Figure 1M:
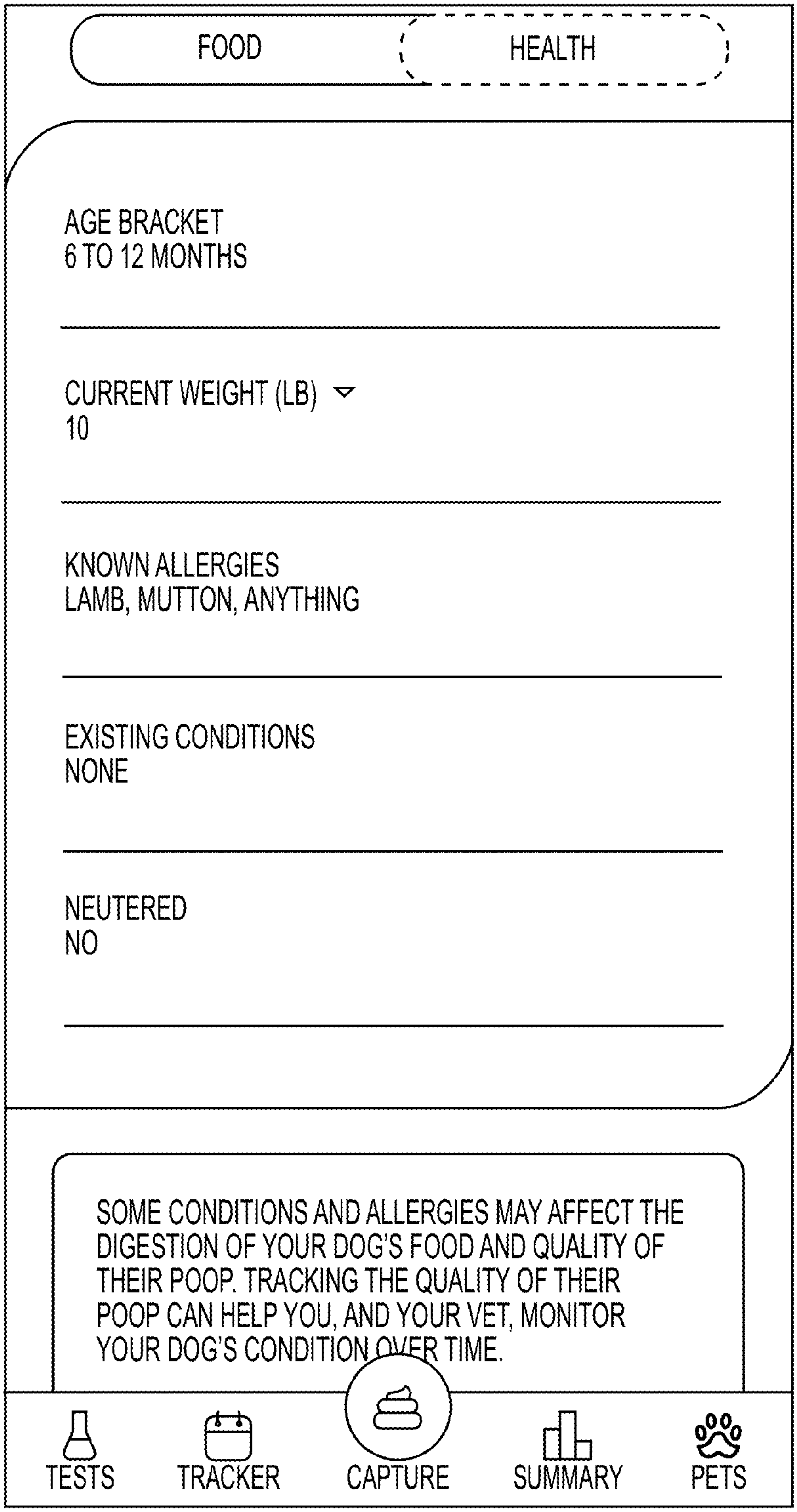

FIGS. 1K-M further illustrate a "Pets" page of an exemplary environment of a platform for gathering, analyzing, and displaying results corresponding to a pet's fecal sample. The platform may display the "Pets" page upon a user selecting the "Pets" button. The platform may display meal information corresponding to a particular pet. For example, the platform may display the pet's name (e.g., "Tessie"), the pet's gender (e.g. "Male"), or the pet's breed (e.g., "Mixed Breed"). The platform may also display the meals per day (e.g., "3"), the type(s) of dog food served for each meal (e.g., "Dry" and "Wet" and "Mixed"), how frequently the pet is given human treats (e.g., "Very often"), the current type of dry food (e.g., "Brand For Vitality—Adult"), the current wet food (e.g., "Brand—Adult"), whether the pet takes a diet supplement (e.g., "None"), the pet's age bracket (e.g., "6 to 12 months"), the pet's current weight (e.g., "10"), any known allergies of the pet (e.g., "Lamb, Mutton, Anything"), any existing conditions of the pet (e.g., "None"), or whether the pet is neutered (e.g., "No").

Figure 1N:
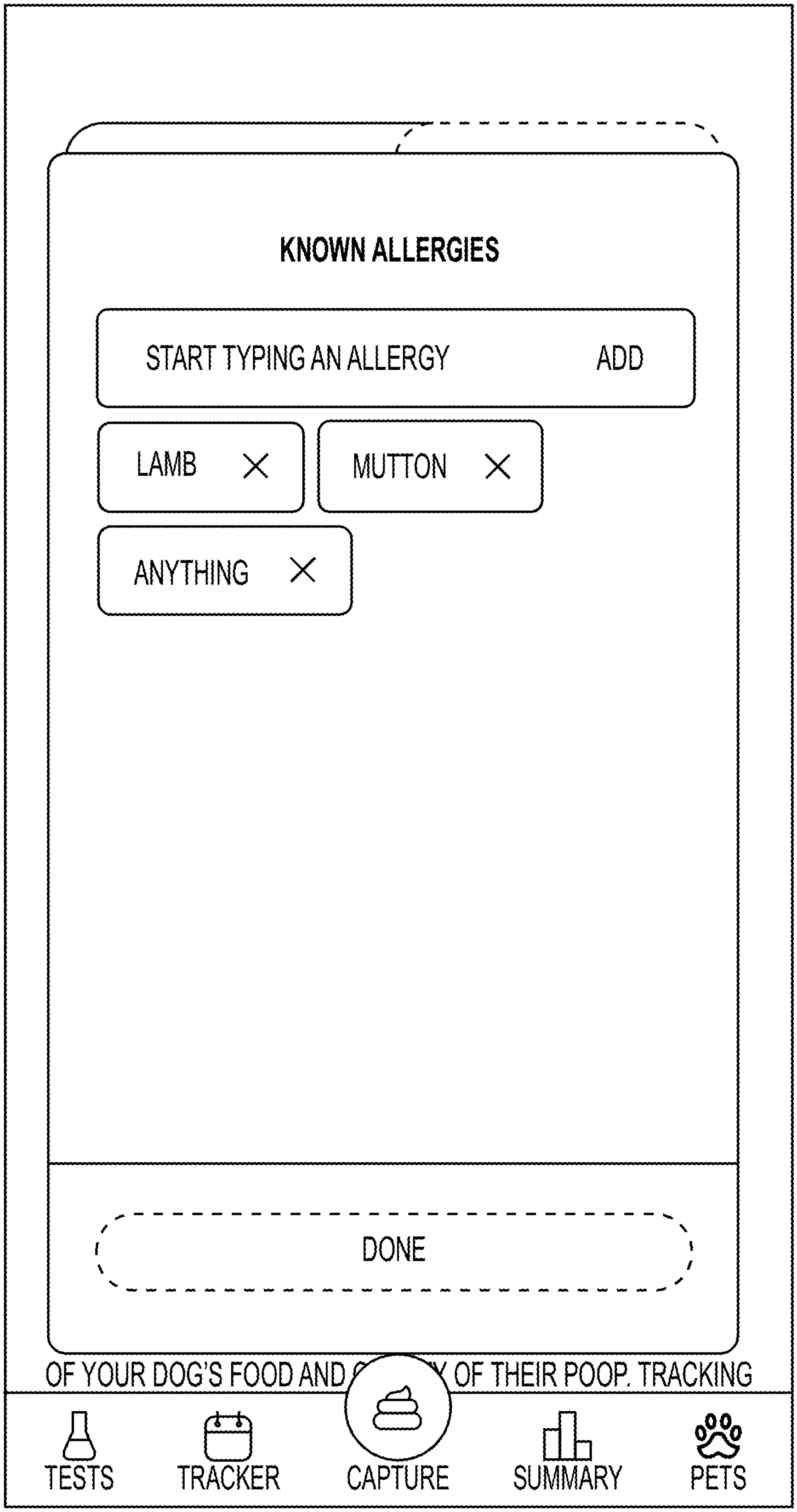

FIG. 1N further illustrates a "Known Allergies" page of an exemplary environment of a platform for gathering, analyzing, and displaying results corresponding to a pet's fecal sample. The platform may provide a user interface to allow the user to enter any allergies that the pet may have (e.g., "Lamb," "Mutton," "Anything").

Figure 1O:
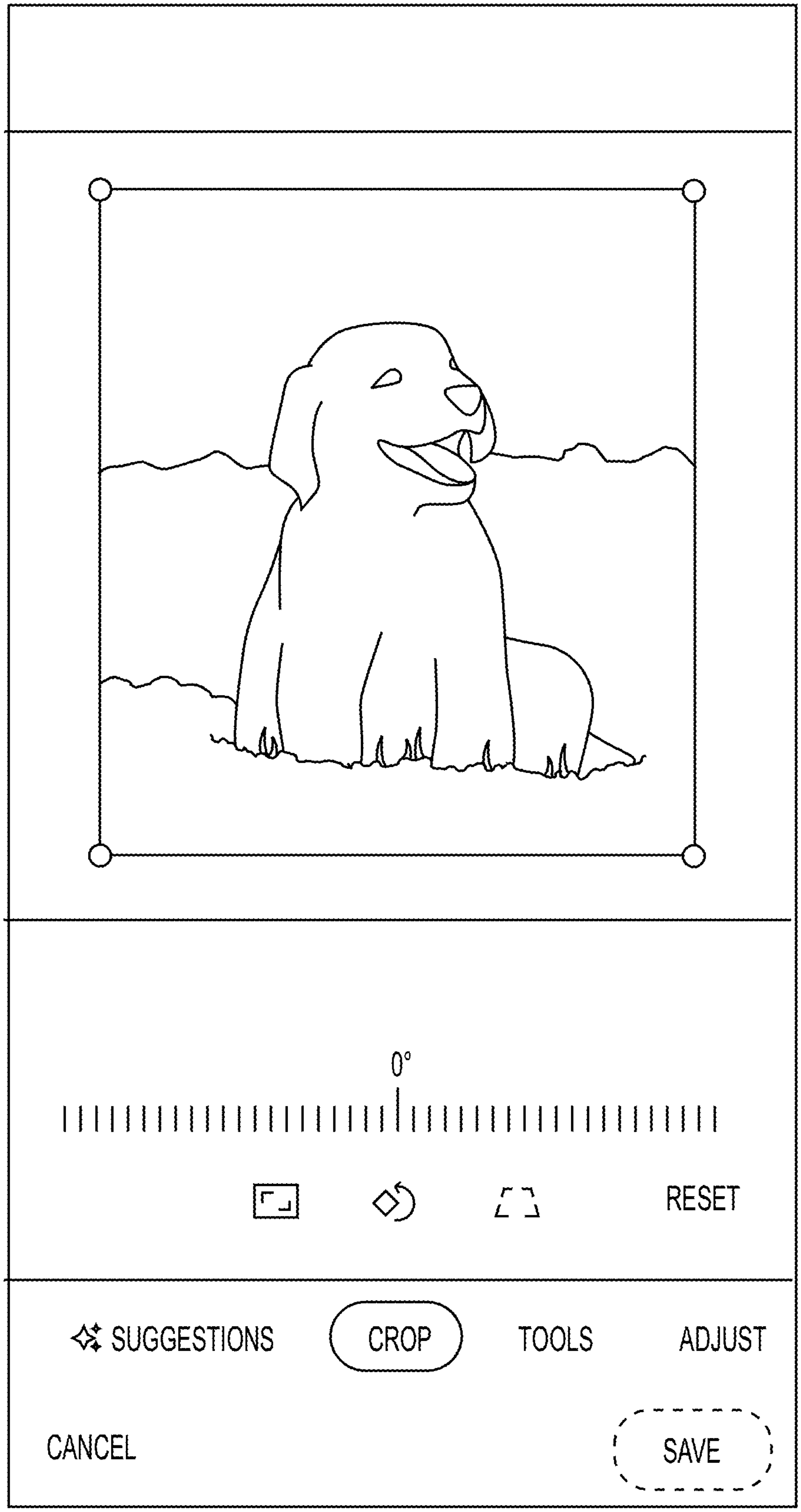

FIG. 1O further illustrates a "Camera Roll" page of an exemplary environment of a platform for gathering, analyzing, and displaying results corresponding to a pet's fecal sample. The platform may allow a user to upload an image of the pet via a camera roll. The image may include a photo that was saved on the user's device. The image may also include a photo that was taken by the user's device. The user may modify the image via the mobile device (e.g., "Crop," "Adjust," etc.).

Figure 1P:
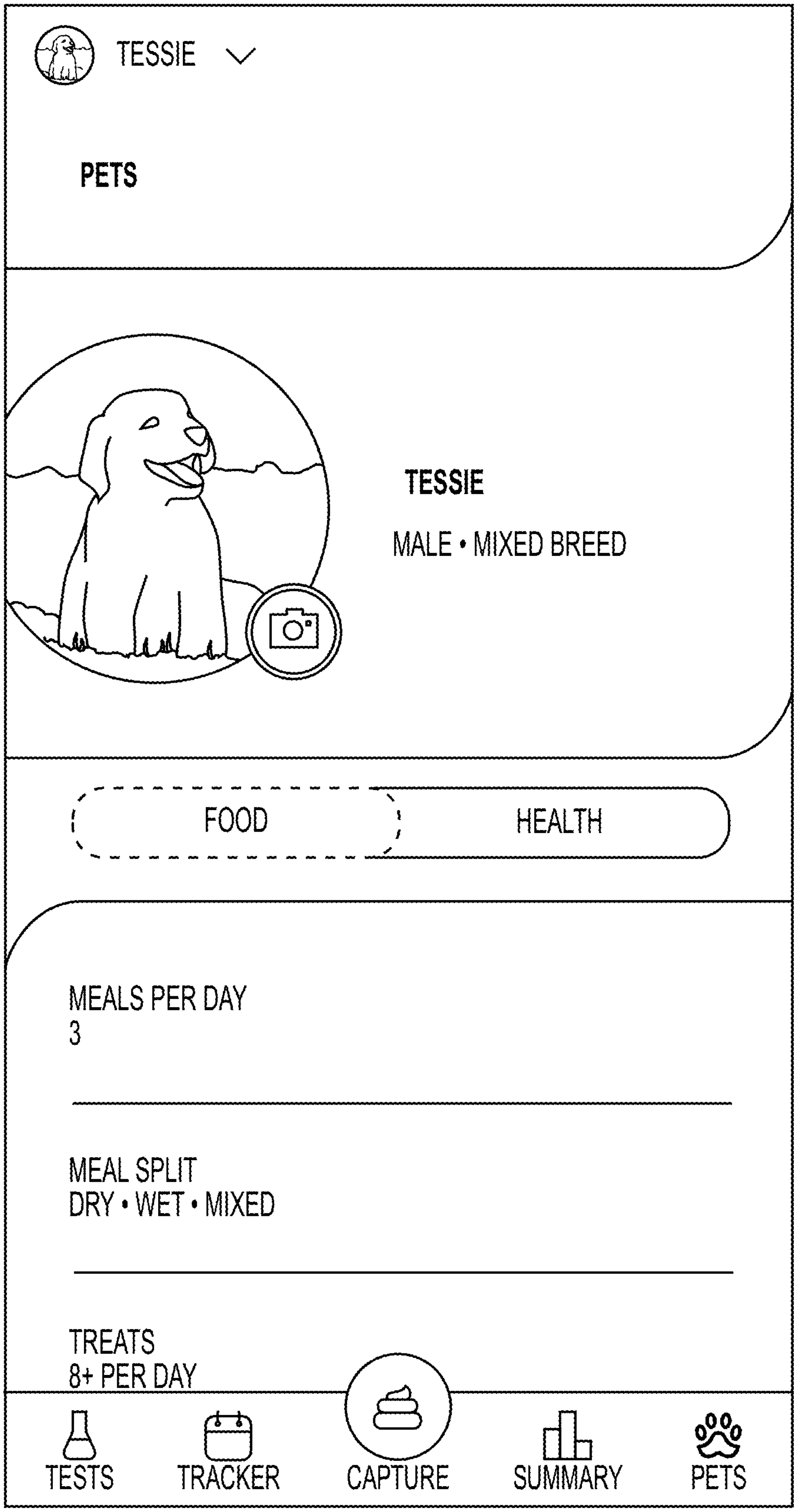

FIG. 1P further illustrates a "Pets" page with the pet's image of an exemplary environment of a platform for gathering, analyzing, and displaying results corresponding to a pet's fecal sample. Upon a user selecting the pet's image (as illustrated in FIG. 1O), the platform may display the image in the "Pets" page.

Figure 1Q:
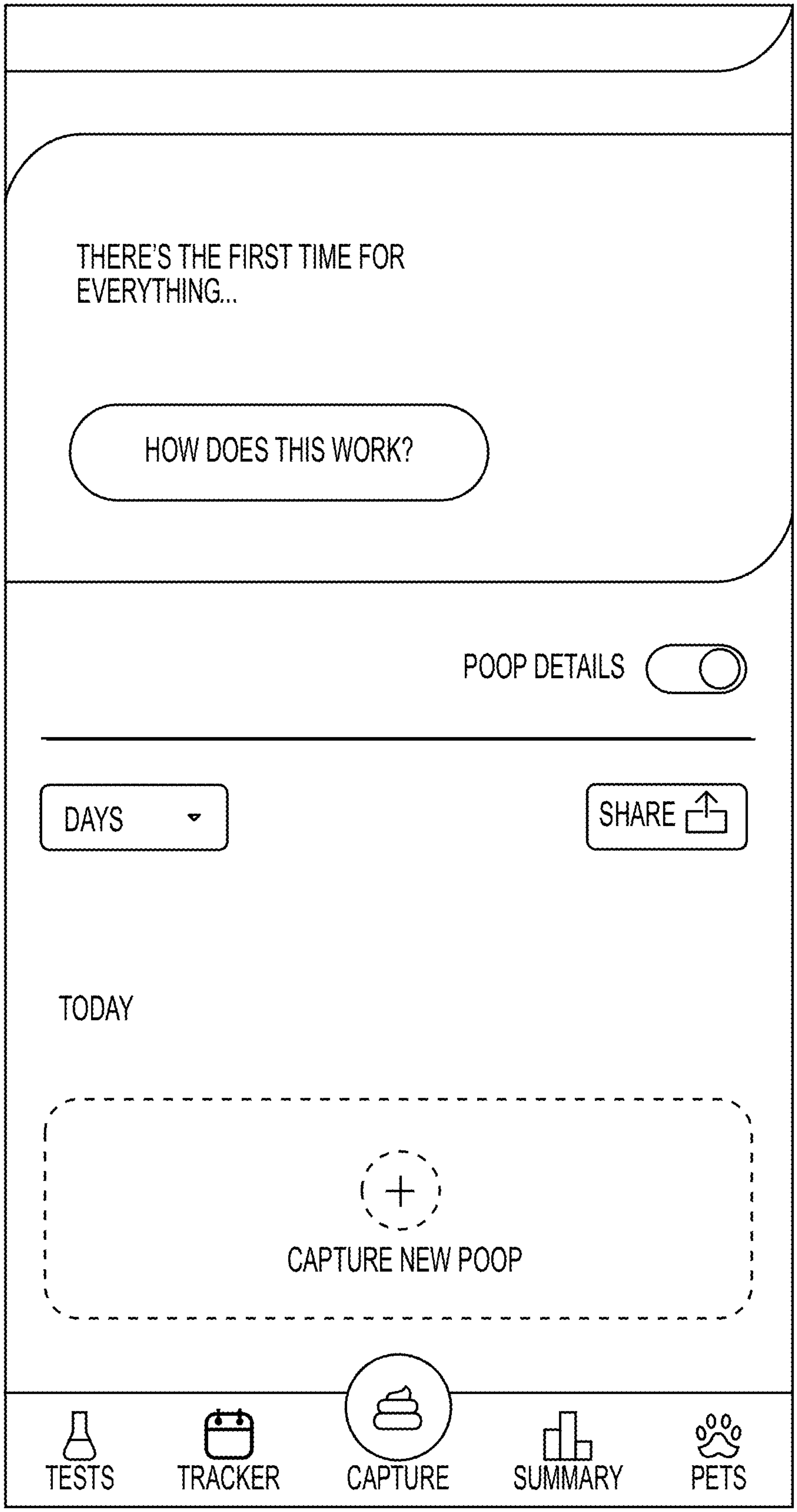

FIG. 1Q further illustrates a "Capture" page of an exemplary environment of a platform for gathering, analyzing, and displaying results corresponding to a pet's fecal sample. The platform may provide the opportunity for the user to capture one or more images of a pet's fecal sample. The user may digitally upload an image of the pet's fecal sample by selecting the "Capture new poop" option. The platform may also provide instructions and guidance to the user when the user selects the "How does this work?" button.

Figure 1R:
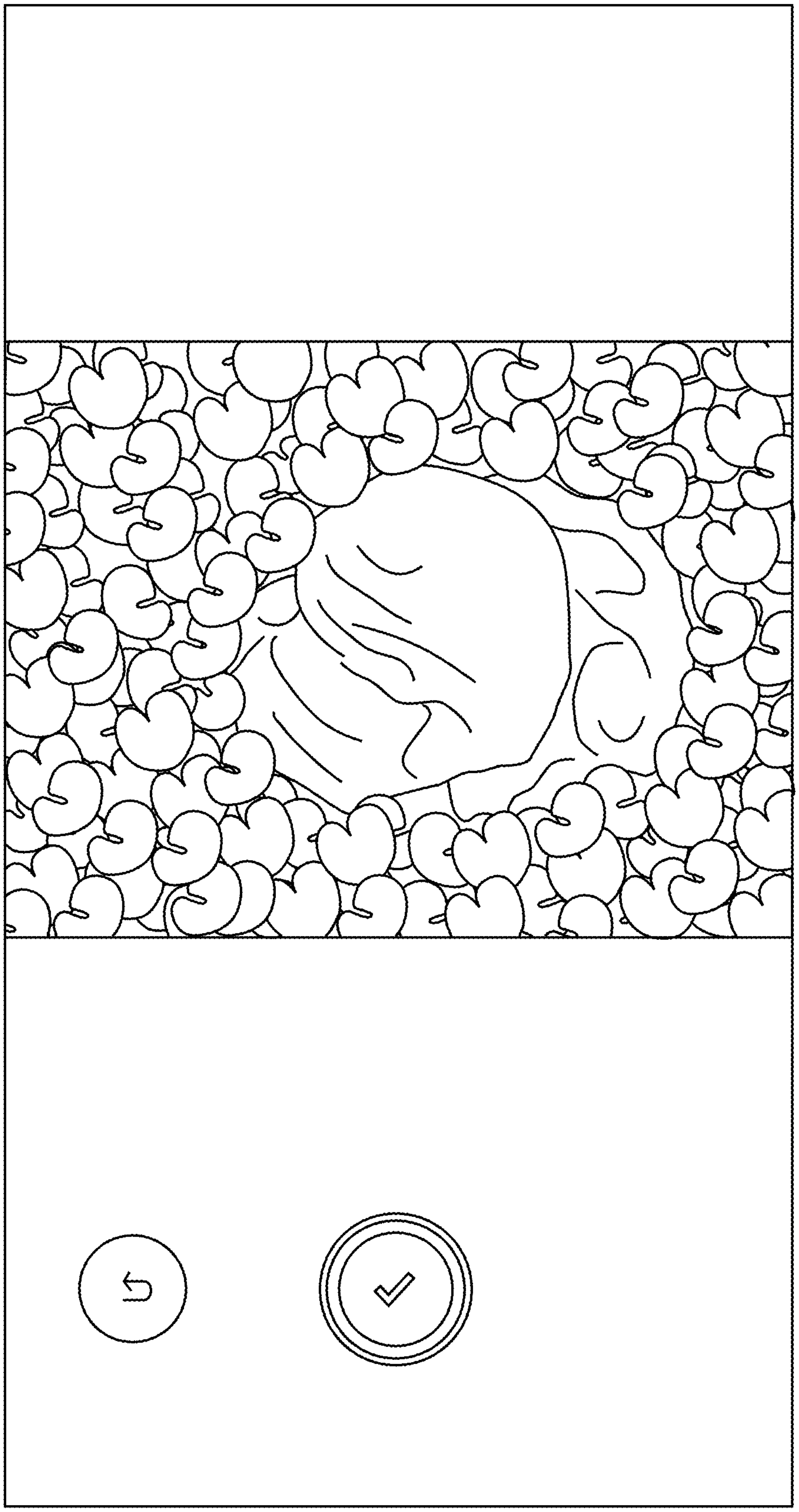

FIG. 1R further illustrates a "Fecal Capture" page of an exemplary environment of a platform for gathering, analyzing, and displaying results corresponding to a pet's fecal sample. The platform may allow a user to upload an image of the fecal sample via a camera roll. The image of the fecal sample may include a photo that was saved on the user's device. The image of the fecal sample may also include a photo that was taken by the user's device.

Figure 1S:
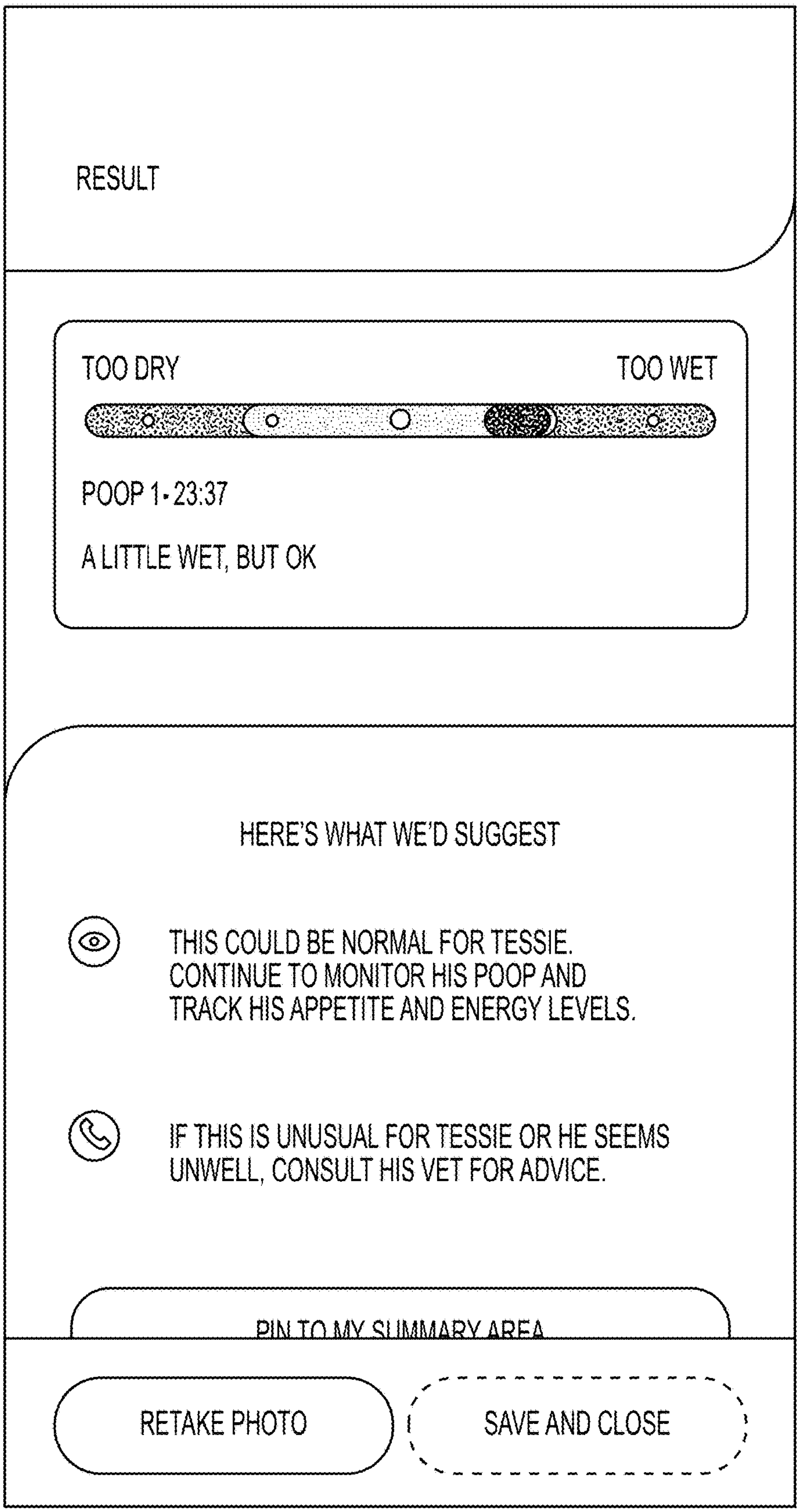

FIG. 1S further illustrates a "Result" page of an exemplary environment of a platform for gathering, analyzing, and displaying results corresponding to a pet's fecal sample. The platform may analyze the image of the fecal sample and display a result indicating where the fecal sample lands on a scale of "Too dry" to "Too wet." The platform may display one or more fecal results, where each fecal result corresponds to the analysis of a fecal sample (e.g., "Poop 1"). The platform may also display a timestamp of the fecal sample (e.g., "Poop 1 23:37") and a corresponding summary of the analysis (e.g., "A little wet, but ok"). The platform may also display future suggestions based on the analysis of the image of the fecal sample (e.g., "This could be normal for Tessie. Continue to monitor his poop and track his appetite and energy levels," and "If this is unusual for Tessie or he seems unwell, consult his vet for advice.").

Figure 1T:
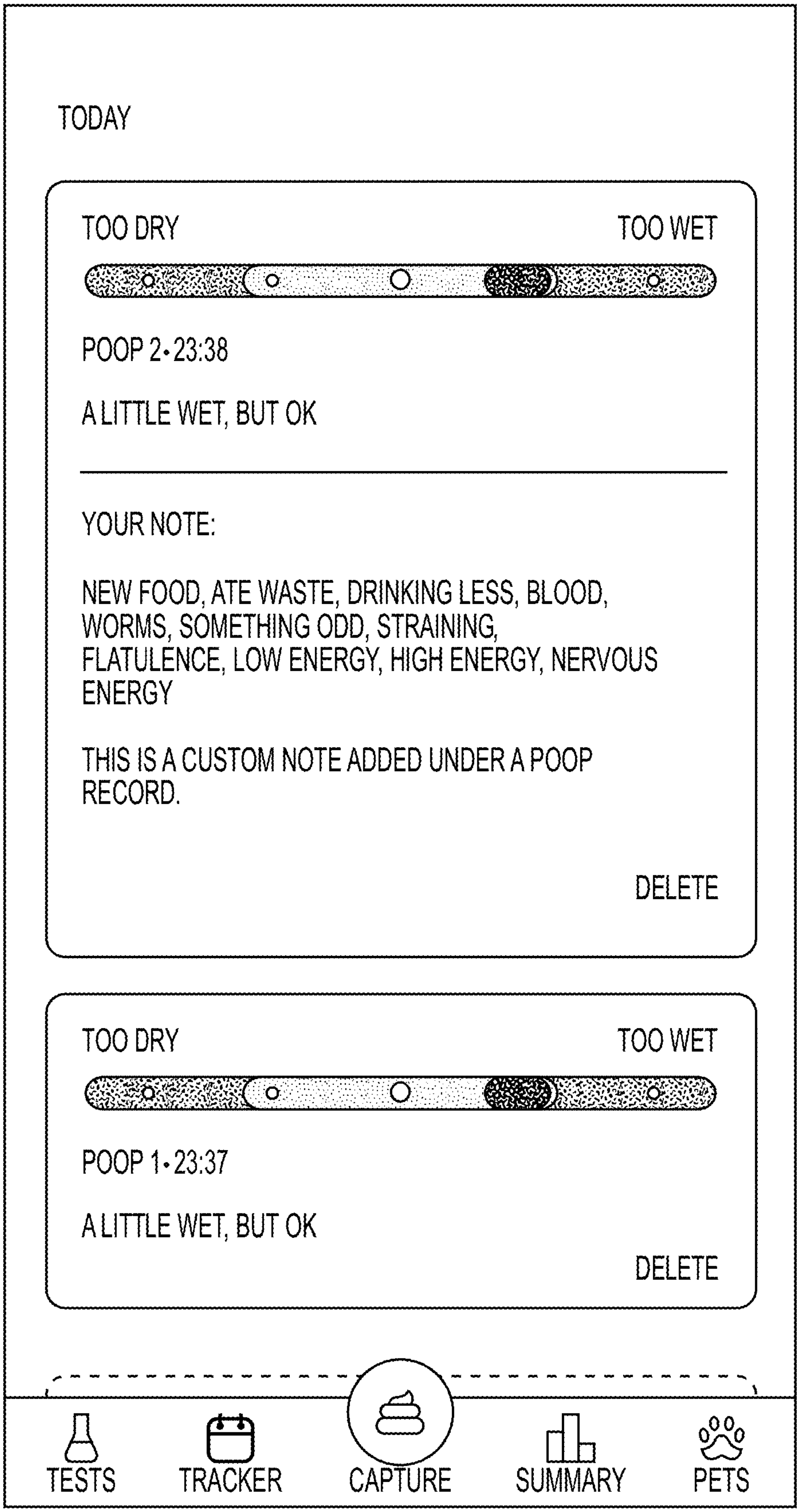

FIG. 1T further illustrates a "Tracker" page of an exemplary environment of a platform for gathering, analyzing, and displaying results corresponding to a pet's fecal sample. The platform may display the page upon a user selecting the "Tracker" option. The platform may display one or more fecal records, where each fecal record corresponds to the analysis of a fecal sample (e.g., "Poop 1" and "Poop 2"). The platform may also display a timestamp of the fecal sample (e.g., "Poop 1 23:37" or "Poop 2 23:38") and a corresponding summary of the analysis (e.g., "A little wet, but ok"). The platform may also display the user's notes corresponding to a particular fecal record (e.g., "New food, Ate waste, Drinking less, Blood, Worms, Something odd, Straining, Flatulence, Low energy, High energy, Nervous energy"). The platform may also provide the option for the user to remove one or more of the fecal records.

Figure 1U:
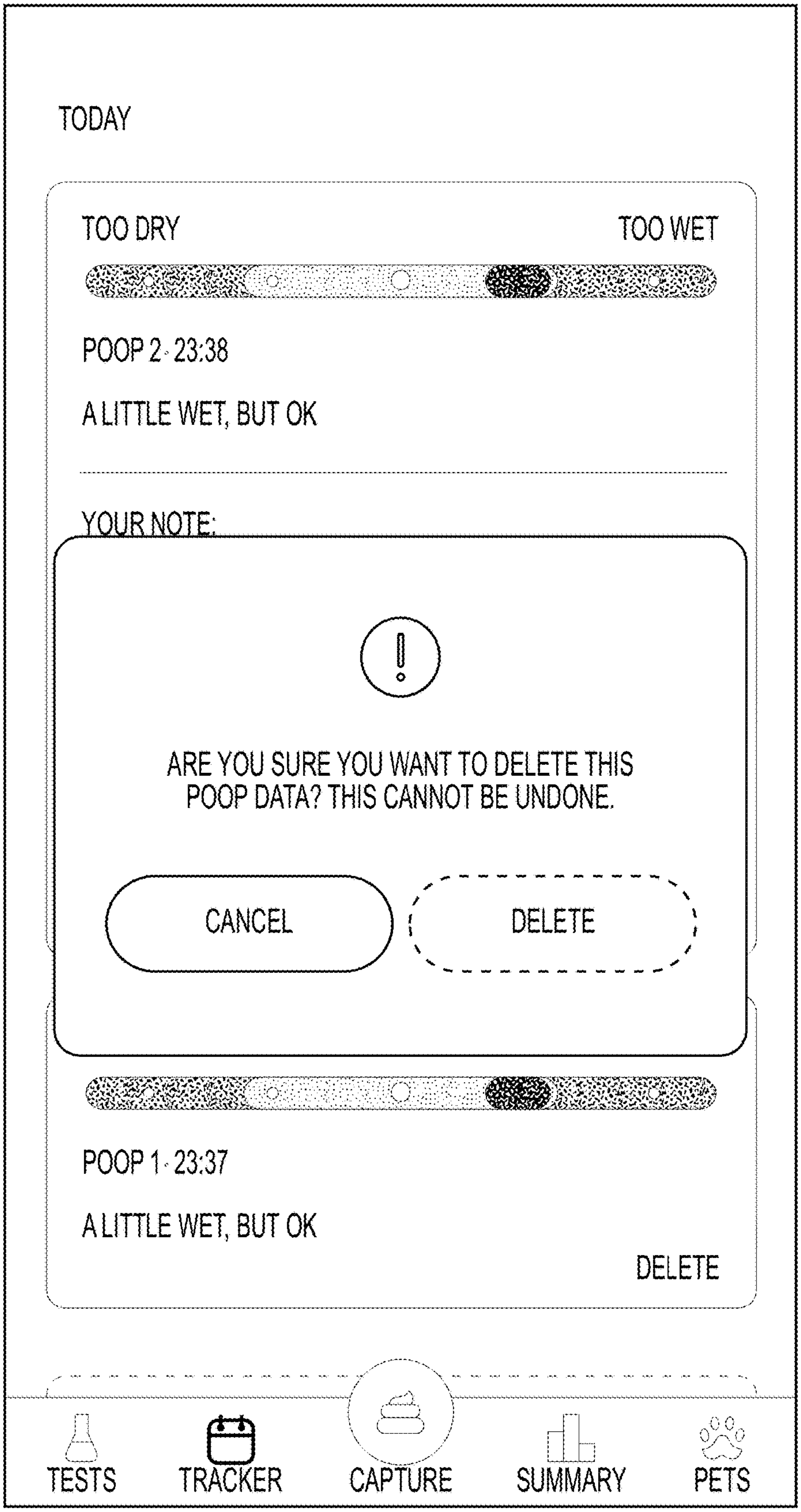

FIG. 1U further illustrates a "Delete Fecal Data" page of an exemplary environment of a platform for gathering, analyzing, and displaying results corresponding to a pet's fecal sample. The platform may allow a user to delete some or all of the fecal data. For example, the user may select the "Delete" button of one or more fecal records. Upon a user selecting the "Delete" button, the platform may display a confirmation regarding whether the user wants to delete the fecal data (e.g., "Are you sure you want to delete this poop data? This cannot be undone.")

Figure 1V:
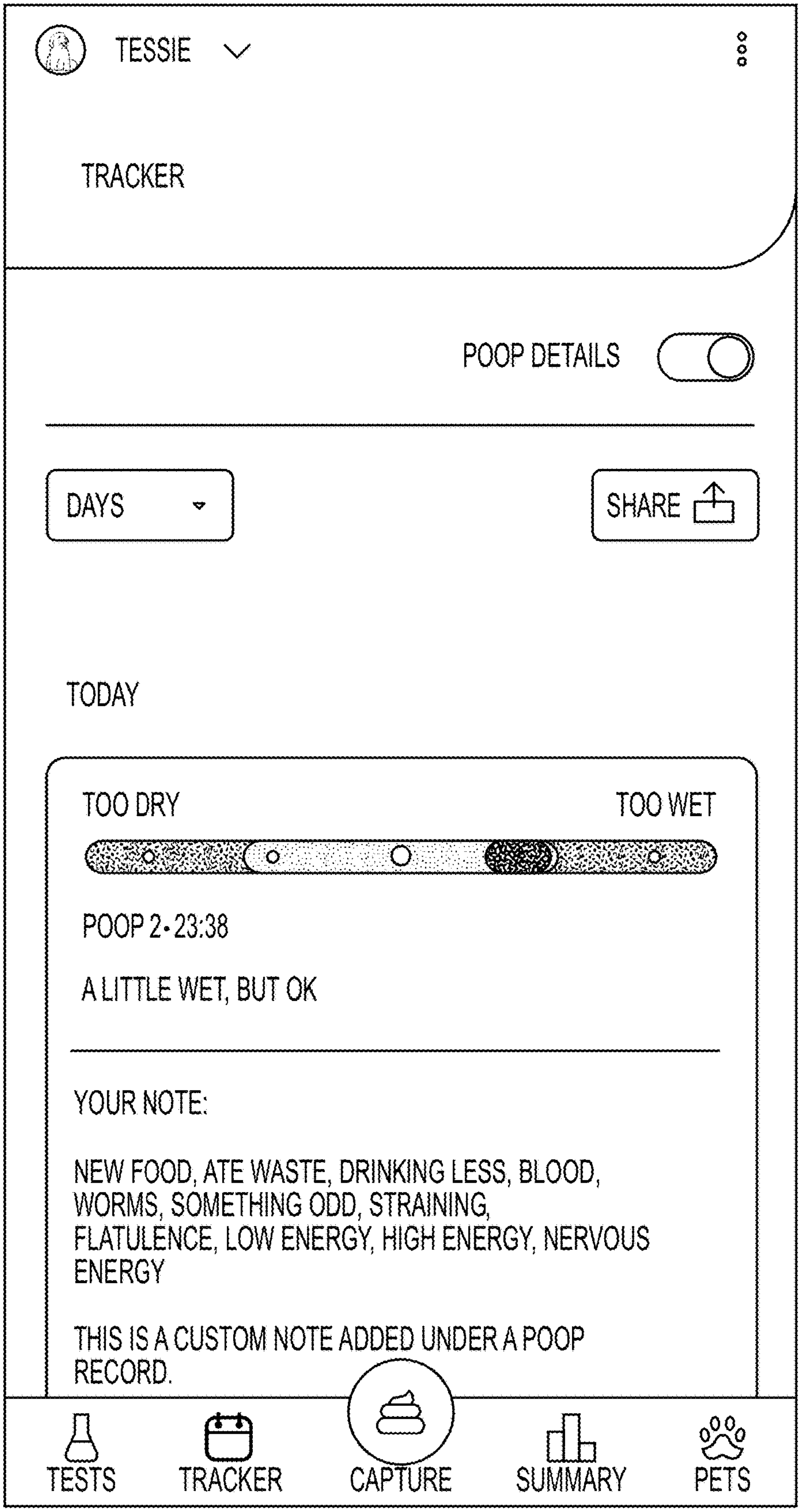

FIG. 1V further illustrates the "Tracker" page with the ability to see fecal details of an exemplary environment of a platform for gathering, analyzing, and displaying results corresponding to a pet's fecal sample. The platform may present the user an option to view fecal details (e.g., "Poop details") of the pet. The platform may also present the user an option to "share" the "Tracker" page via social media, email, and the like.

Figure 1W:
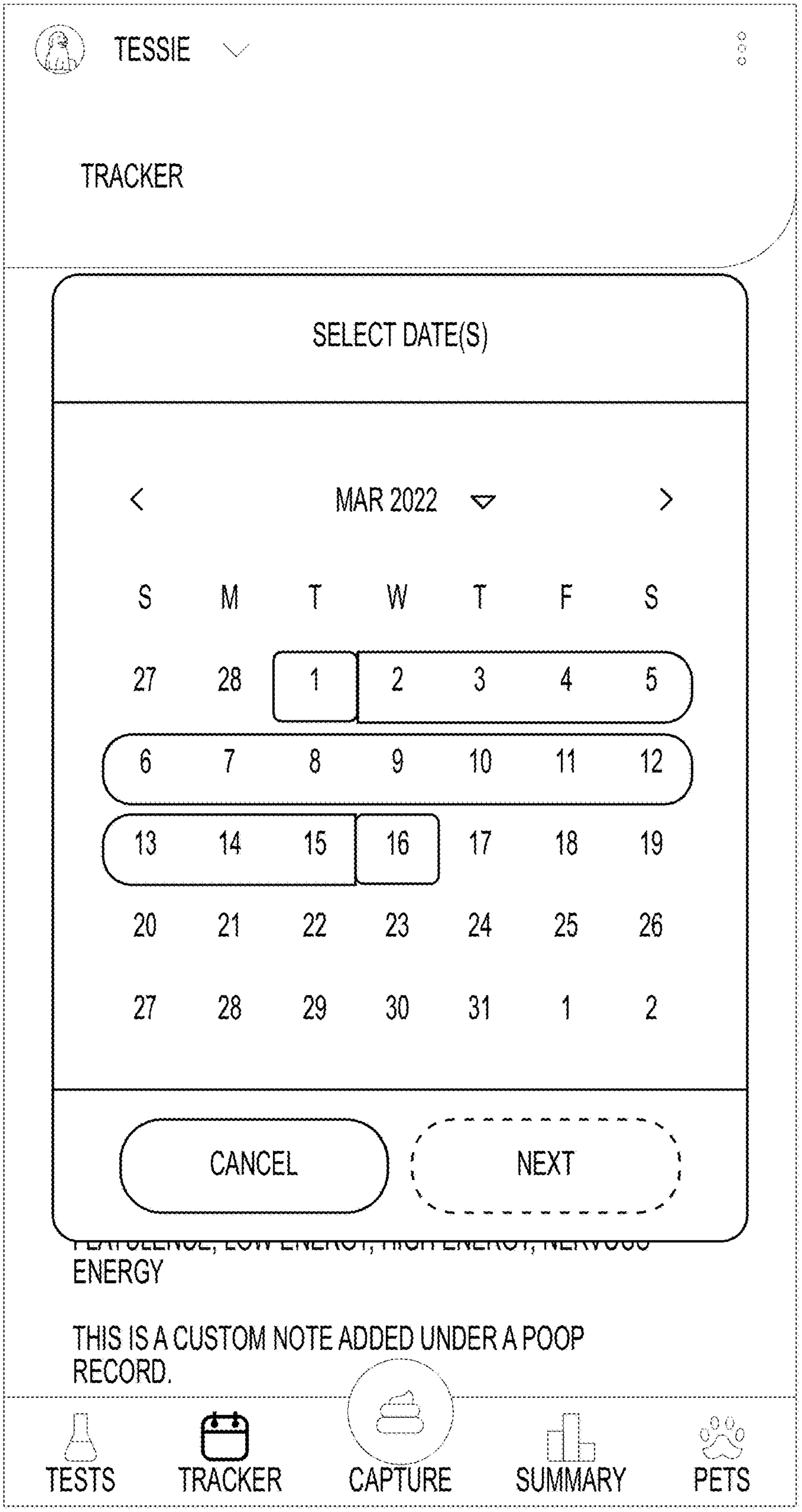

FIG. 1W further illustrates a "Poop Details" page of an exemplary environment of a platform for gathering, analyzing, and displaying results corresponding to a pet's fecal sample. The platform may provide the option for the user to select a particular date range (e.g. "March 1 to March 16") for which the user would like feces details. Upon selecting the "Next" button, the platform may proceed to FIG. 1X.

Figure 1X:

FIG. 1X further illustrates a "Poop Photos" page of an exemplary environment of a platform for gathering, analyzing, and displaying results corresponding to a pet's fecal sample. The platform may ask the user if the user would like to include the previously submitted feces images (e.g., "Do you want to include the photos of the poops you have tracked?"). The platform may also provide the option for the user to select a particular date range (e.g. "March 1 to March 16") that the user would like feces details. Upon selecting the "Next" button, the platform may proceed to FIG. 1Y.

Figure 1Y:
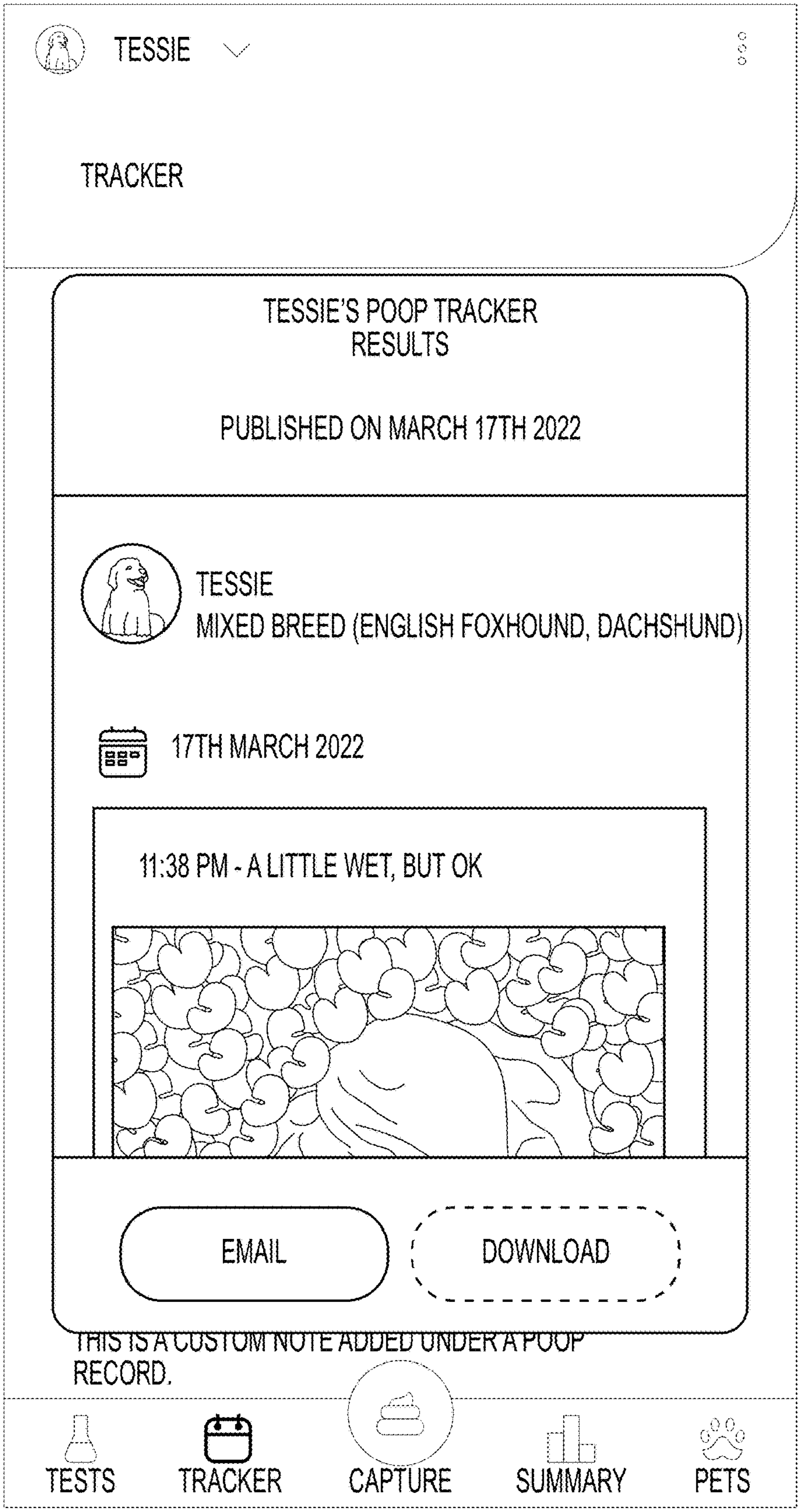

FIG. 1Y further illustrates a "Tracker Results" page of an exemplary environment of a platform for gathering, analyzing, and displaying results corresponding to a pet's fecal sample. The platform may provide the results of the fecal image analysis of the particular date range selected in FIG. 1W. The results may include the date (e.g., "17 Mar. 2022"), the timestamp (e.g., "11:38 PM"), and the analysis results (e.g., "A little wet, but ok"). The platform may also provide the image of the pet, the name of the pet (e.g., "Tessie"), and/or the breed of the pet (e.g., "Mixed Breed (English, Foxhound, Dachshund)"). The platform may provide the option for the user to "Email" or "Download" the results (e.g., "Tessie's Poop Tracker Results").

Figure 1Z:
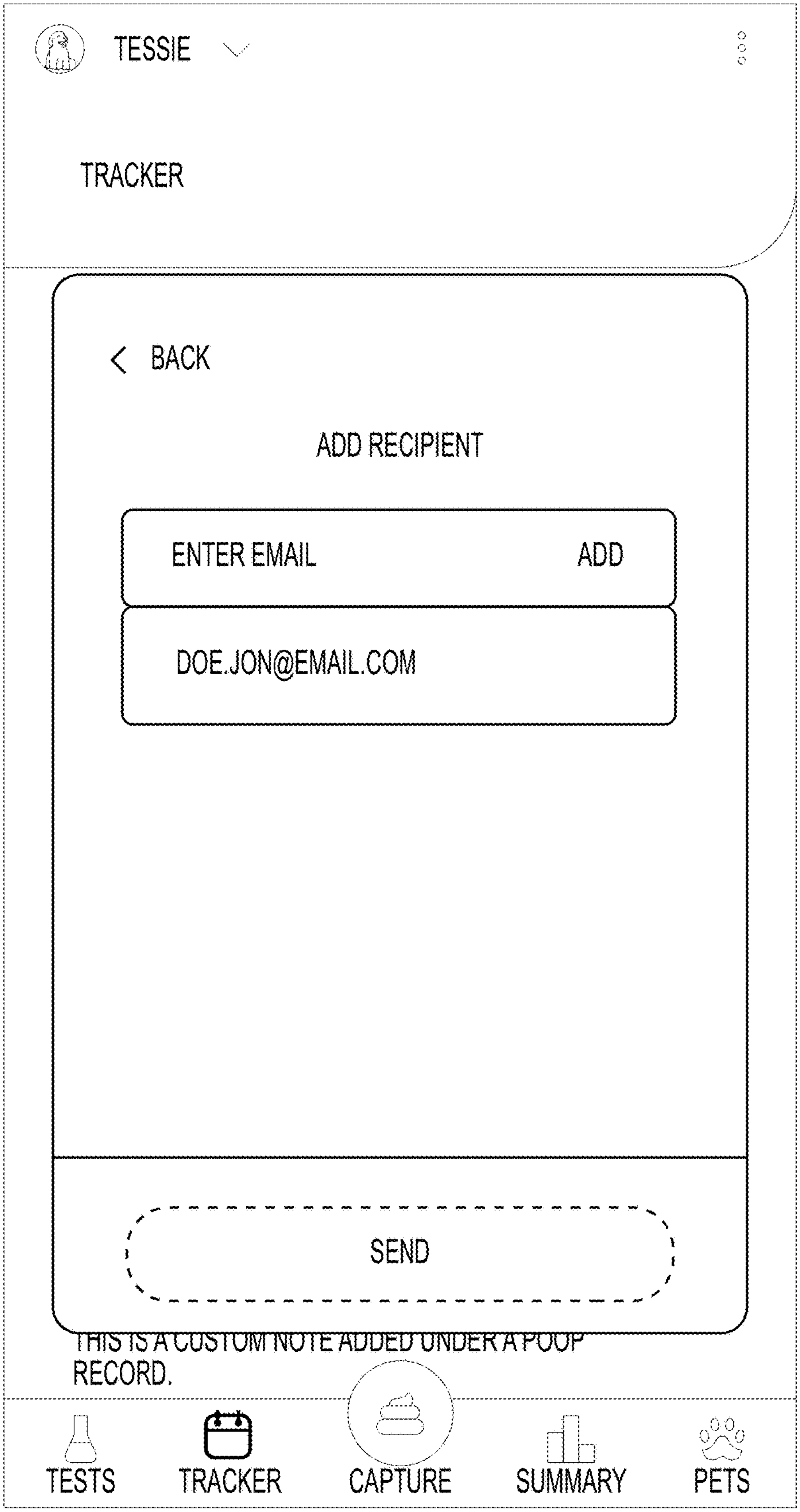
Figure 1A:
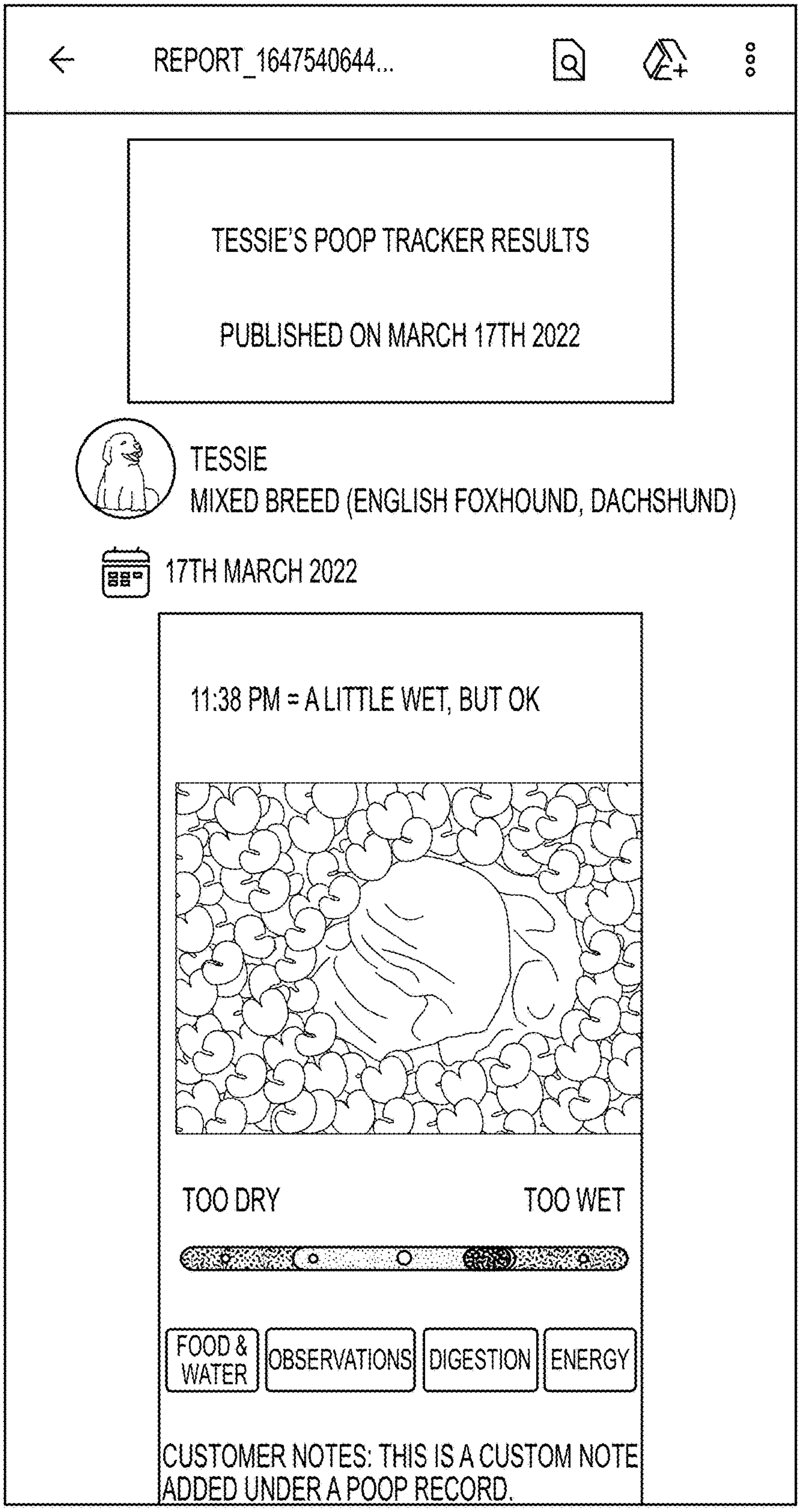
Figure 1B:
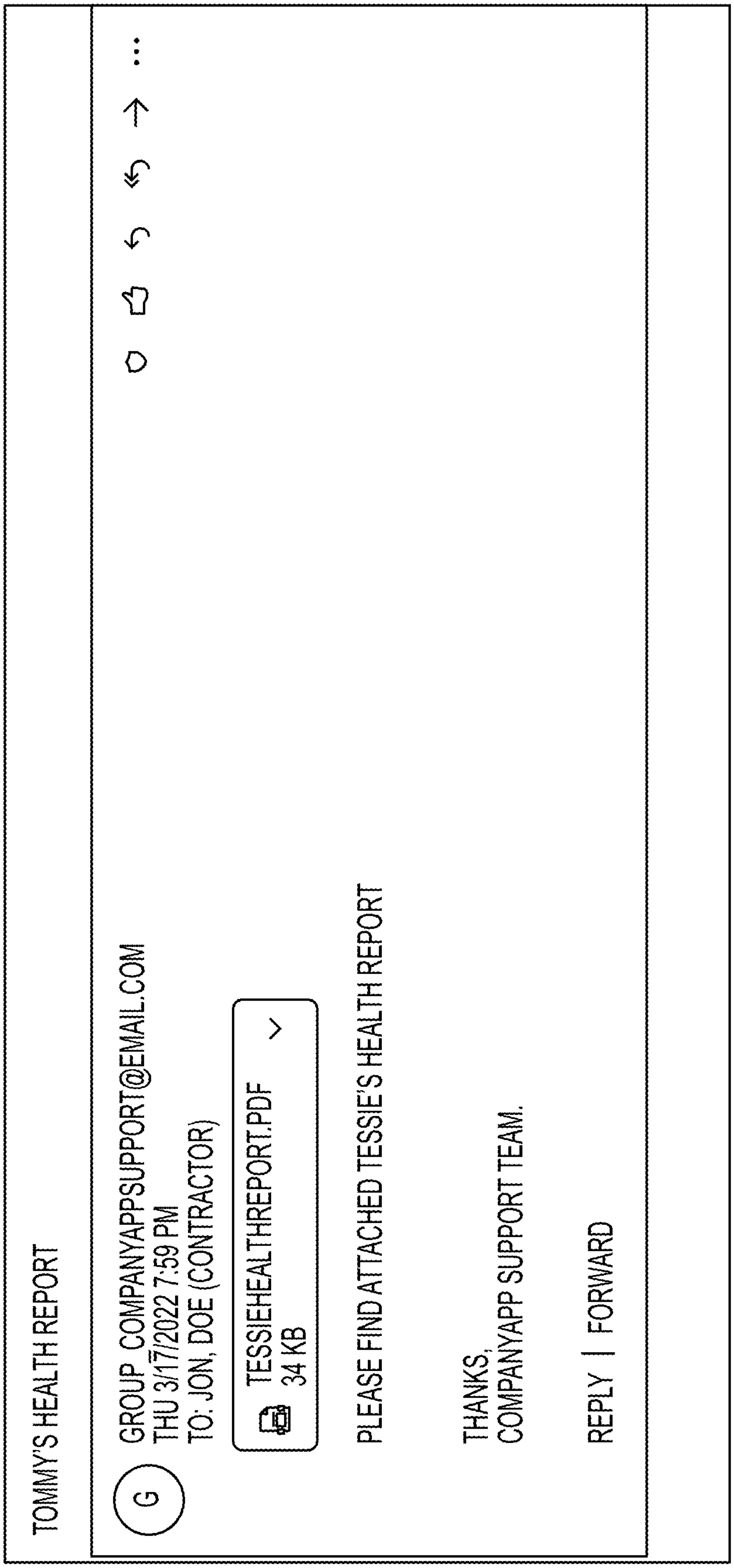

FIG. 1Z further illustrates an "Email Results" page of an exemplary environment of a platform for gathering, analyzing, and displaying results corresponding to a pet's fecal sample. The platform may provide the option for the user to enter one or more email addresses, where the platform may email the results of the fecal image analysis to the one or more email addresses.

FIG. 1AA further illustrates a "Download" page of an exemplary environment of a platform for gathering, analyzing, and displaying results corresponding to a pet's fecal sample. The platform may display the "Download" page in response to the user selecting the "Download" option. The report may include the pet's name (e.g., "Tessie"), the pet's breed (e.g., "Mixed Breed (English Foxhound, Dachshund) "), the date (e.g., "17 Mar. 2022"), the timestamp (e.g., "11:38 PM"), the result of the fecal image analysis (e.g., "A little wet, but ok"), the fecal sample image, a graphic of a scale that indicates where the results land on a range of "Too dry" to "Too wet," and/or any custom notes (e.g., "This is a custom note added under a poop record."). The platform may provide the option for the user to enter one or more email addresses, where the platform may email the results of the fecal image analysis to the one or more email addresses.

FIG. 1BB further illustrates the email from the "Email Results" page of an exemplary environment of a platform for gathering, analyzing, and displaying results corresponding to a pet's fecal sample. If a user selects the "Email" option in FIG. 1Y, the platform may automatically generate an email to each of the one or more email addresses that were added in FIG. 1Z. The platform may display the generated email to the user, where the user may decide to send the email. In some embodiments, the platform may automatically send the generated email to each of the one or more email addresses that were added.

Figure 2A:
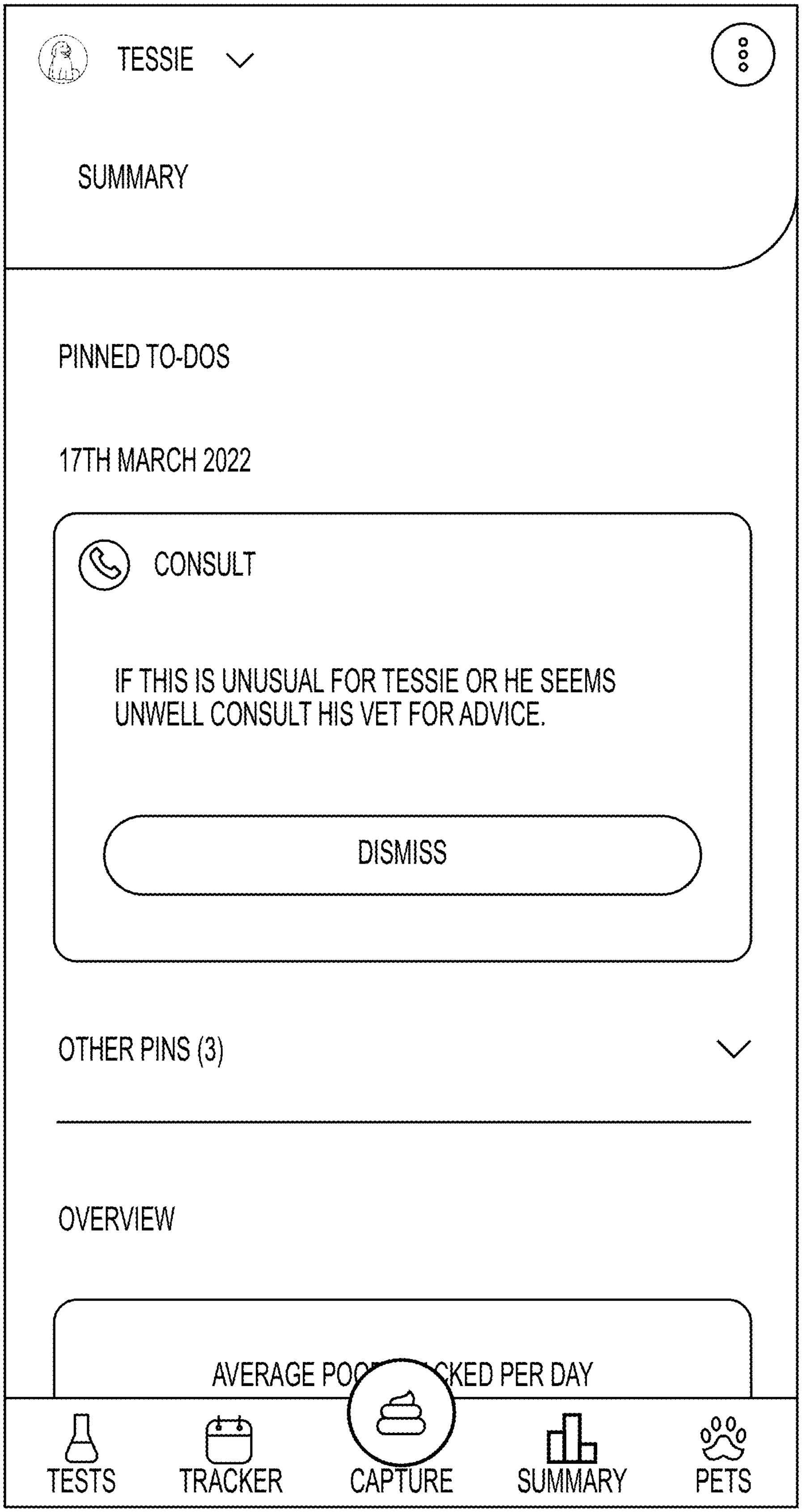
FIGS. 2A-2J also describe exemplary environments of a platform for analyzing a pet's fecal sample and displaying the result of the analysis, according to one or more embodiments.
Figure 2B:
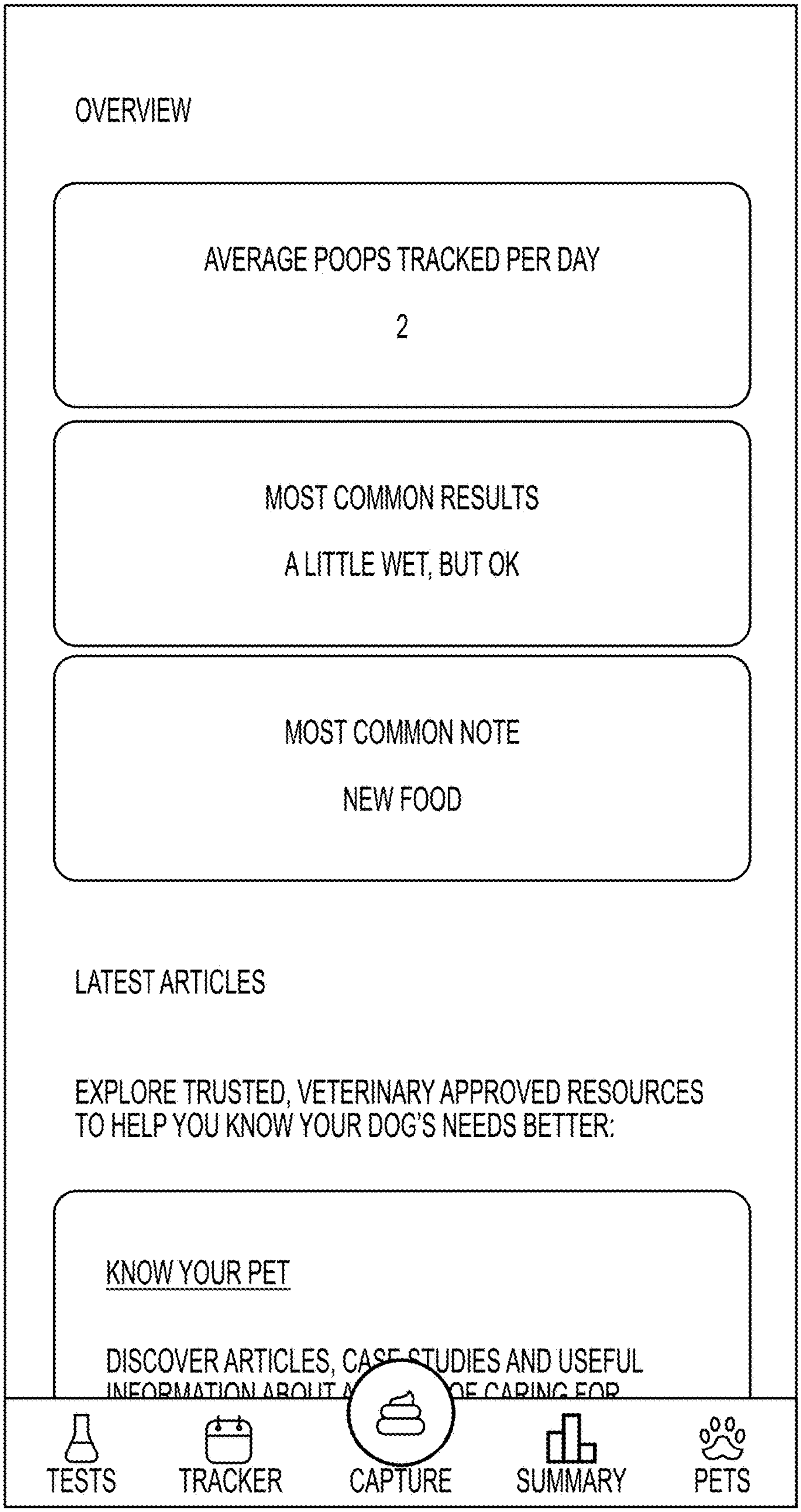
Figure 2C:
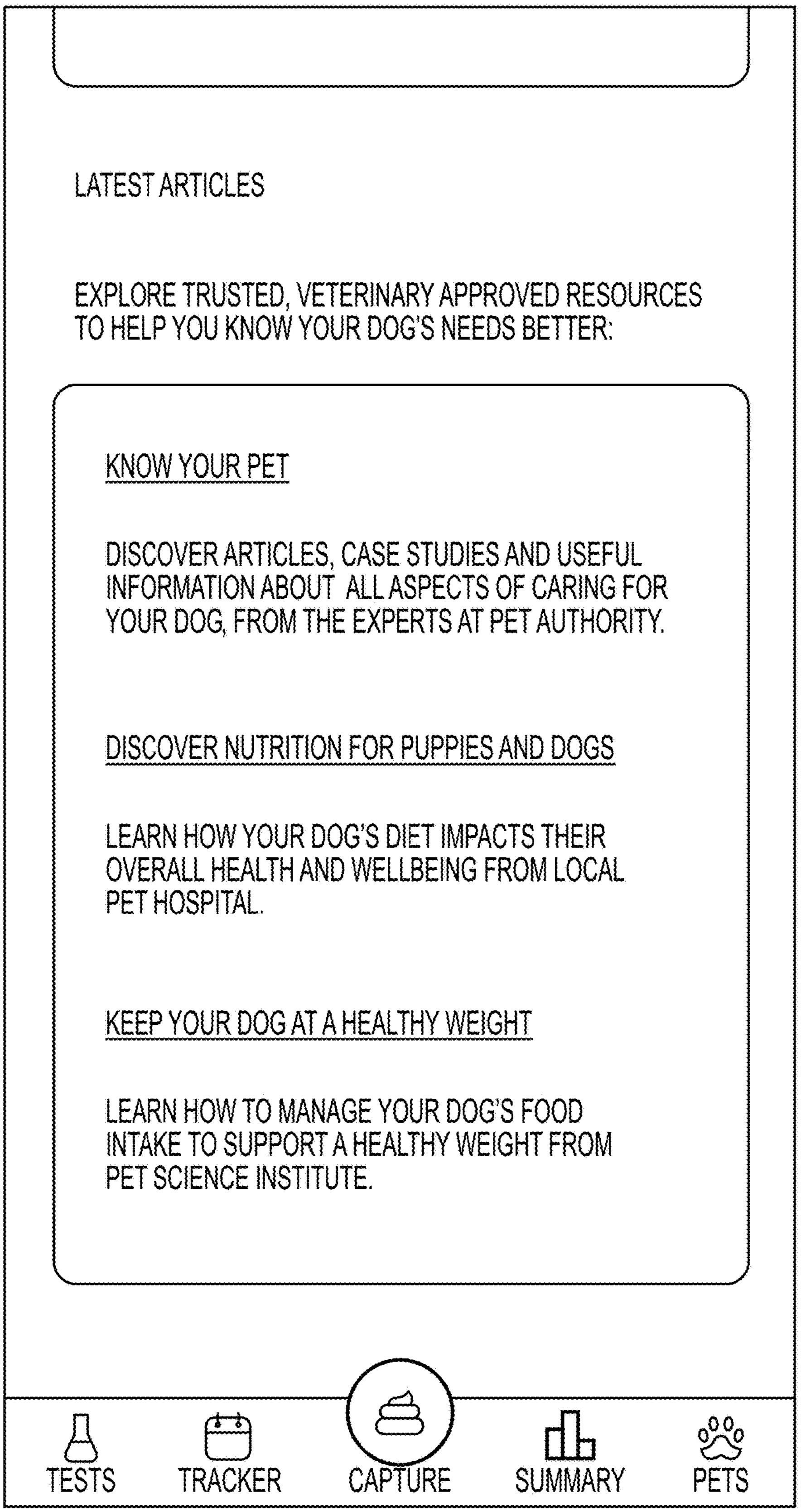
Figure 2D:

FIGS. 2A-D further illustrate a "Summary" page of an exemplary environment of a platform for gathering, analyzing, and displaying results corresponding to a pet's fecal sample. The "Summary" page may be presented to the user in response to the user selecting the "Summary" button. The platform may provide an "Overview" section that includes the average feces checked per day (e.g., "2"), the most common analysis results ("e.g., "A little wet, but ok"), and/or a most common note (e.g., "New food"). The platform may also display one or more links to one or more publications that may provide additional information (e.g., "Know Your Pet" or "Discover nutrition for puppies and dogs" or "Keep your dog at a healthy weight"). If the user selects one of the links, the platform may transfer the user to an external page that corresponds to the link, as shown in FIG. 2D.

Figure 2E:
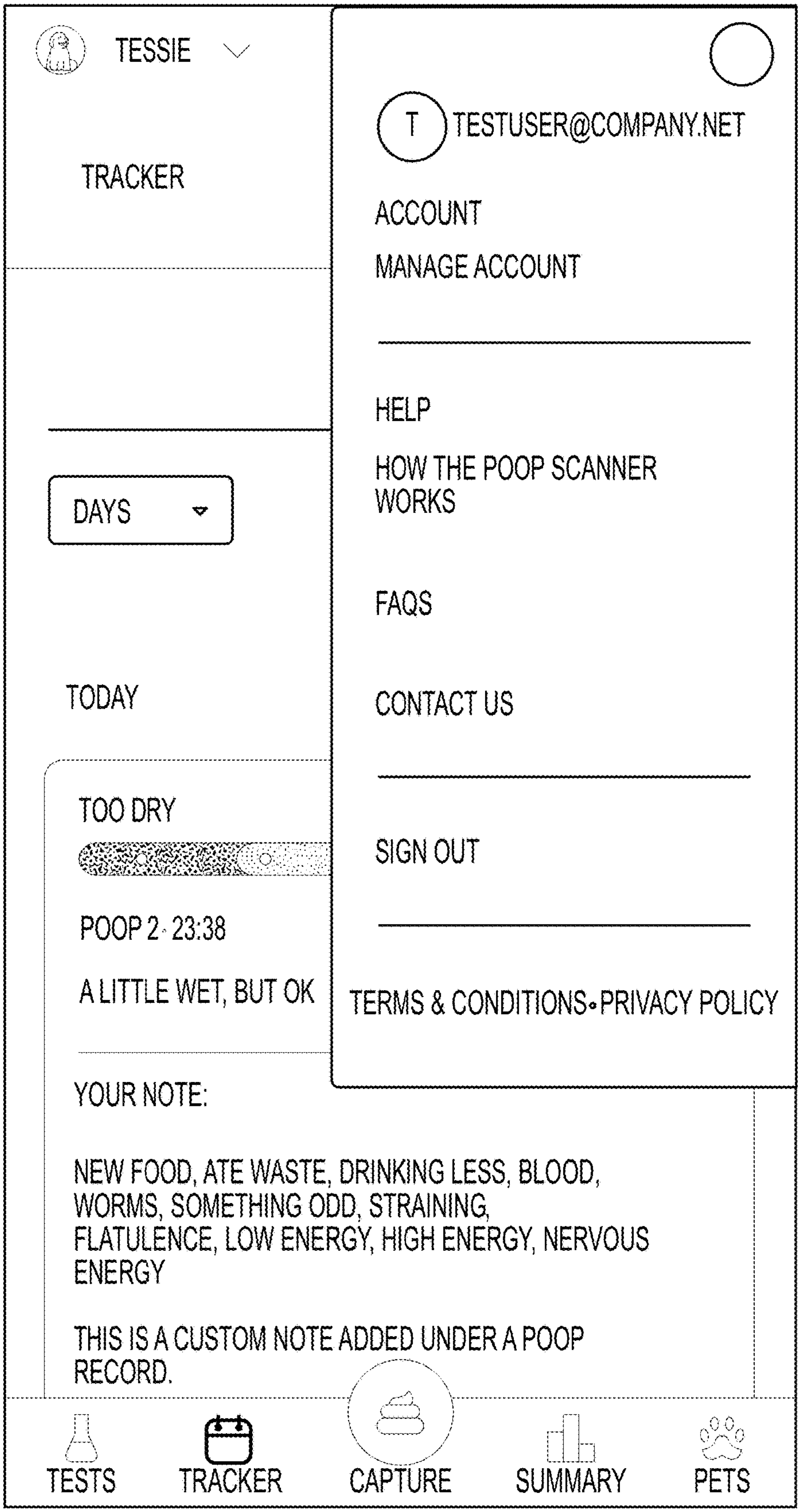

FIG. 2E further illustrates an "Account Details" page of an exemplary environment of a platform for gathering, analyzing, and displaying results corresponding to a pet's fecal sample. The platform may display options for the user to "Manage account," provide "Help" (e.g., "How the poop scanner works," "FAQs," or "Contact us"), and/or provide a "Sign out" option.

Figure 2F:
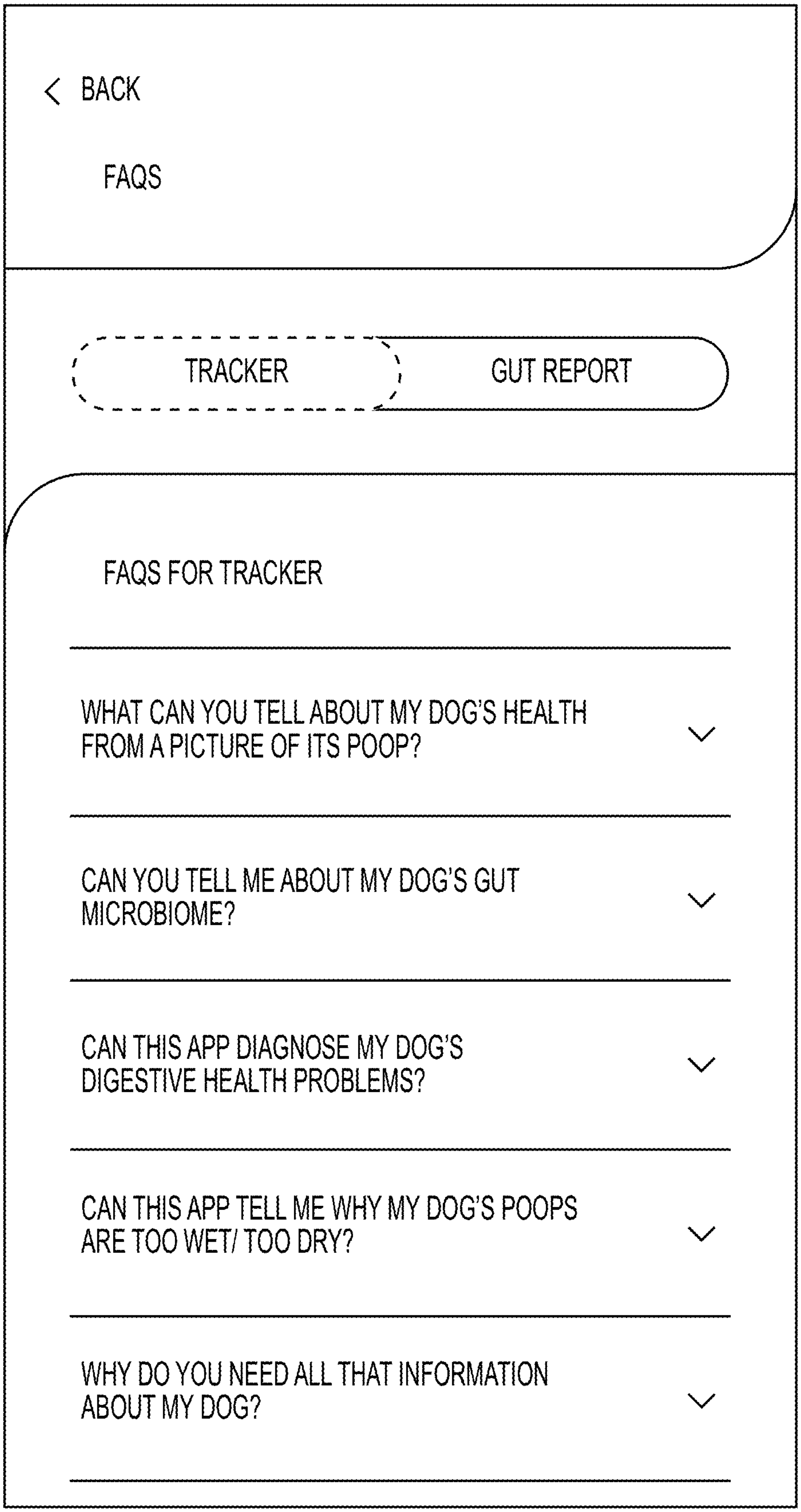
Figure 2G:
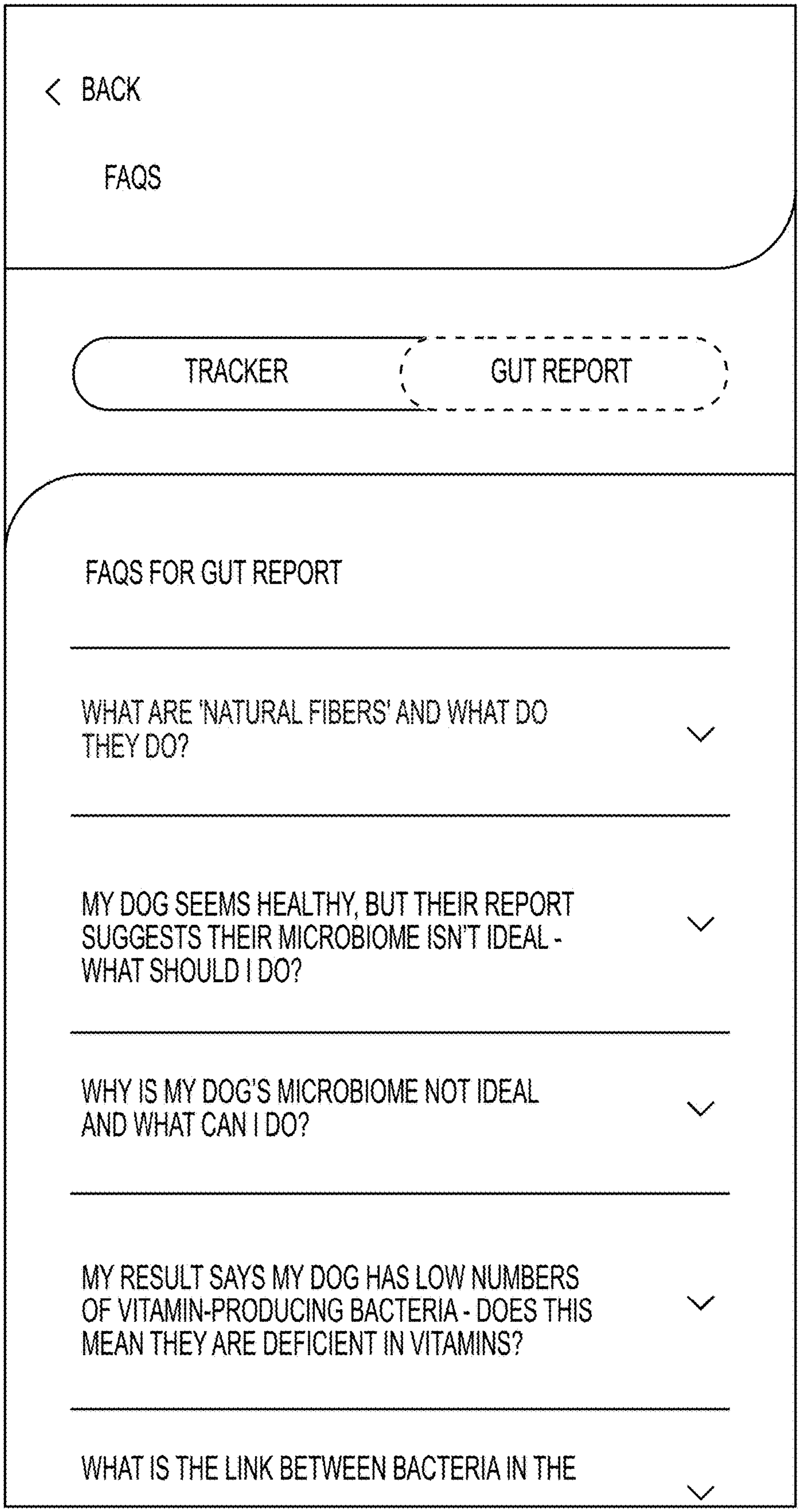
Figure 2H:
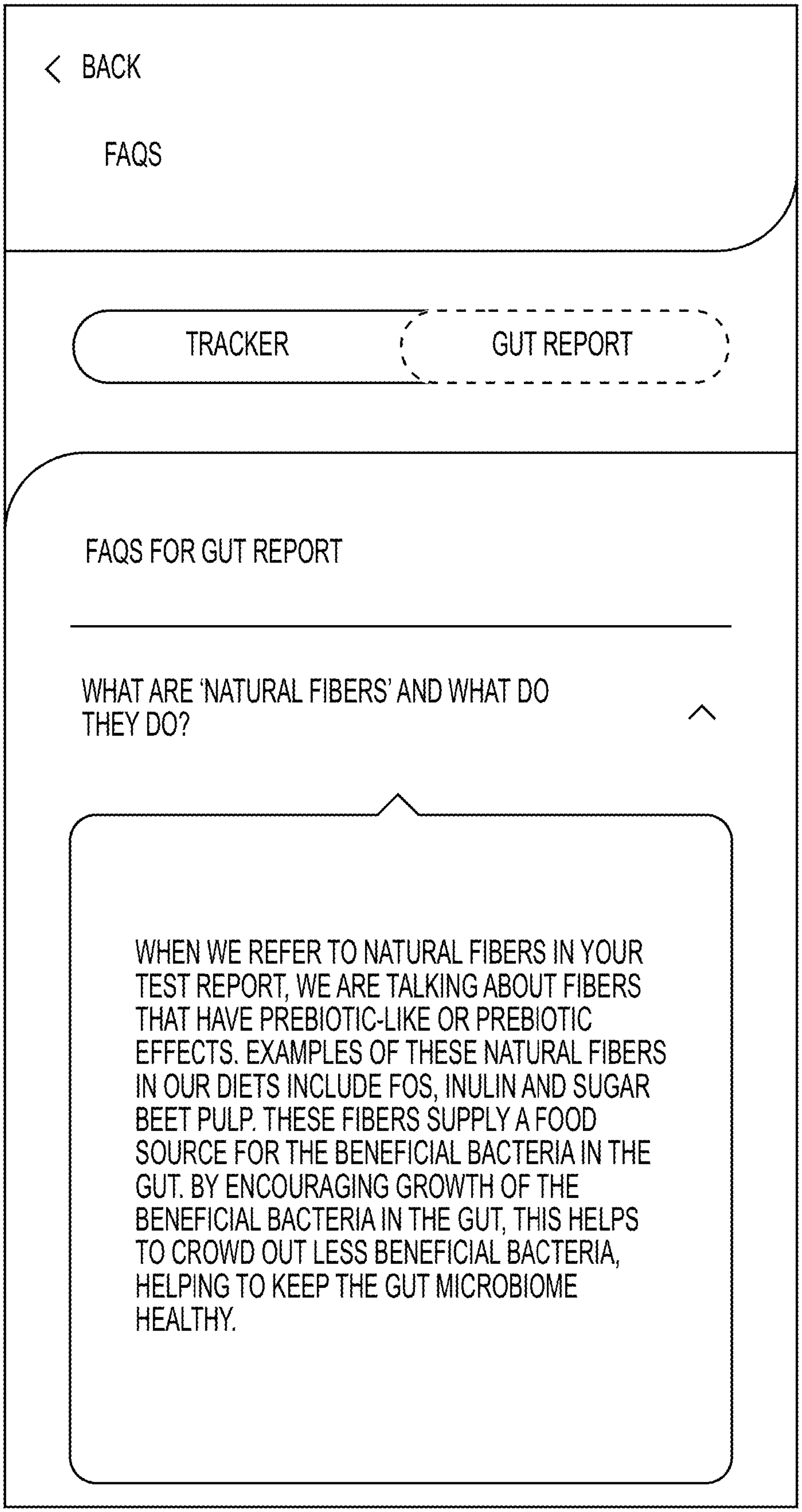

FIGS. 2F-H further illustrate a "FAQ" page of an exemplary environment of a platform for gathering, analyzing, and displaying results corresponding to a pet's fecal sample. The platform may provide answers to popular questions (e.g., "Can you tell me about my dog's gut microbiome"). The popular questions may be sectioned into questions regarding the "Tracker" and questions regarding the "Gut Report."

Figure 2I:
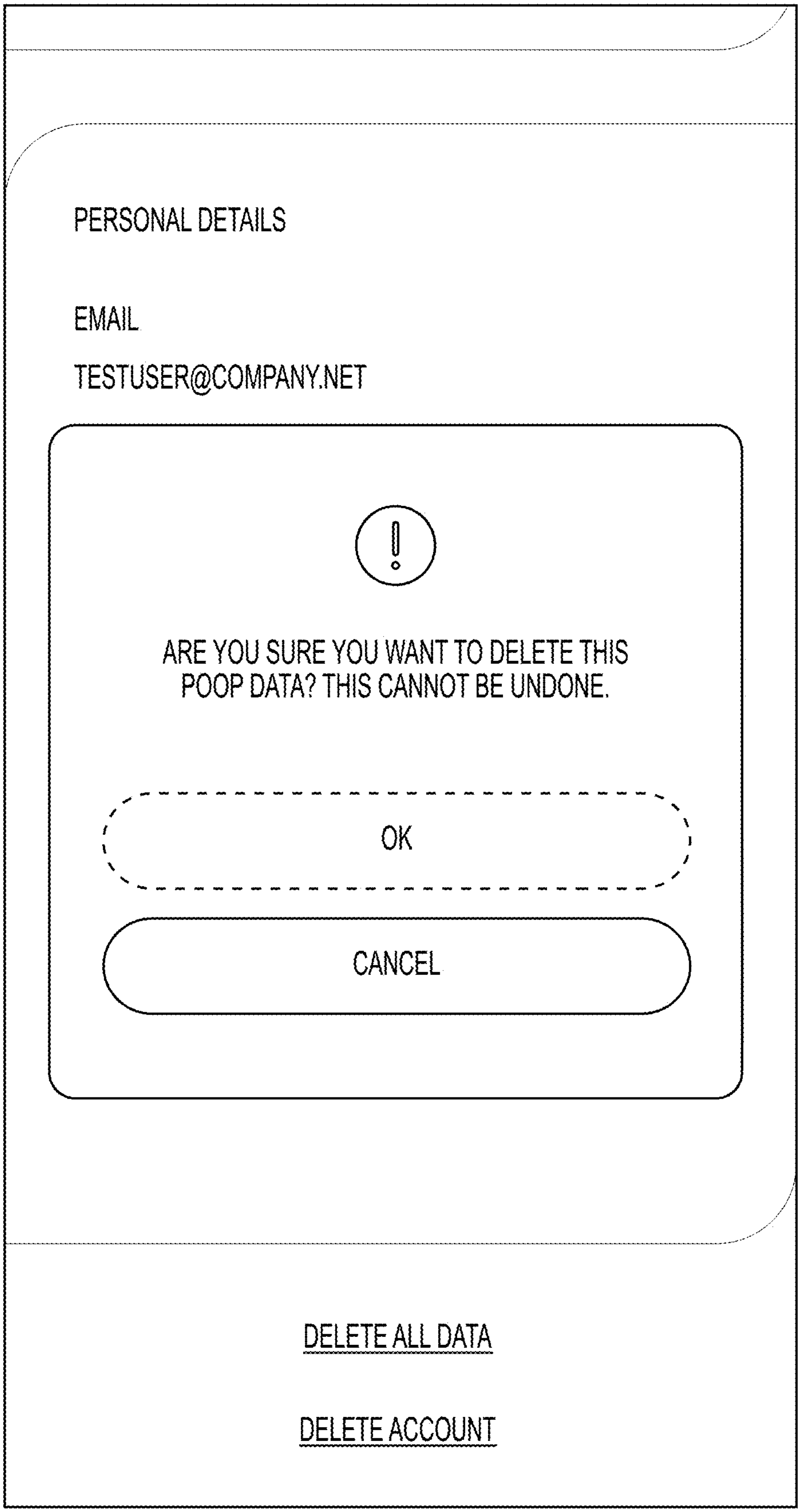
Figure 2J:
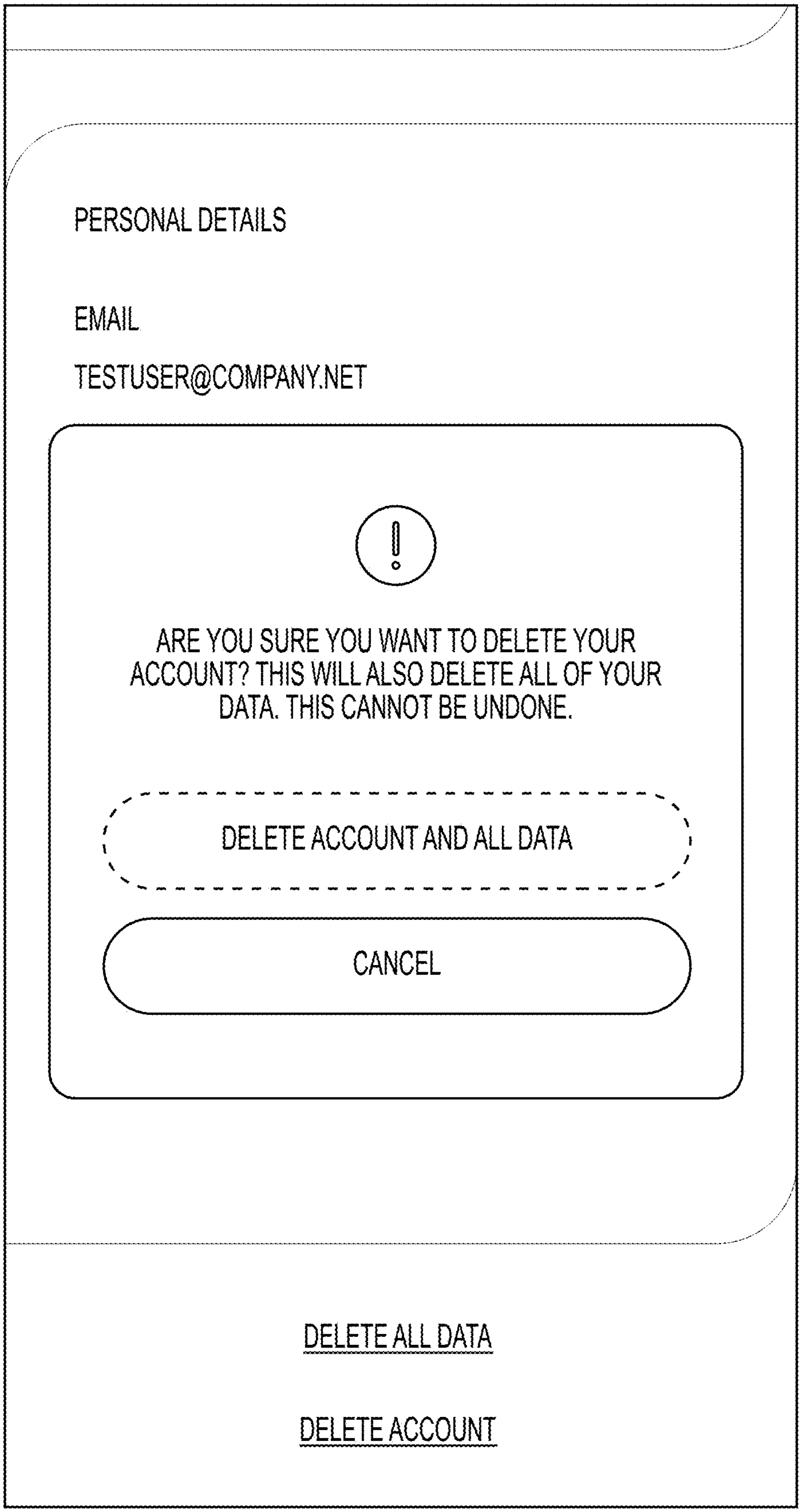

FIGS. 2I-J further illustrate a "Delete Account" page of an exemplary environment of a platform for gathering, analyzing, and displaying results corresponding to a pet's fecal sample. The platform may provide the user an option to delete the user's data. The platform may confirm that the user would like to delete all of the user's data via an "Ok" button. The platform may further confirm (and clarify) that the user would like to delete the user's account via a "Delete account and all data" button.

Figure 3A:
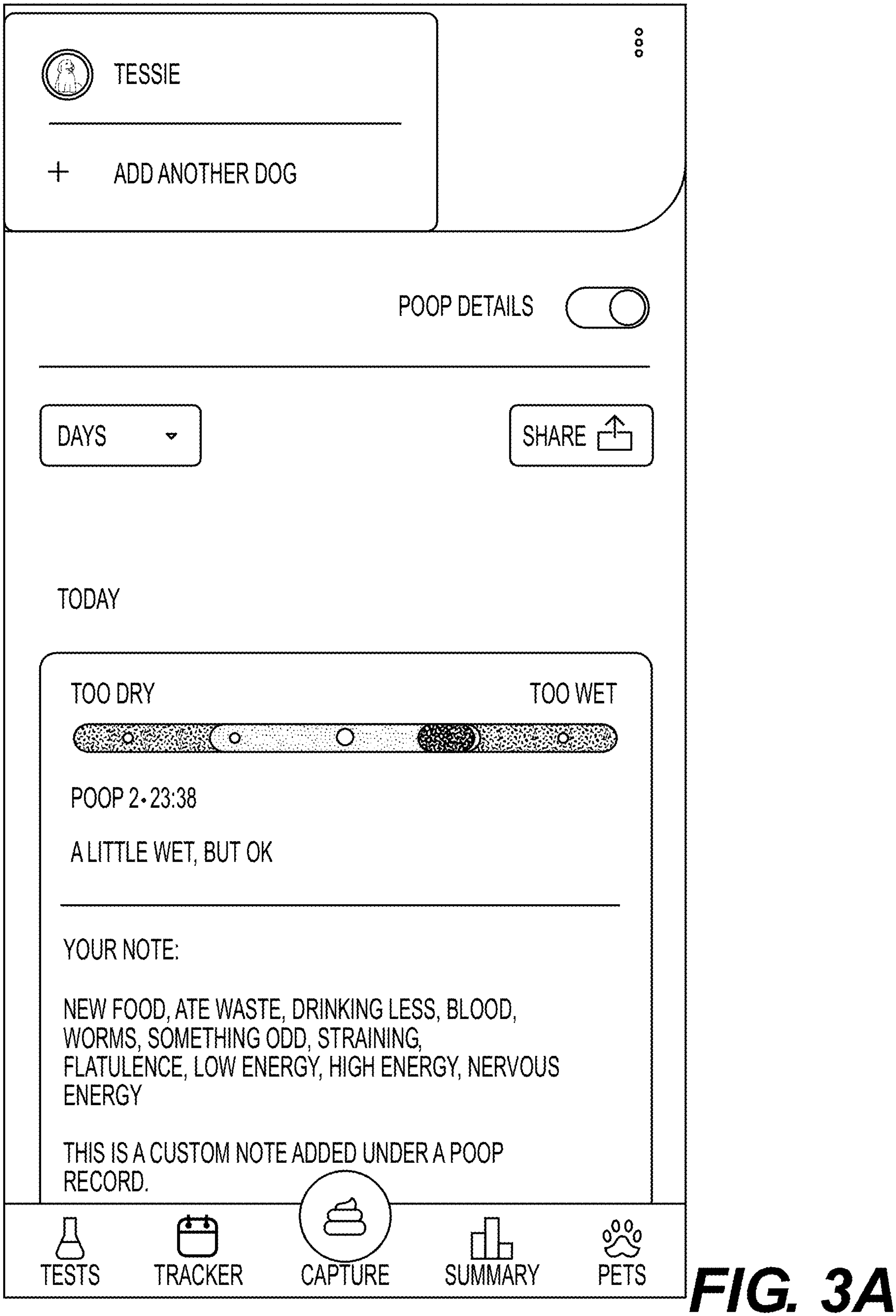
FIGS. 3A-3D describe exemplary environments of a pet profile in a platform for gathering, analyzing, and displaying results corresponding to a pet's fecal sample, according to one or more embodiments.
Figure 3B:
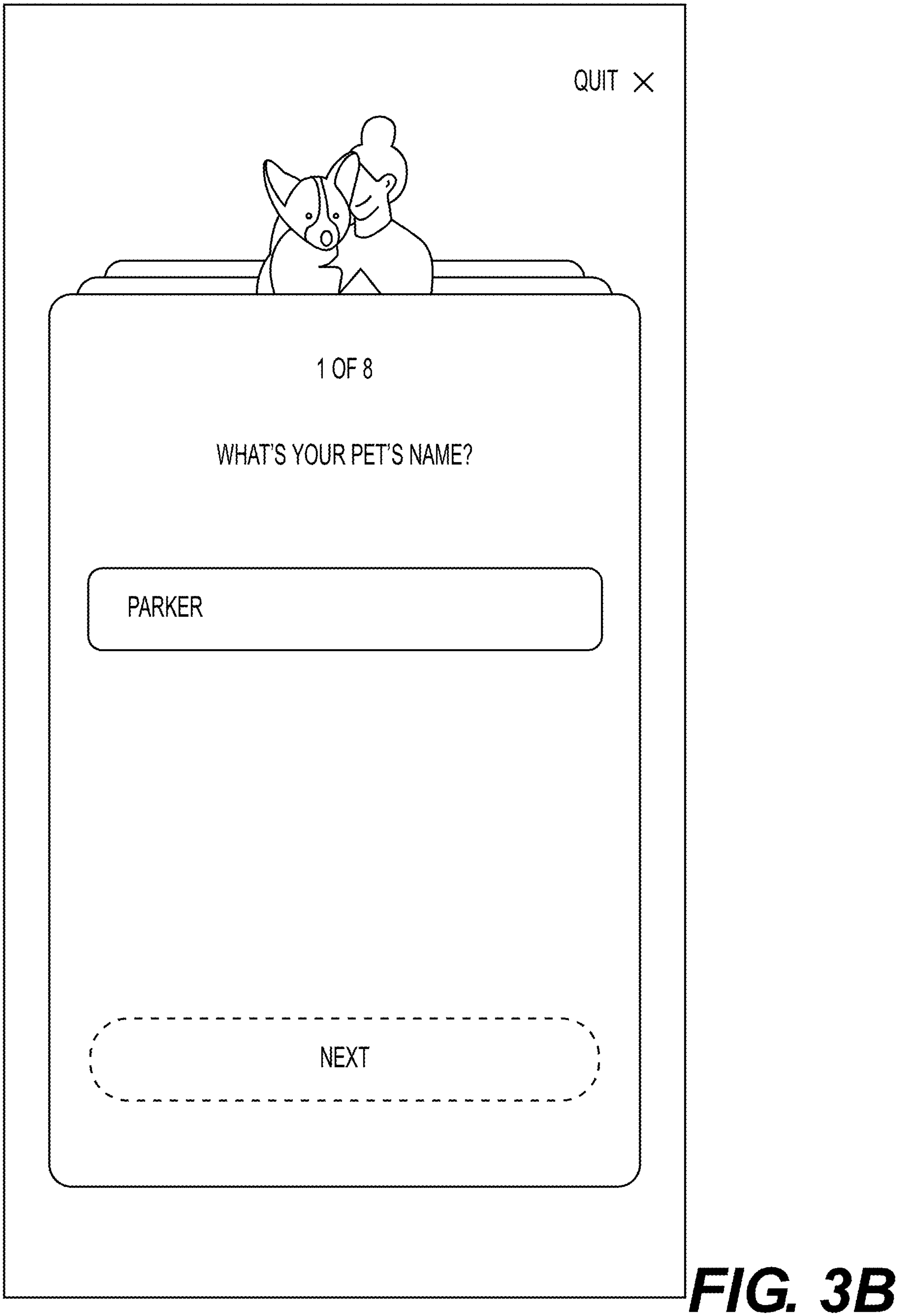
Figure 3C:
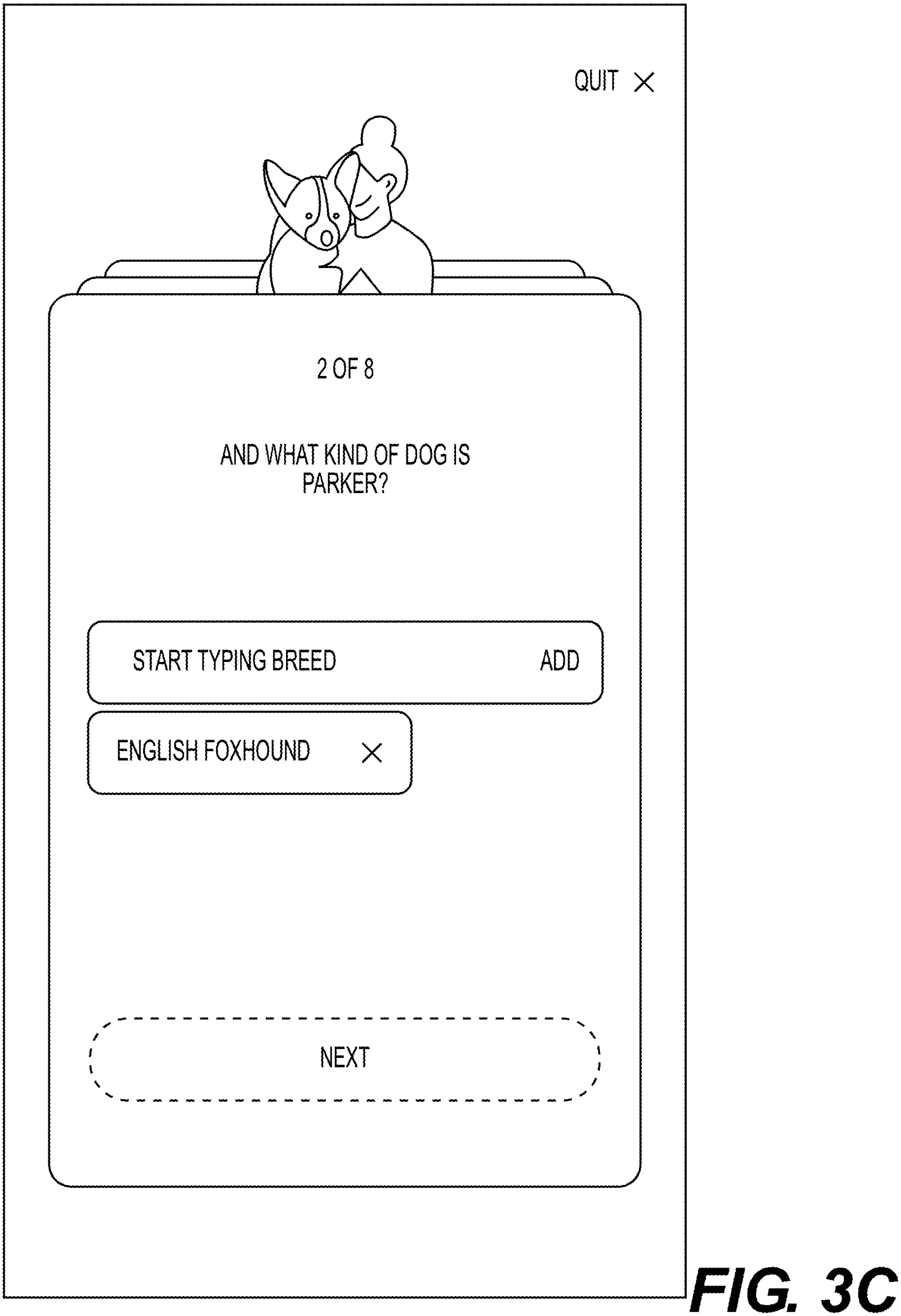
Figure 3D:
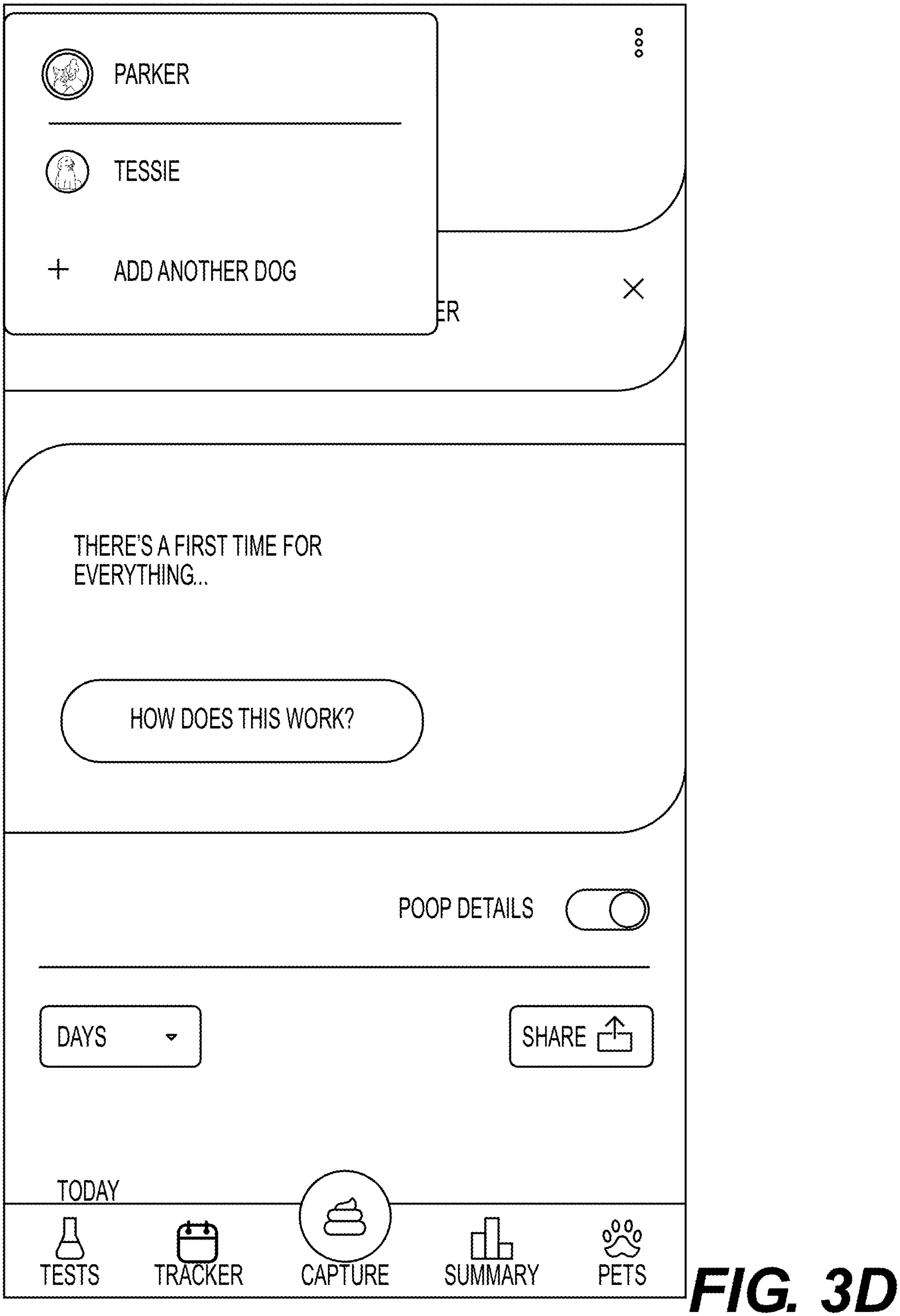

FIG. 3A further illustrates an "Add Another Dog" page of an exemplary environment of a platform for gathering, analyzing, and displaying results corresponding to a pet's fecal sample. The platform may display the current pet corresponding to the user (e.g., "Tessie"), as well as provide the user with an option to "Add another dog." Such an option may allow for the user to have one or more pet profiles associated with the user. This may allow for the user to more easily track the one or more pets. Upon the user selecting the "Add another dog" option, the platform may prompt the user to enter the pet's name (e.g., "Parker"), as illustrated in FIG. 3B. Additionally, as illustrated in FIG. 3C, the platform may further prompt the user to enter the pet's breed (e.g., "English Foxhound"), where the pet's breed may include one or more breeds. The platform may further prompt the user to fill in additional information, such as the pet's age, weight, and the like. Upon the user successfully adding all of the pet's information, the platform may associate the additional pet with the user. The additional association may be further illustrated in FIG. 3D, where the platform display's a profile for "Parker" and a profile for "Tessie."

Exemplary Pet Fecal Sample Report Platform

Figure 4A:
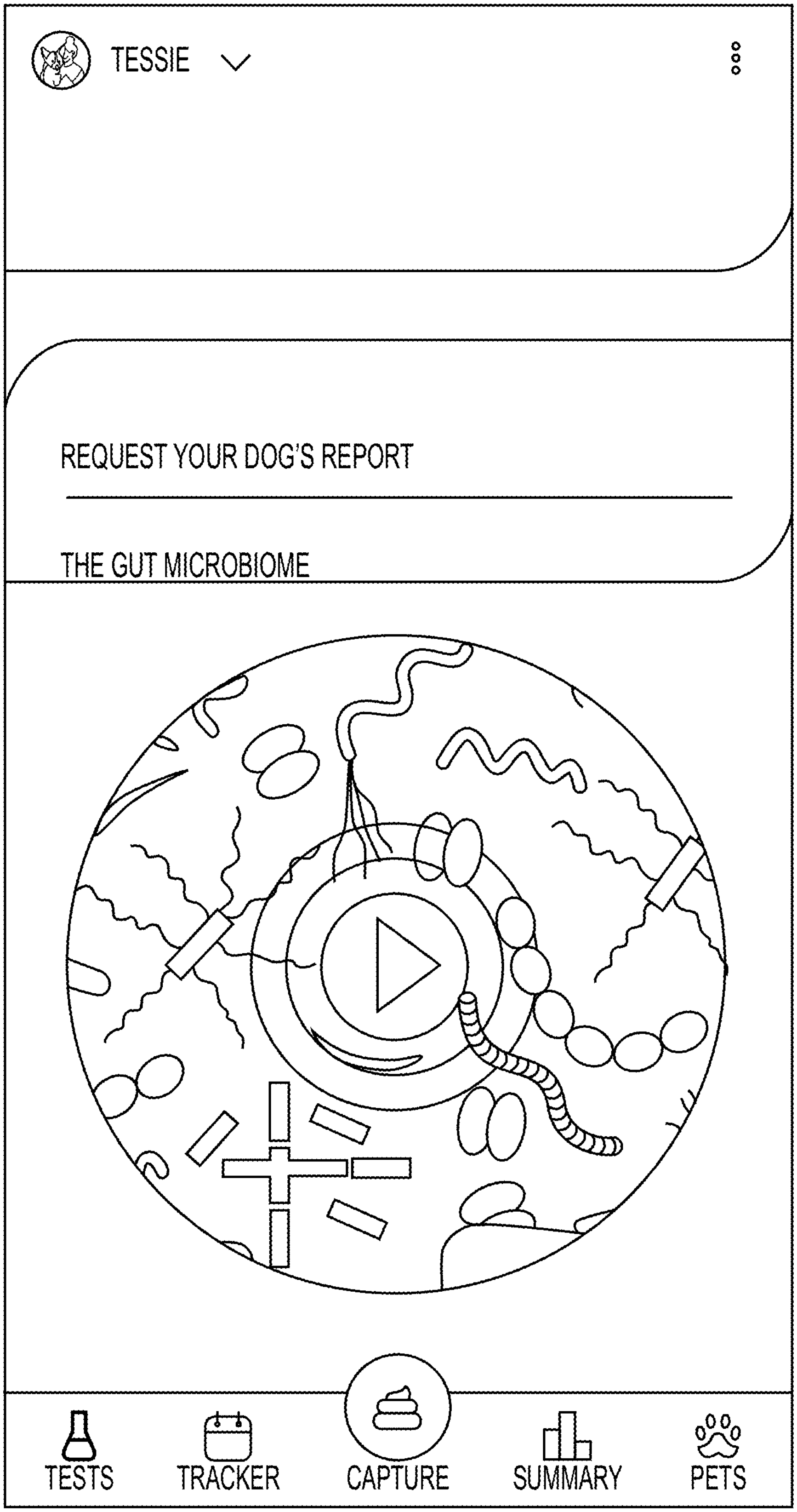
FIGS. 4A-4J describe exemplary environments of a platform for gathering, analyzing, and displaying results corresponding to a pet's fecal sample, according to one or more embodiments.
Figure 4B:
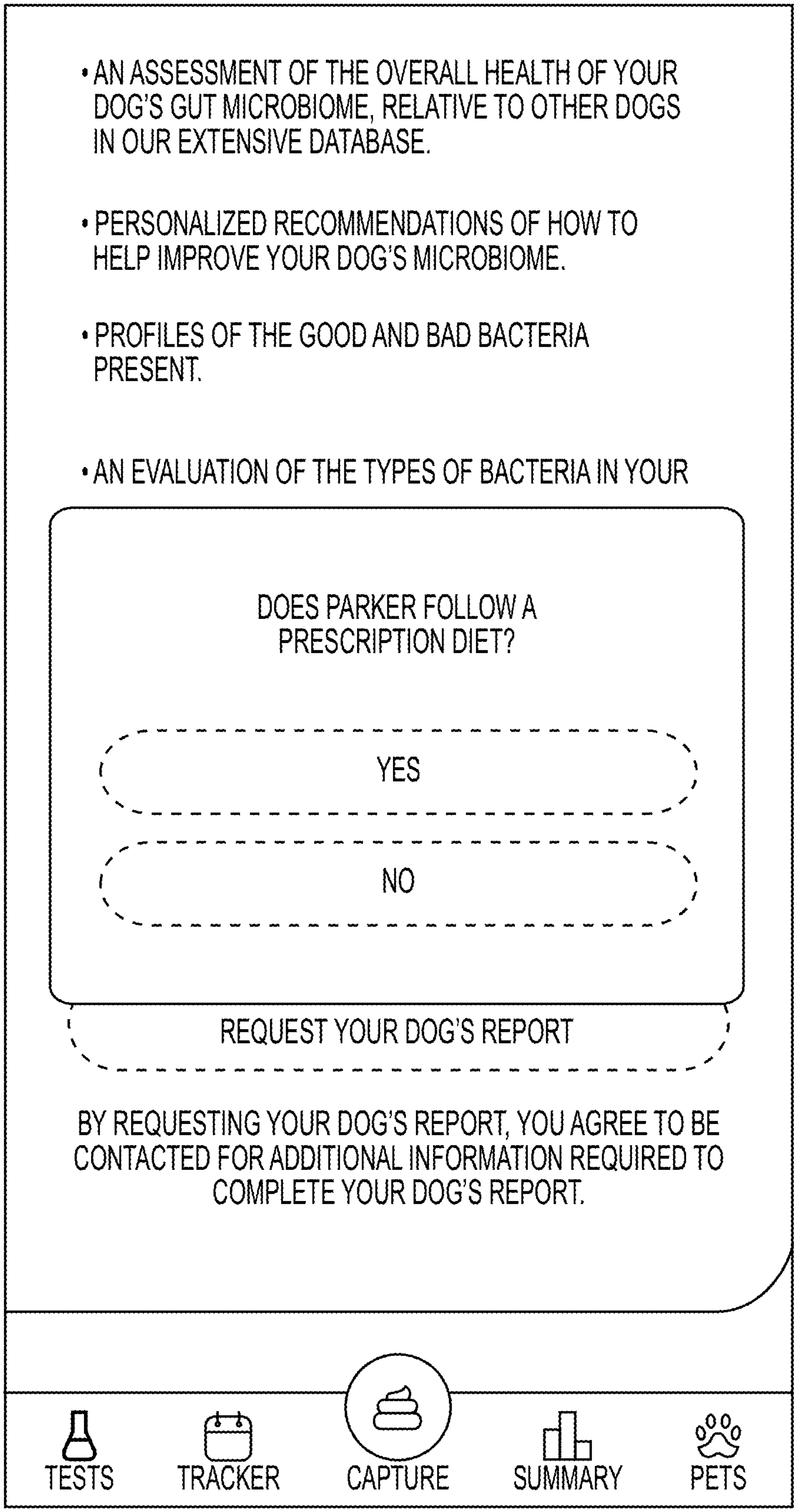
Figure 4C:
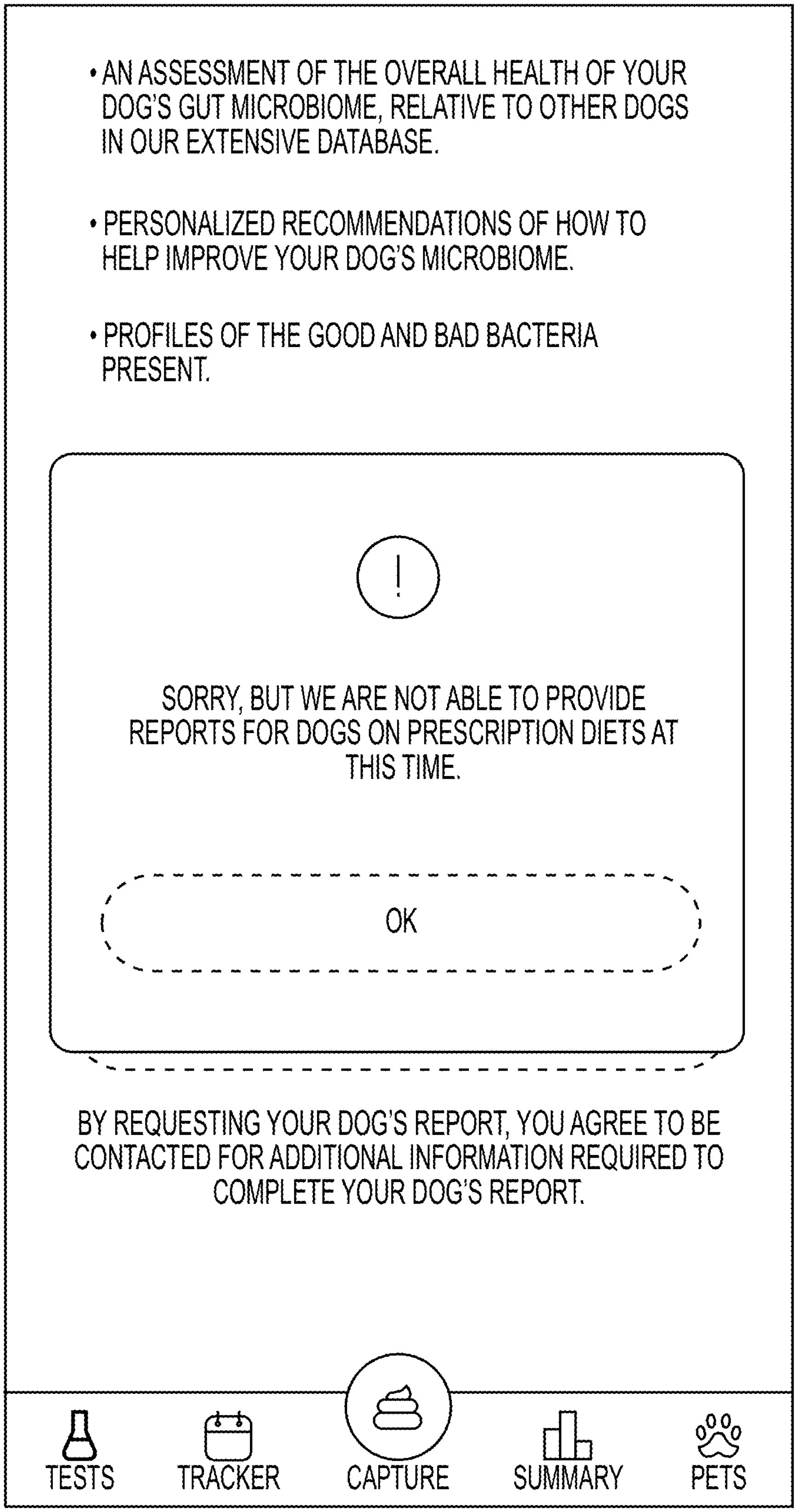

FIGS. 4A-J illustrate a "Tests" page of an exemplary environment of a platform for gathering, analyzing, and displaying results corresponding to a pet's fecal sample. The platform may begin with an introduction "Tests" page that outlines the gut microbiome, as illustrated in FIG. 4A. Upon the user indicating that the user wishes to proceed (e.g., by pressing the arrow), the platform may first ask the user if the pet follows a prescription diet, as illustrated in FIG. 4B. If the user presses "Yes," the platform may inform the user that reports are not provided for pets on prescription diets, as illustrated in FIG. 4C.

Figure 4D:
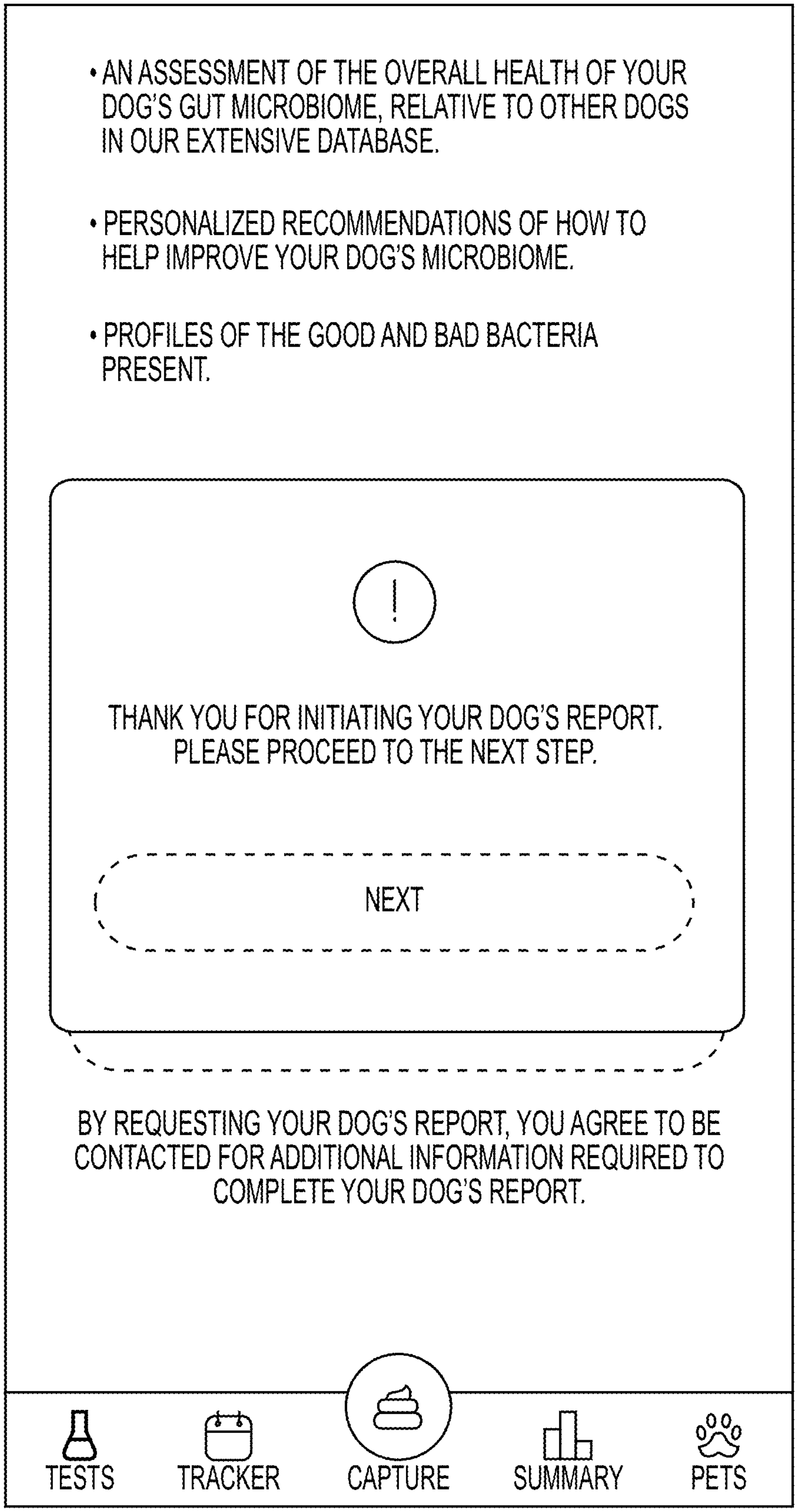
Figure 4E:
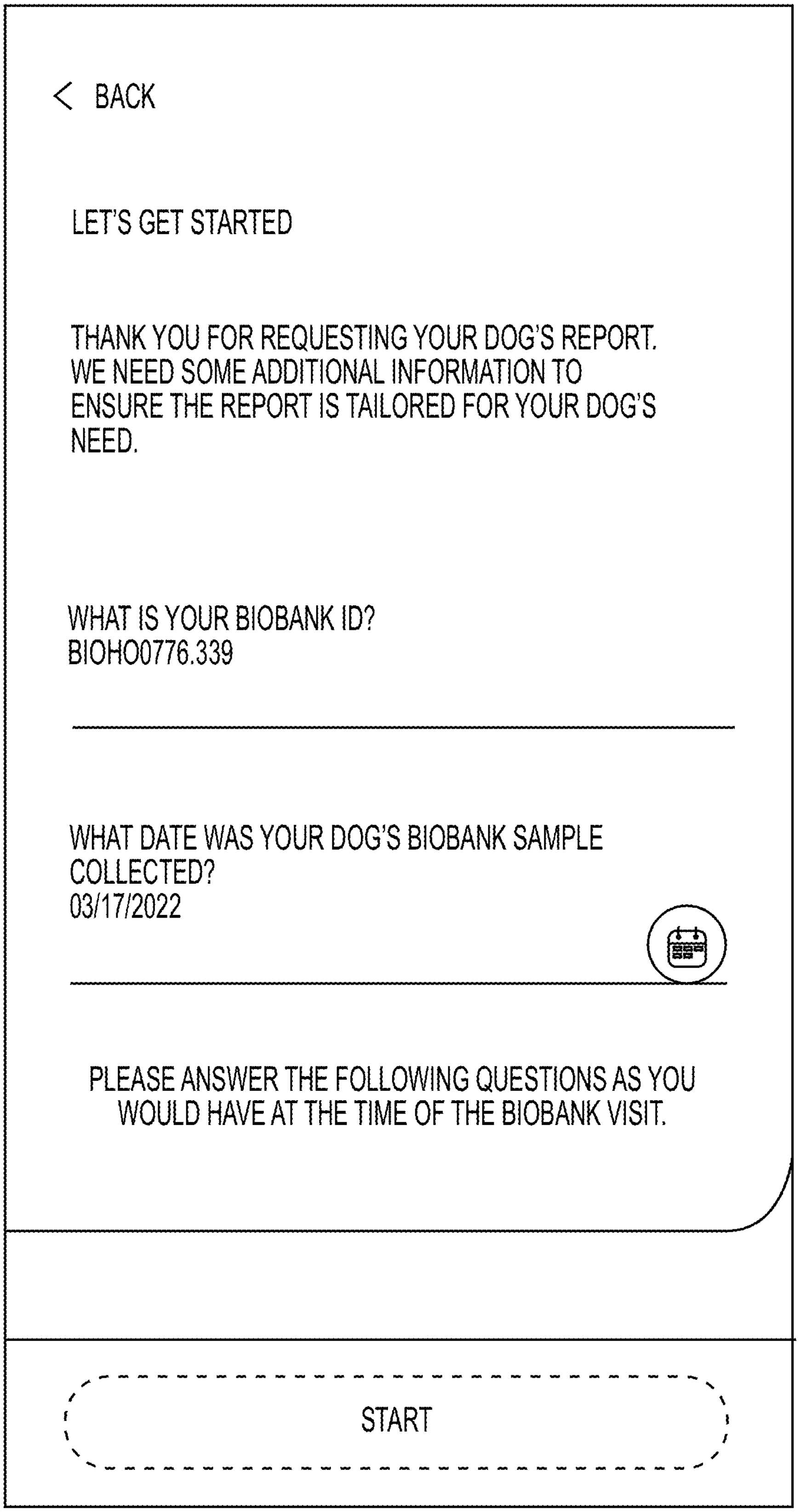
Figure 4F:
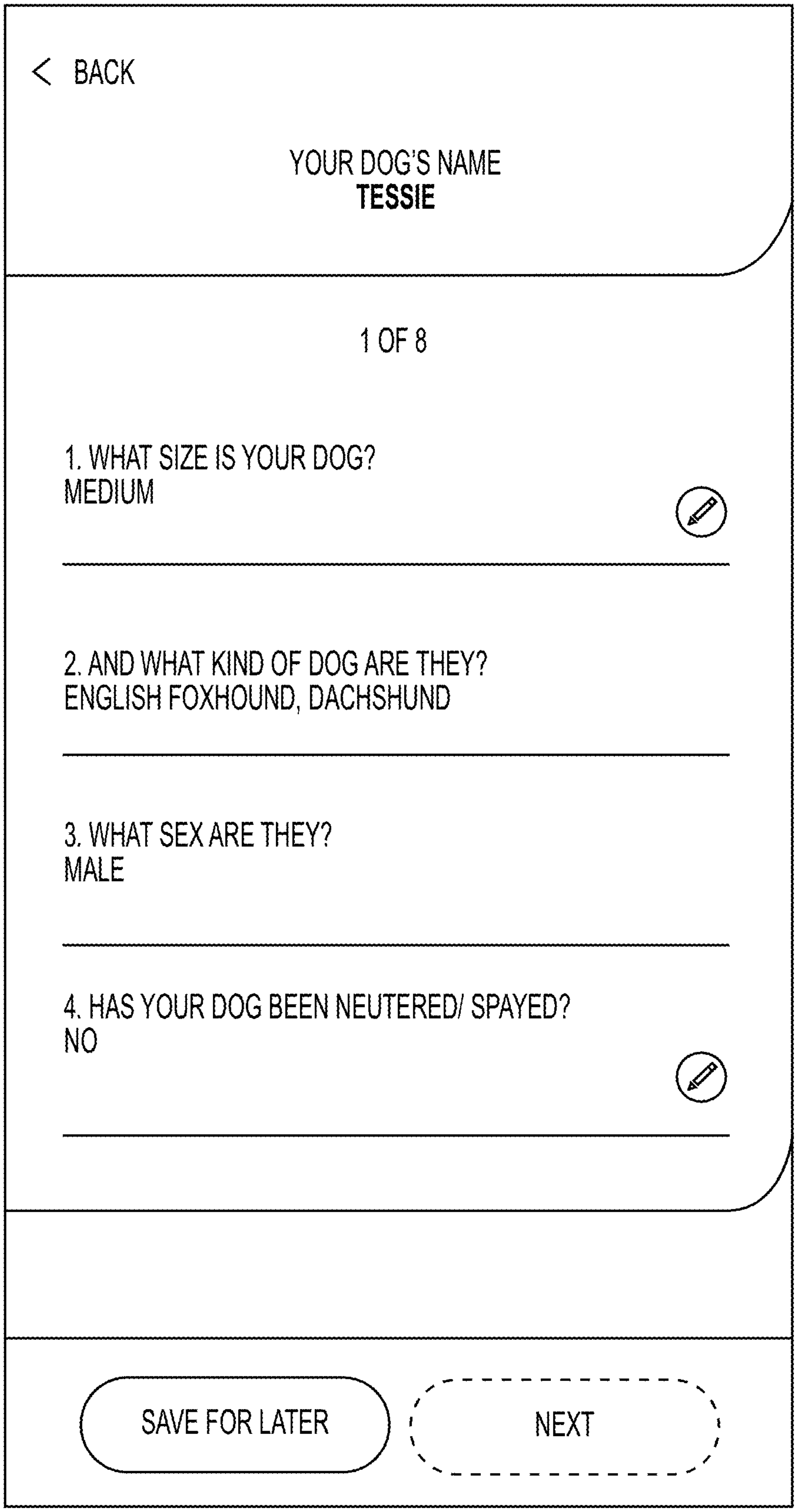
Figure 4G:
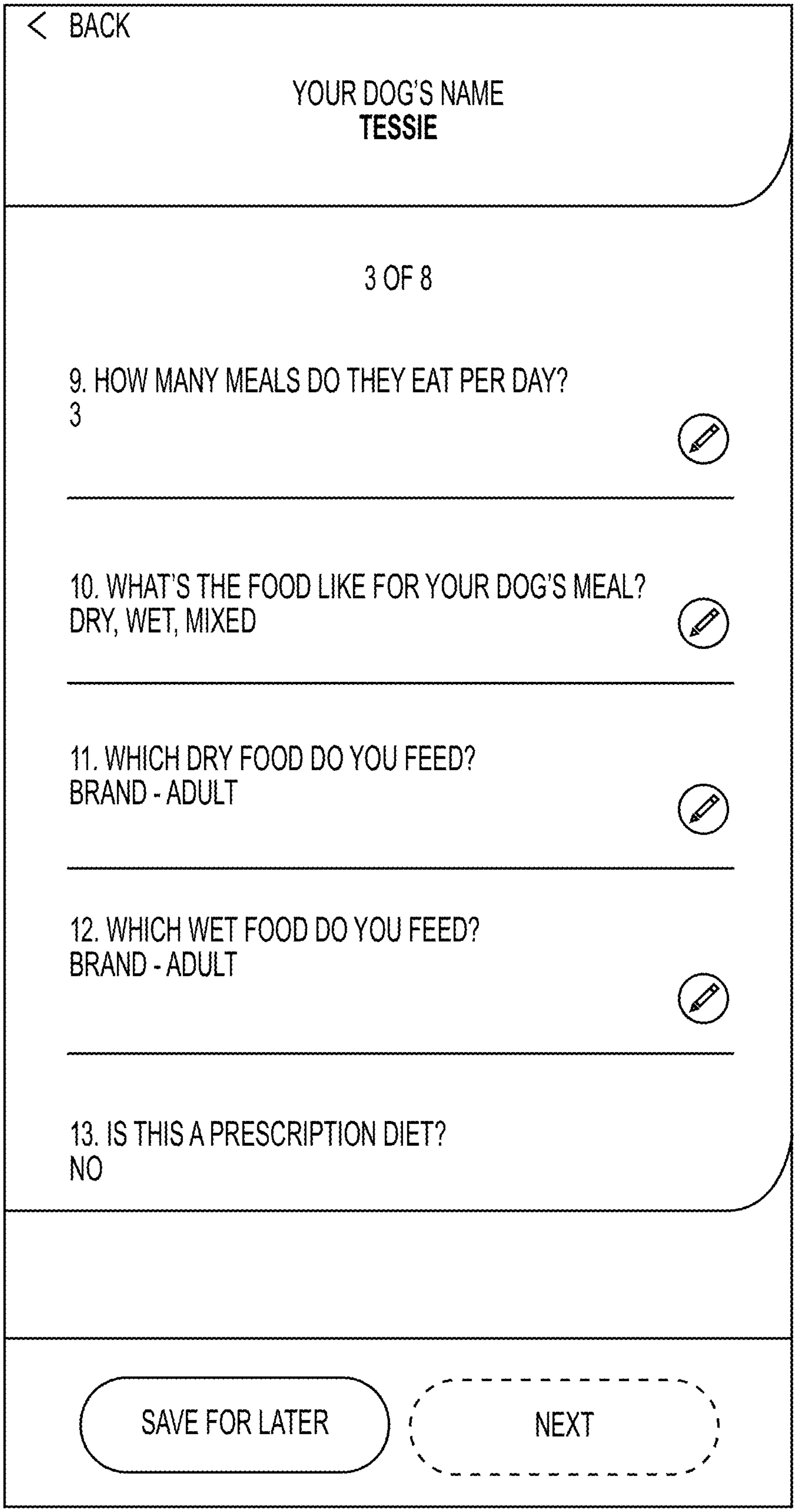

If the user presses "No," indicating that the pet is not on a prescription diet, the platform may inform the user to proceed to the next step, as illustrated in FIG. 4D. The platform may then ask the user to provide additional information to provide the proper pet personalization. For example, as illustrated in FIG. 4E, the platform may ask the user to provide a unique identifier corresponding to the fecal sample (e.g., "BIOHO0776.339"). The platform may also ask the user for the date that the fecal sample was collected (e.g., "Mar. 17, 2022"). Upon entering such information, the user may then select the "Start" button. The platform may then ask the user to provide additional pet details (e.g., pet metadata). Such additional pet details, as illustrated in FIGS. 4F and 4G, may include, but may not be limited to, the size of the pet (e.g., "Medium"), the kind of pet (e.g., "English Foxhound, Dachshund"), the sex of the pet (e.g., "Male"), whether the pet has been neutered/spayed (e.g., "No"), how many meals the pet eats per day (e.g., "3"), the food type for each meal ("Dry, Wet, Mixed"), the type of dry food fed to the pet (e.g., "Brand—Adult"), and/or the type of wet food fed to the pet (e.g., "Brand—Adult").

Figure 4H:
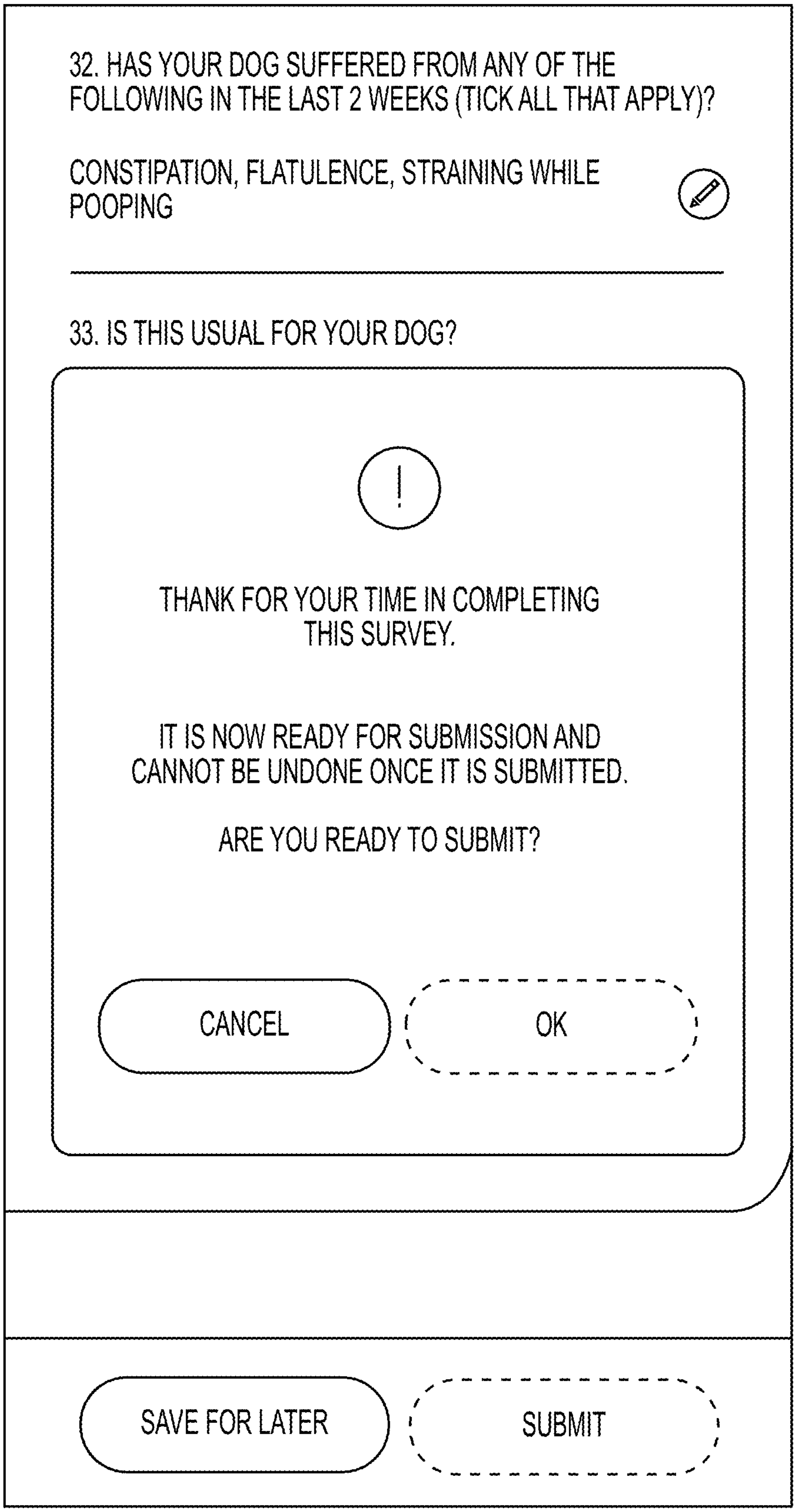
Figure 4I:
Figure 4J:
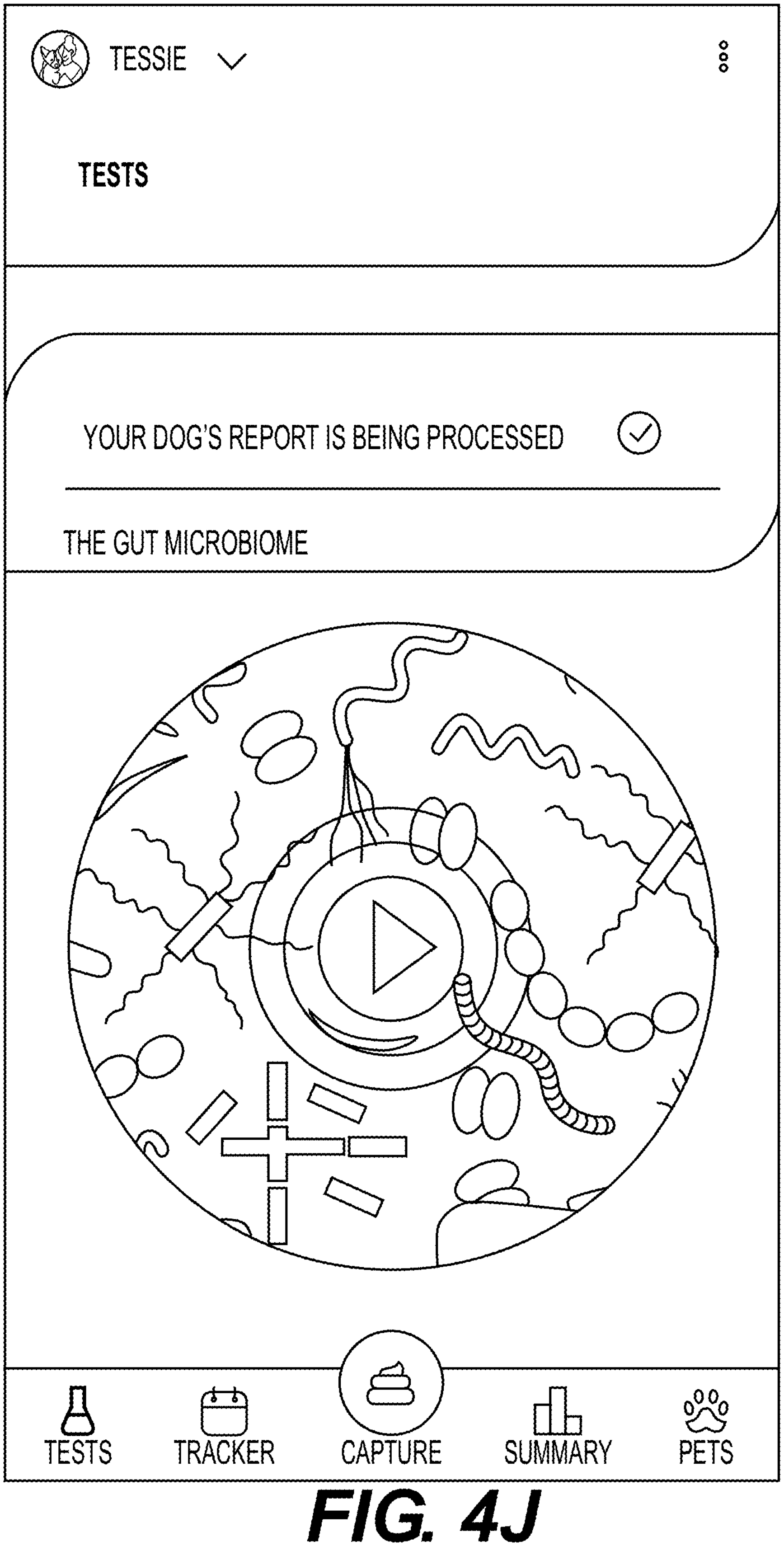

Upon the user pressing the "Next" button, the platform may ask the user if the user is ready to submit the information submission (e.g., "survey"), as illustrated in FIG. 4H. In response to the user pressing the "Ok" button, the platform may display a notification (e.g., "Thank you! We will notify you by email once your dog's report is ready."), as illustrated in FIG. 4I. The platform may display an indicator stating that the report is being processed (e.g., "Your dog's report is being processed."), as illustrated in FIG. 4J.

Figure 5A:
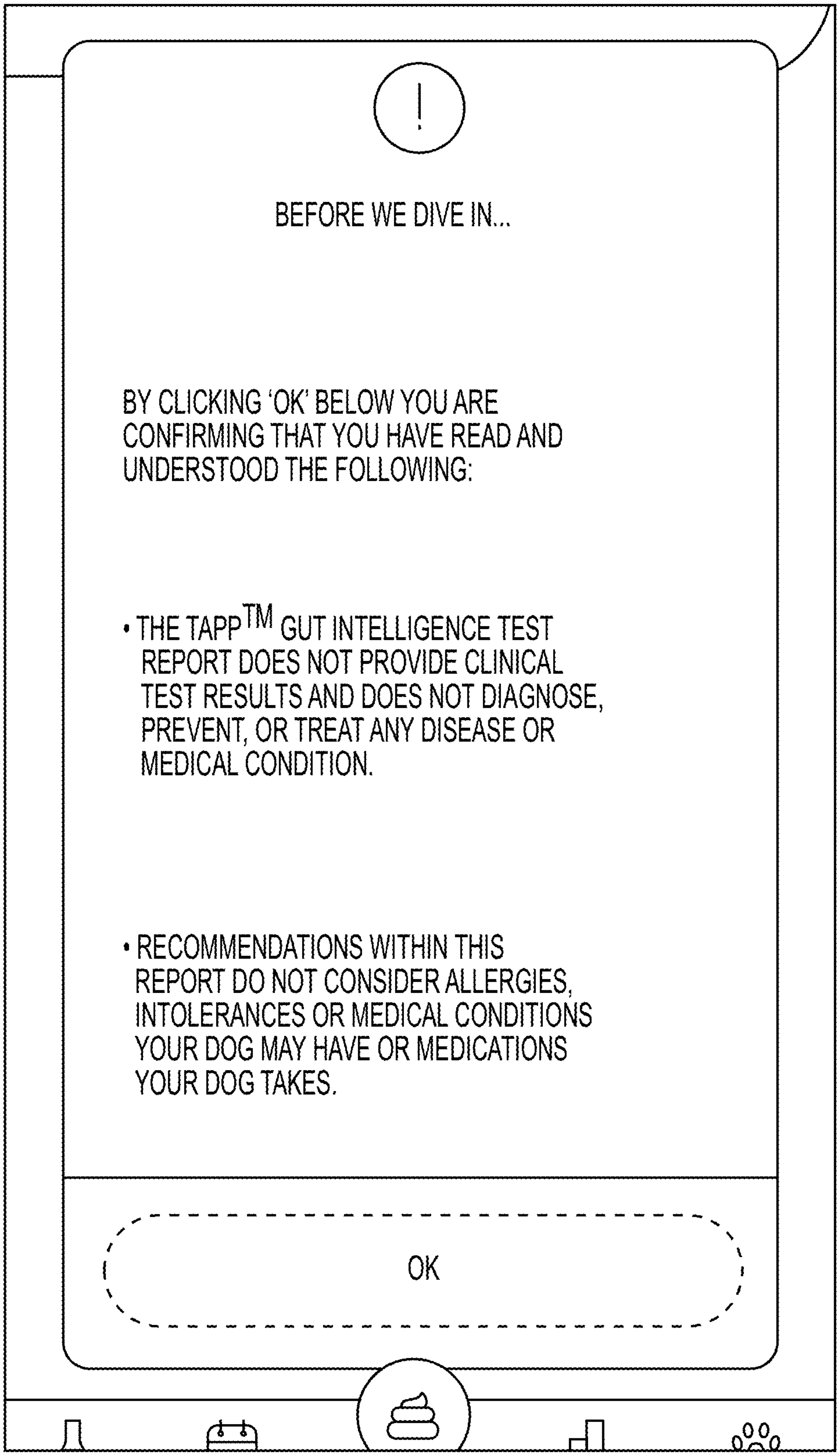
FIGS. 5A-5JJ describe exemplary environments of a platform for analyzing a pet fecal sample and displaying corresponding results, according to one or more embodiments.

FIGS. 5A-LL describe exemplary environments of a platform for gathering, analyzing, and displaying results corresponding to a pet's fecal sample, according to one or more embodiments.

Figure 5B:

As illustrated in FIG. 5A, the platform may display particular disclaimers and/or terms and conditions to the user. Upon the user indicating the user's acknowledgment (e.g., by pressing the "Ok" button), the platform may display a "Gut Intelligence Report," as illustrated in FIGS. 5B-LL.

Figure 5C:
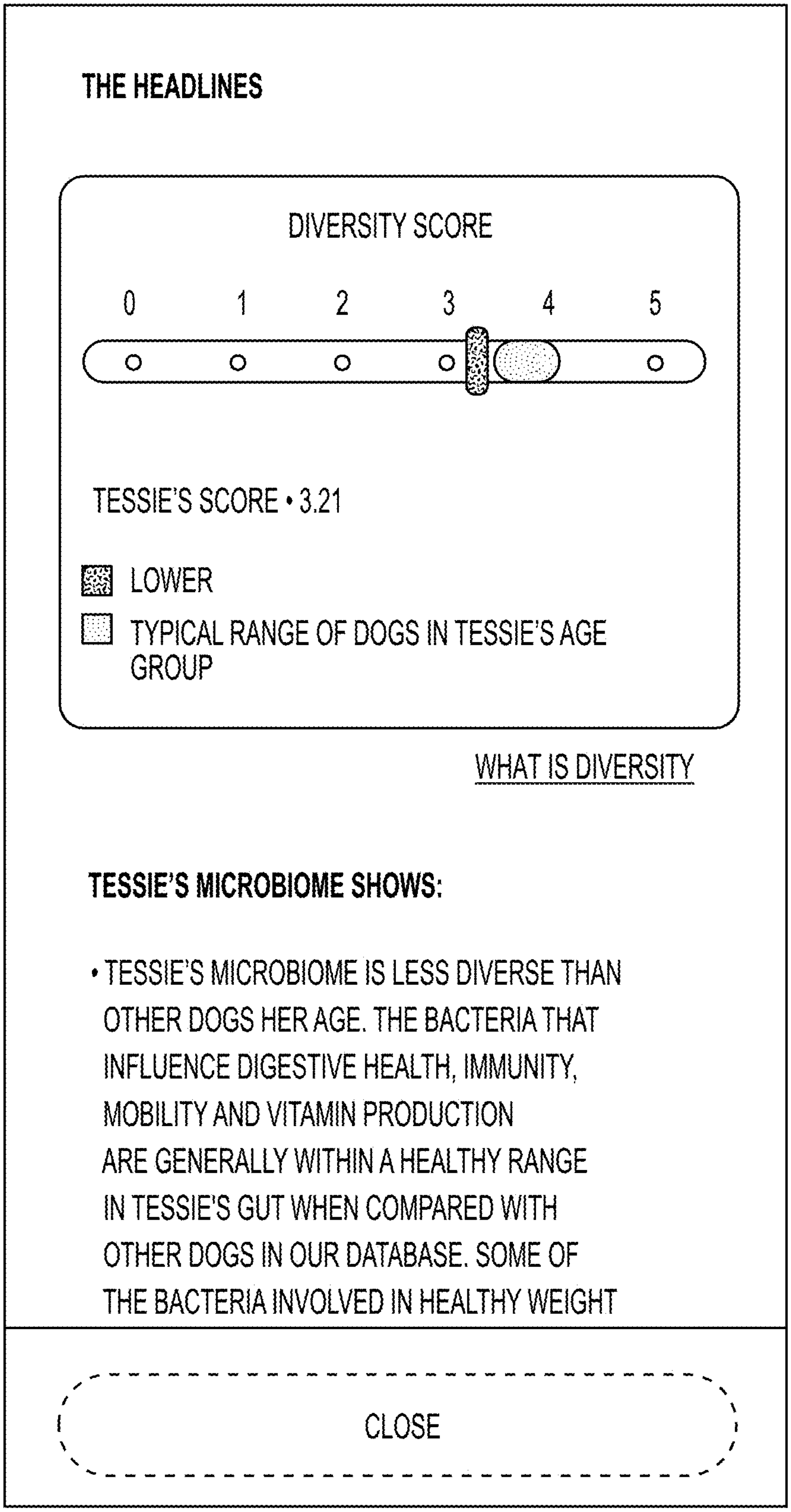
Figure 5E:
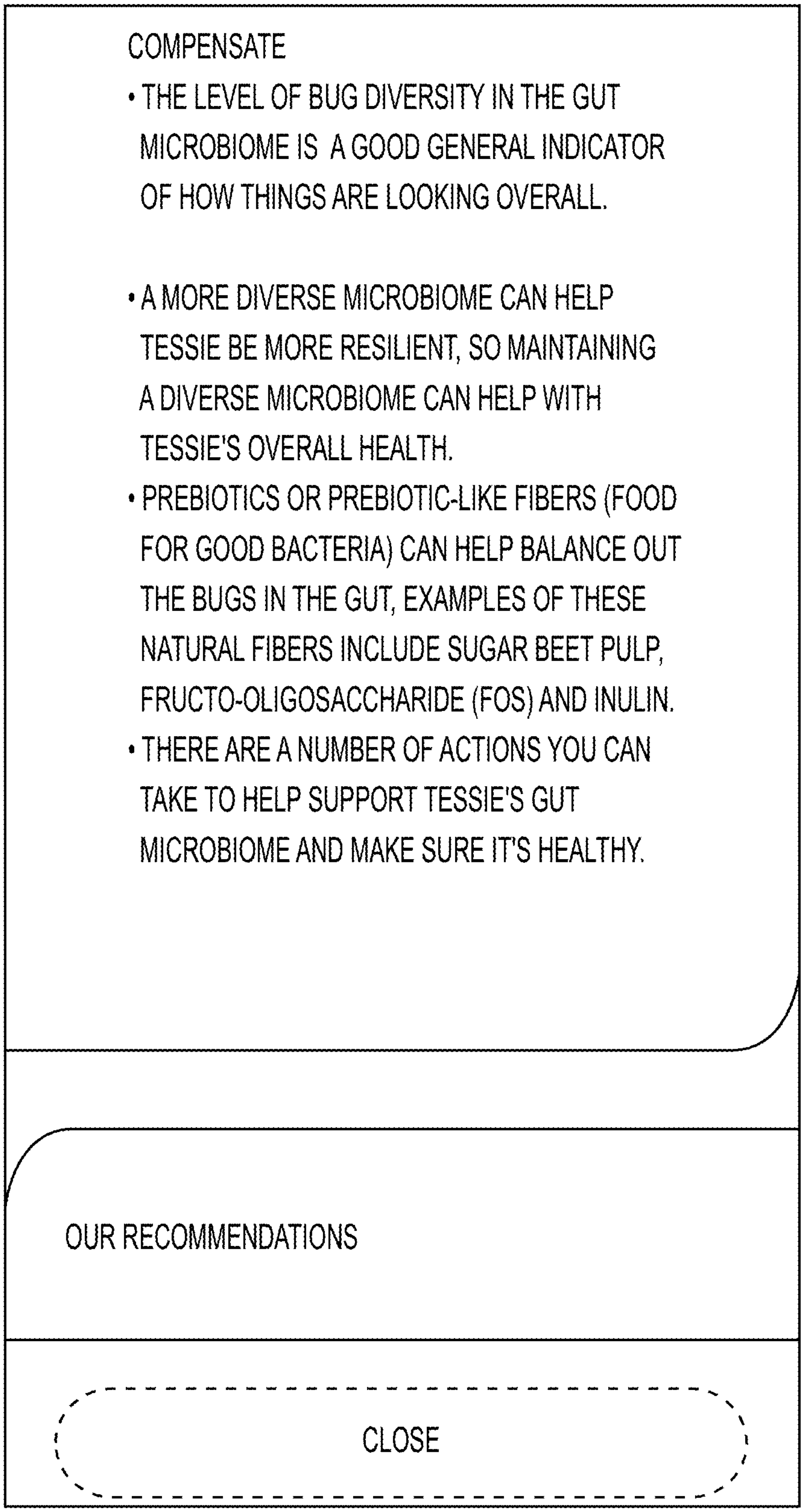
Figure 5F:
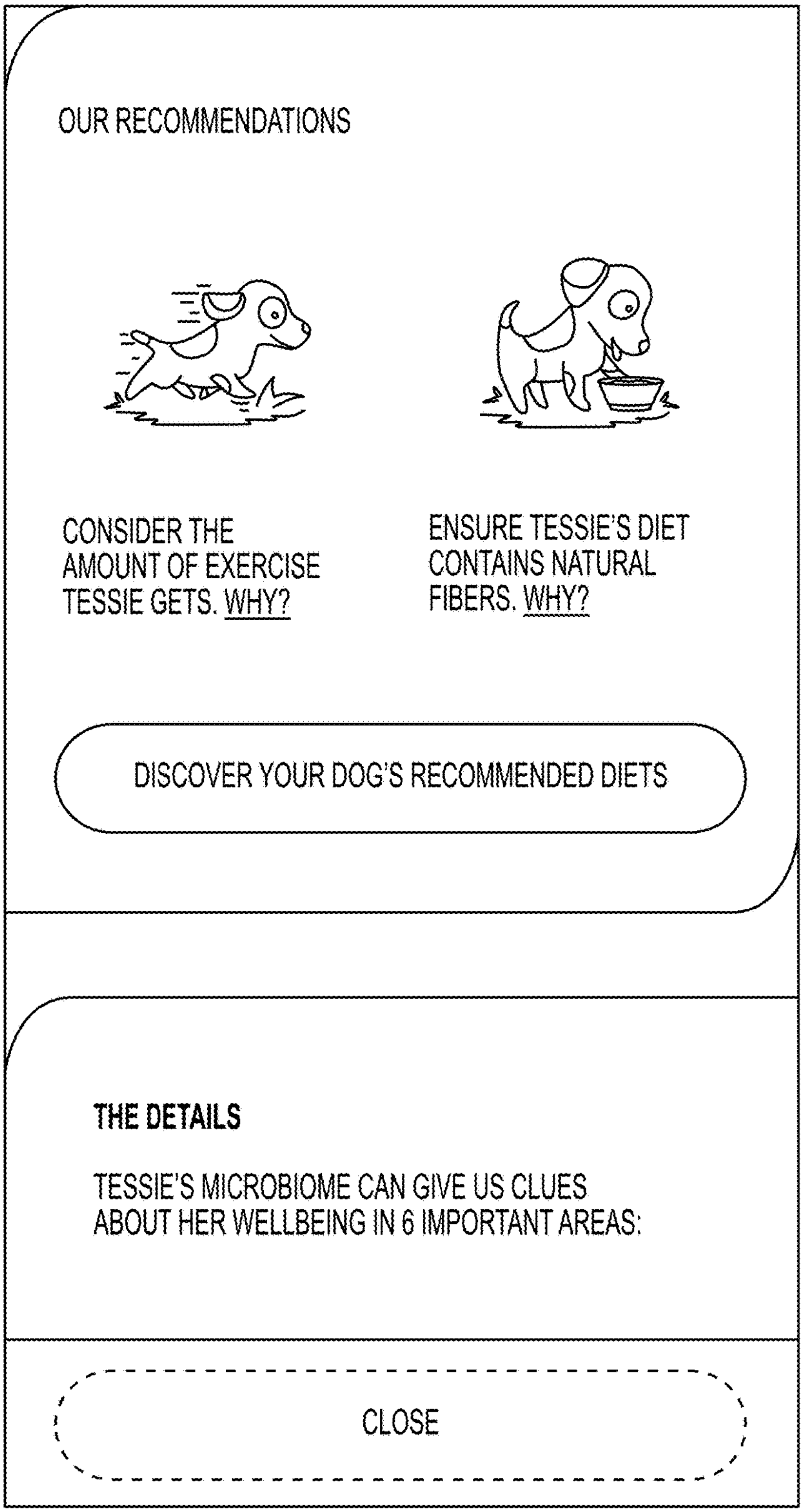
Figure 5G:
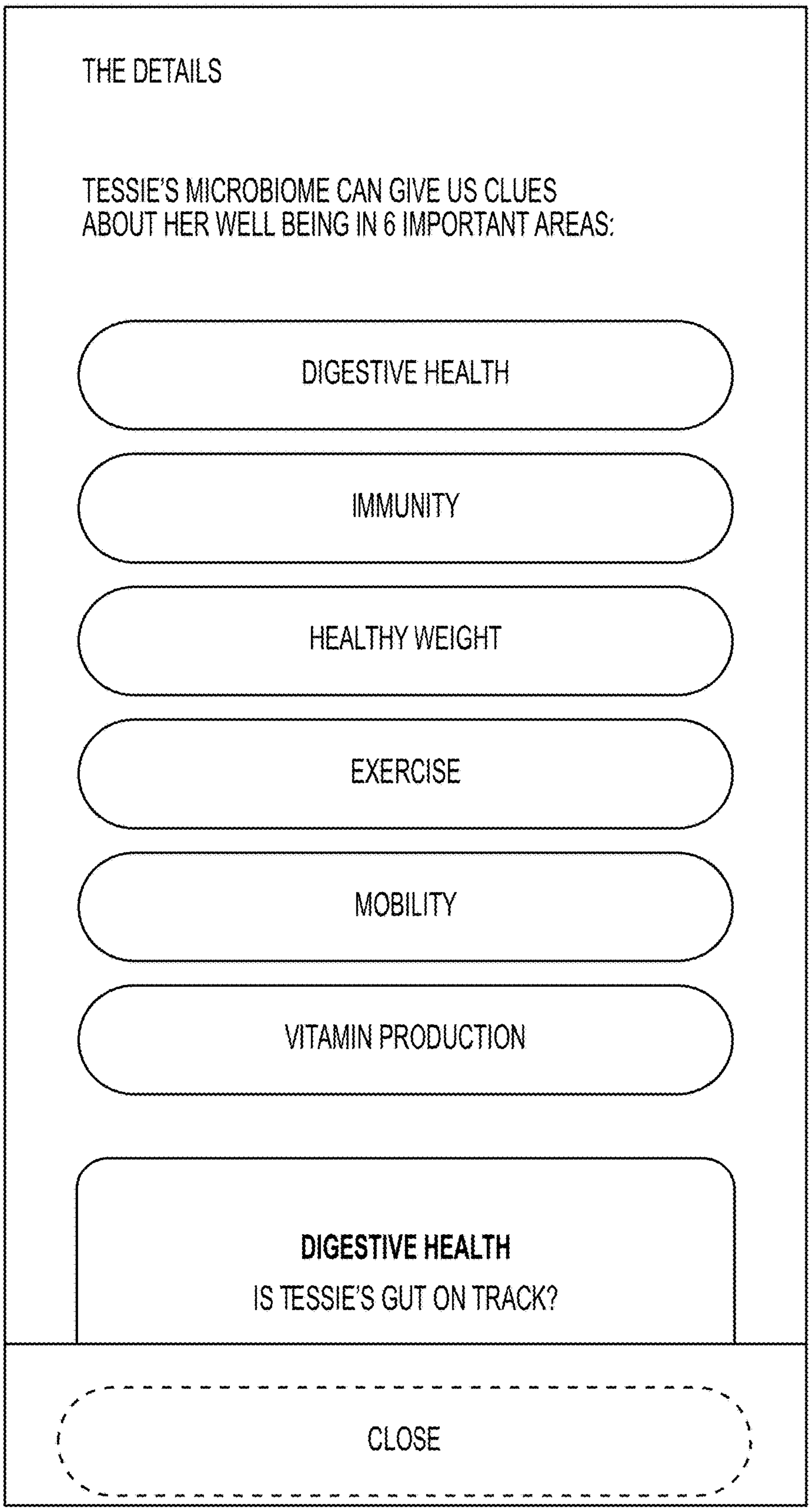
Figure 5H:
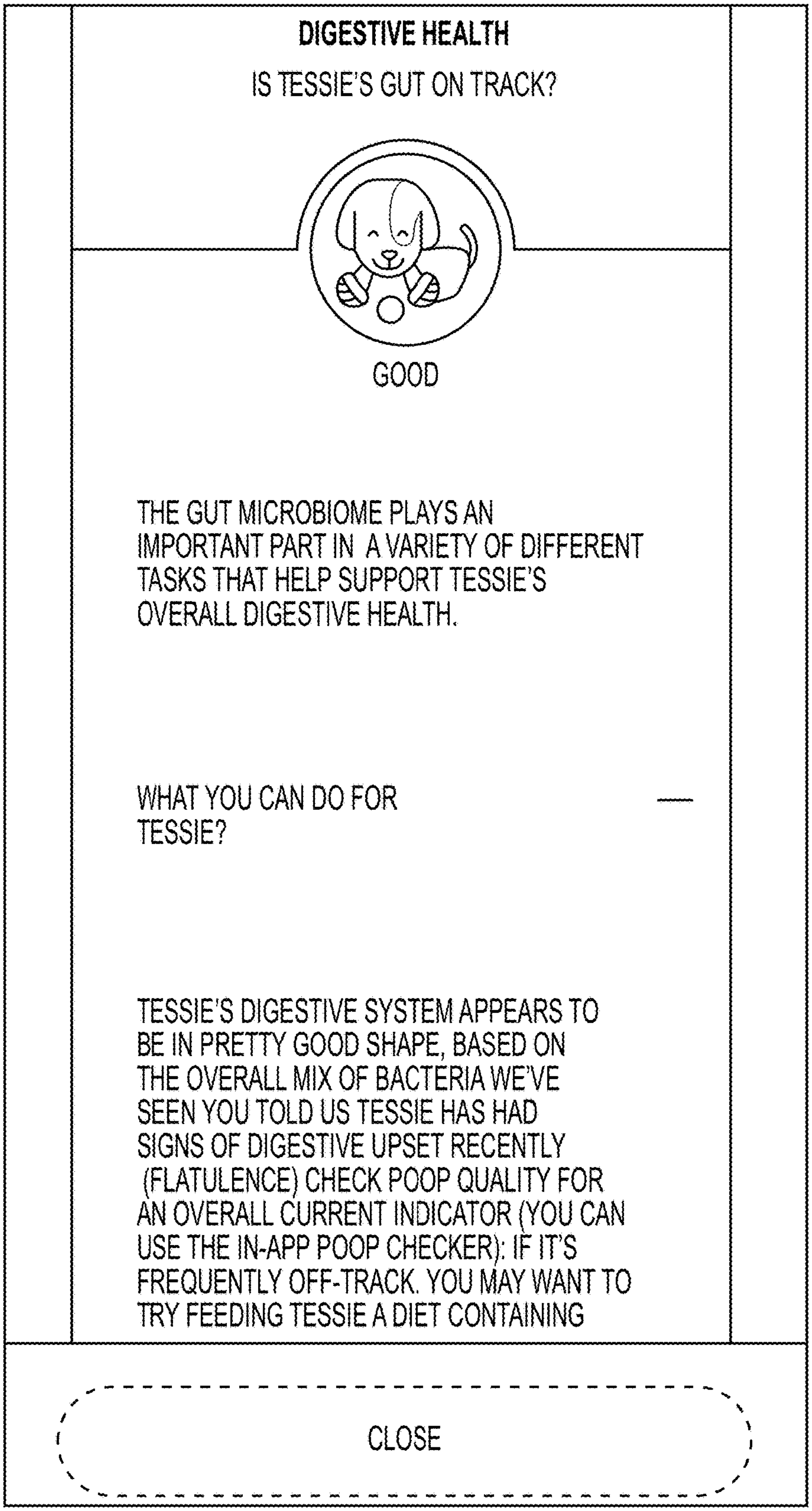
Figure 5I:
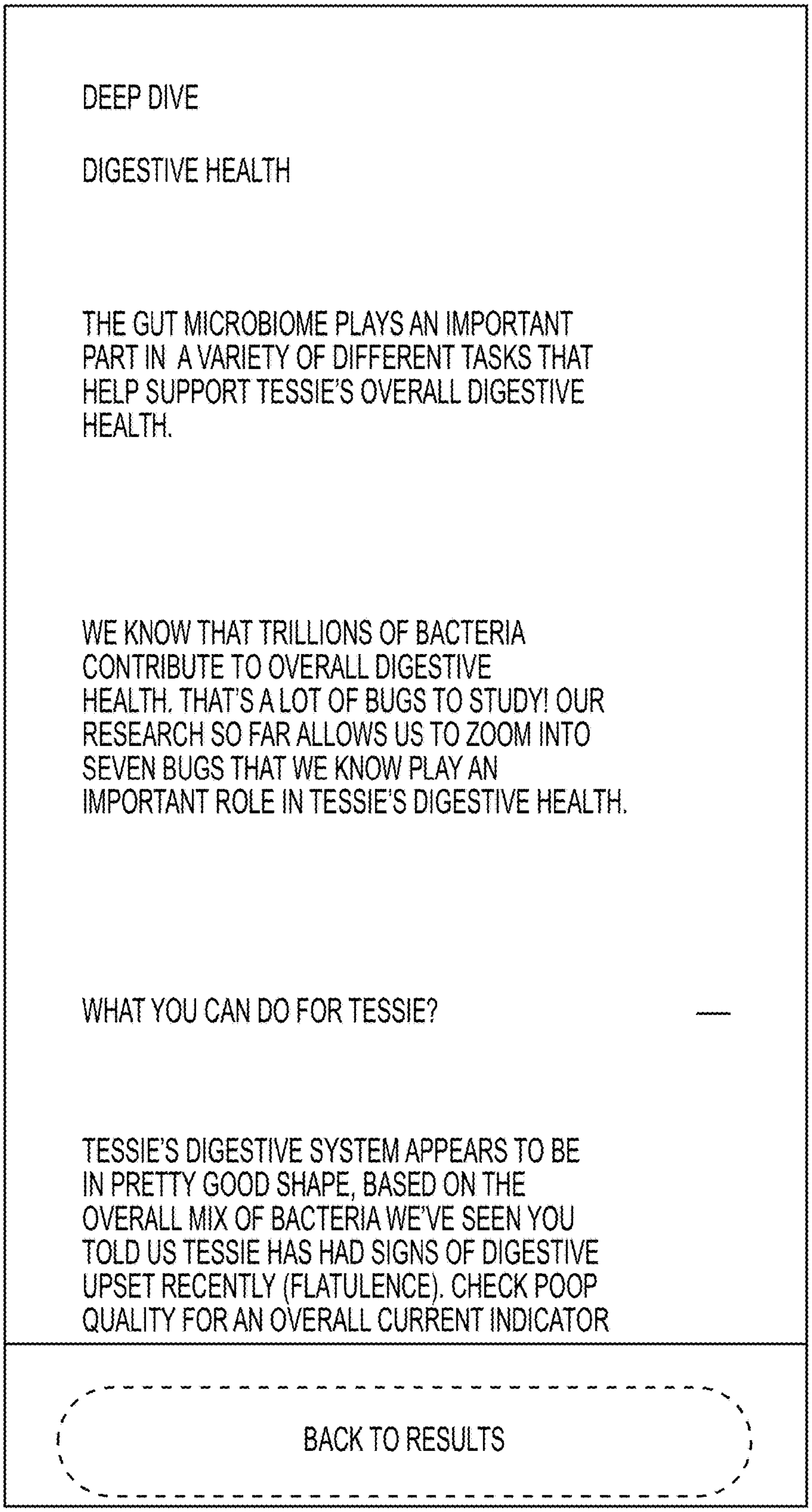
Figure 5J:
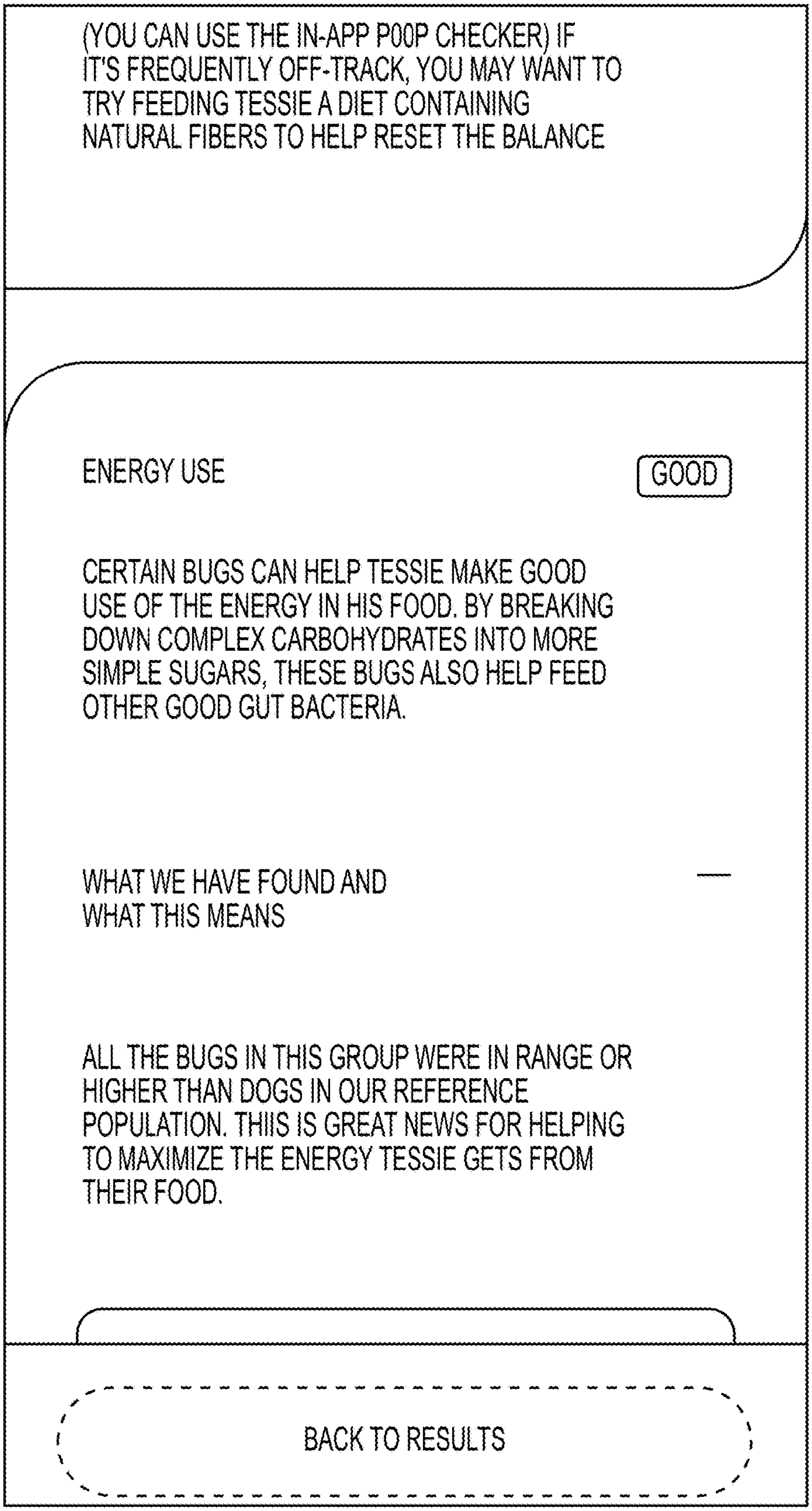
Figure 5K:
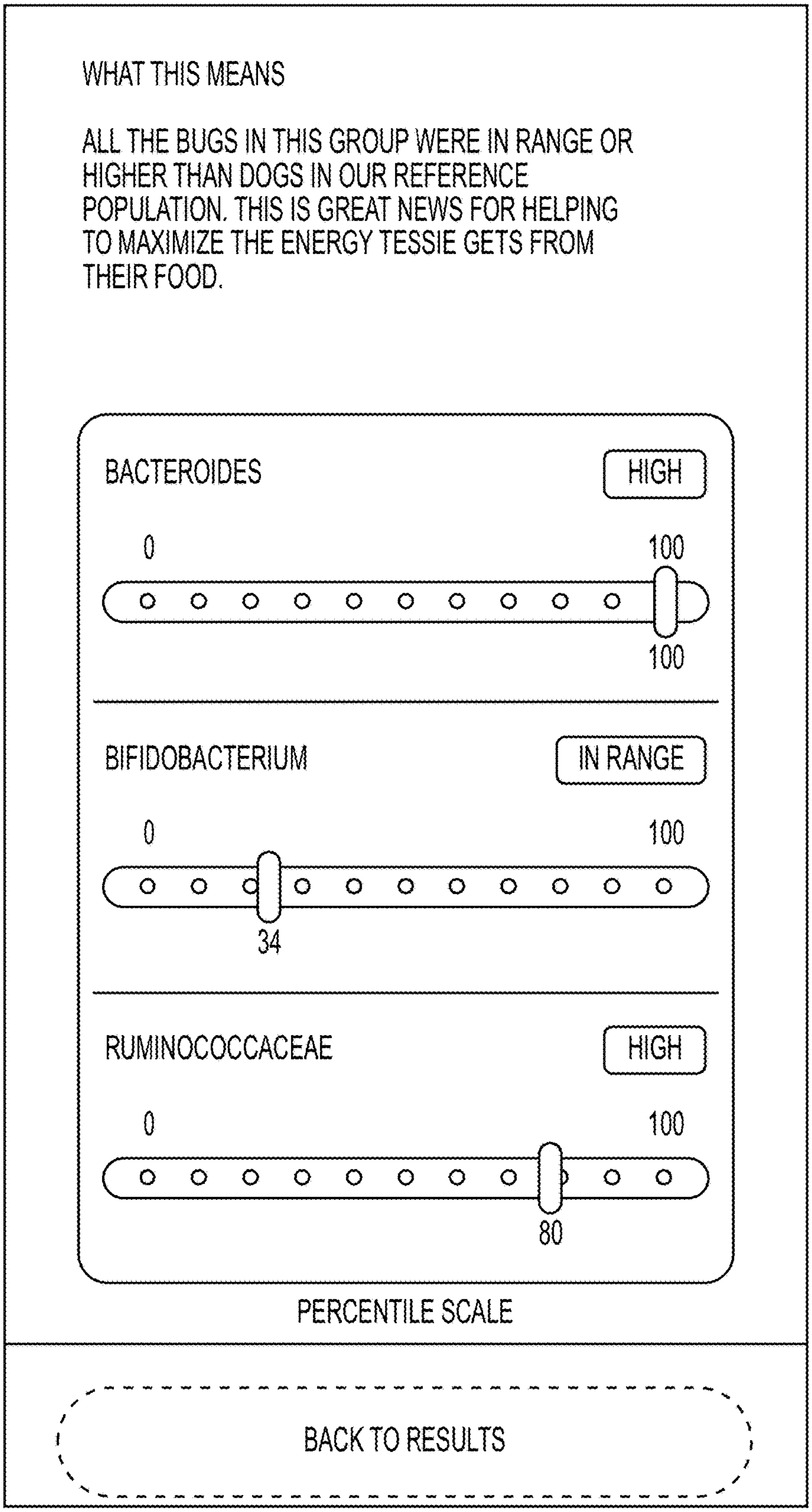
Figure 5L:
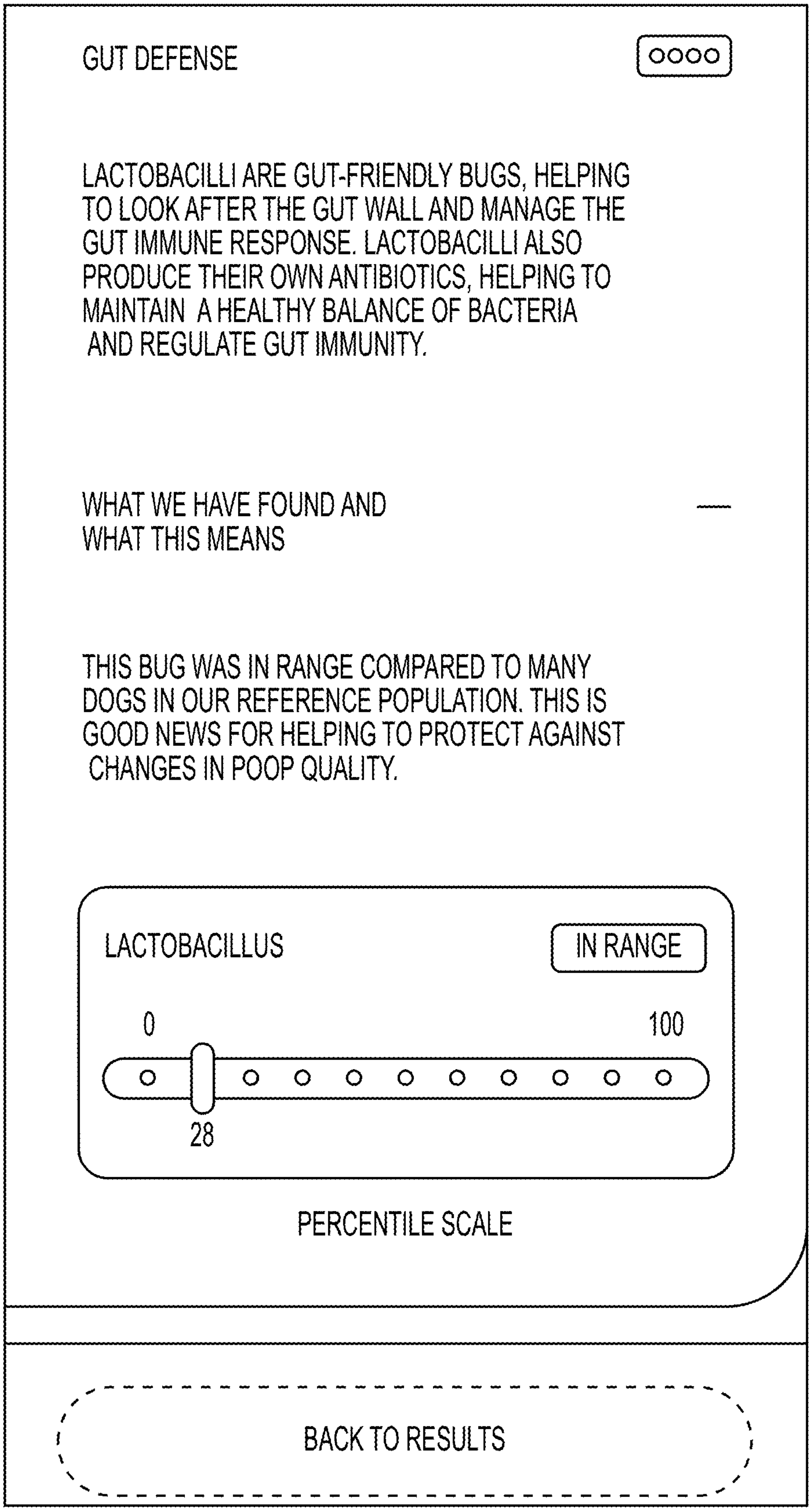
Figure 5M:
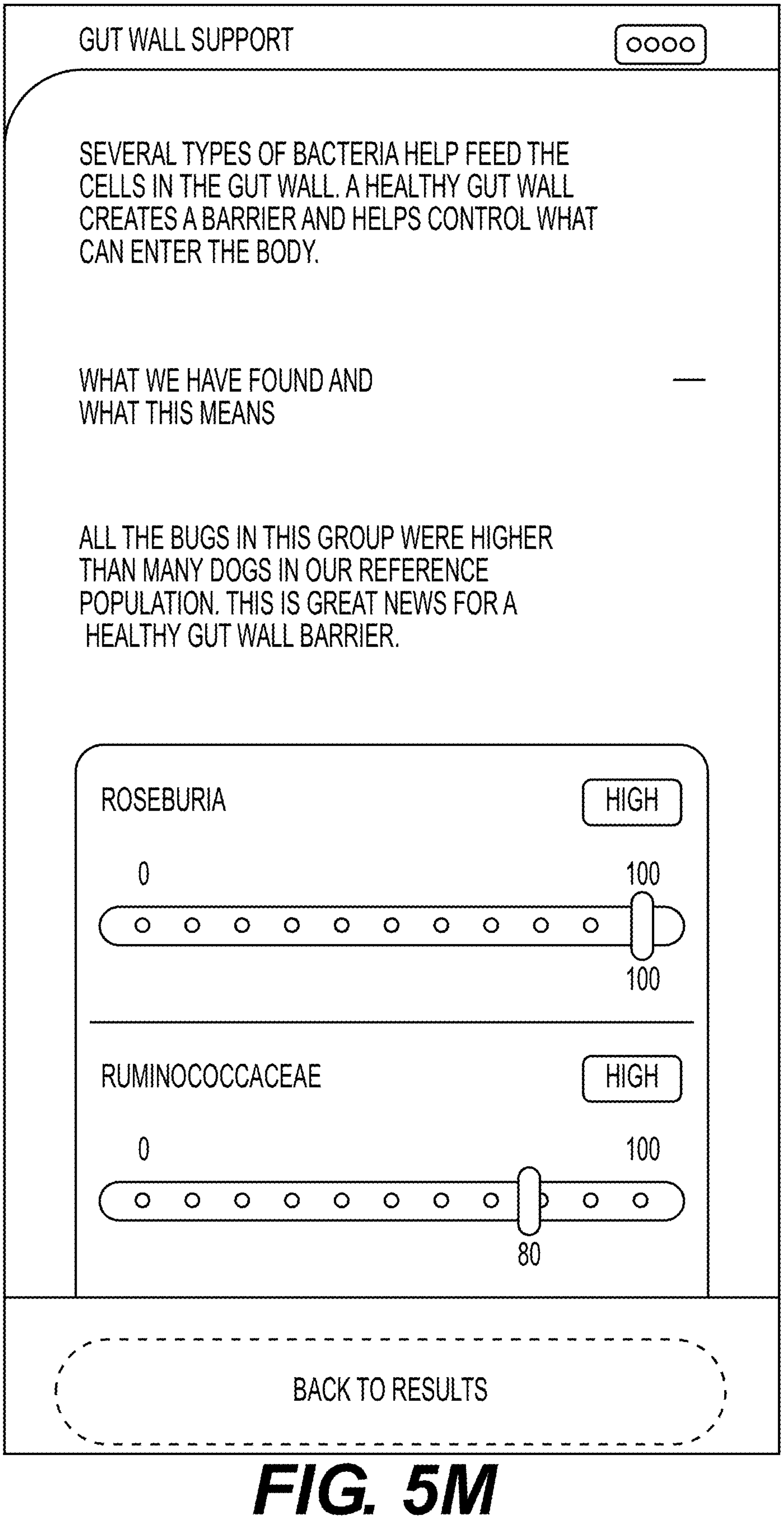
Figure 5N:
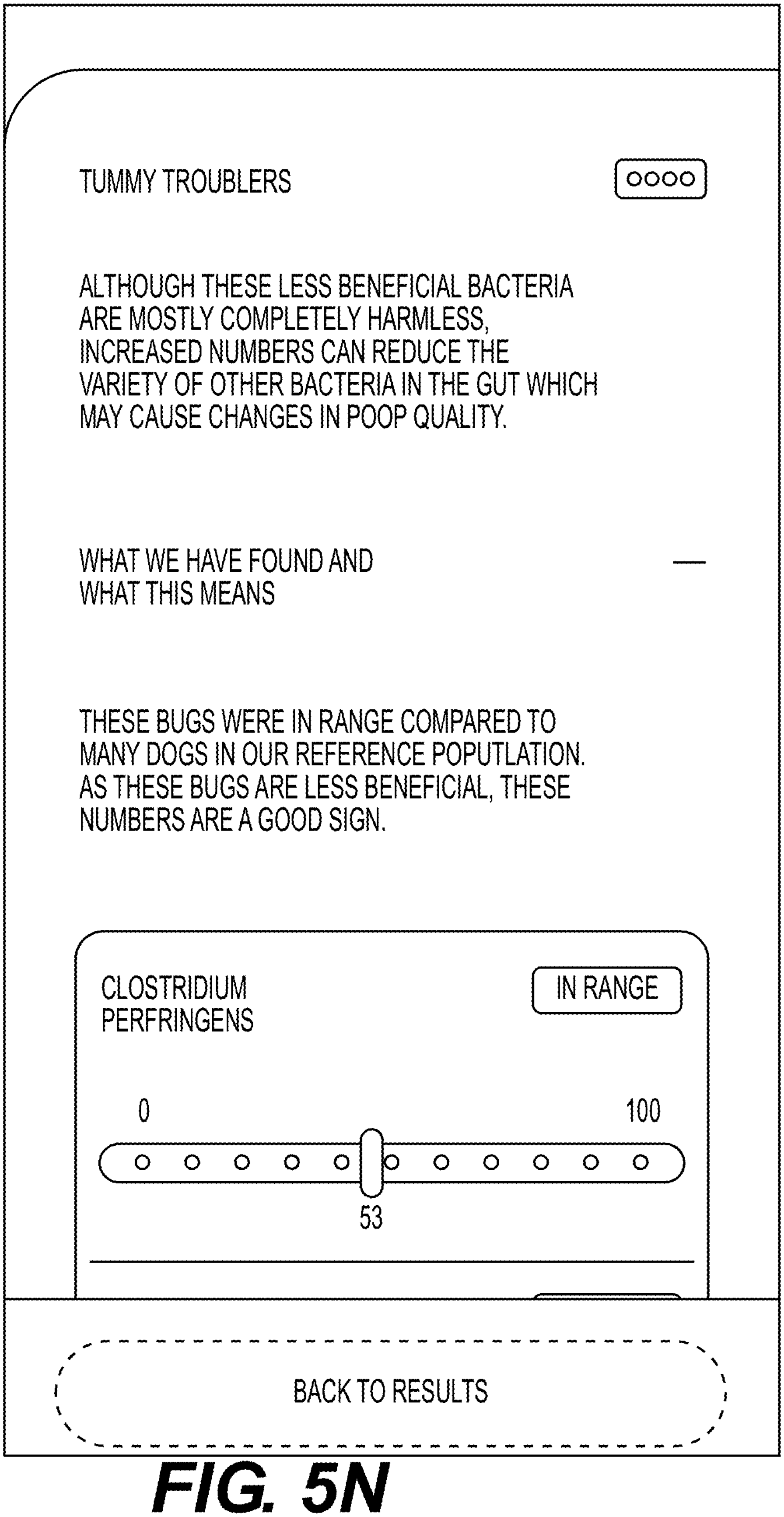
Figure 5O:
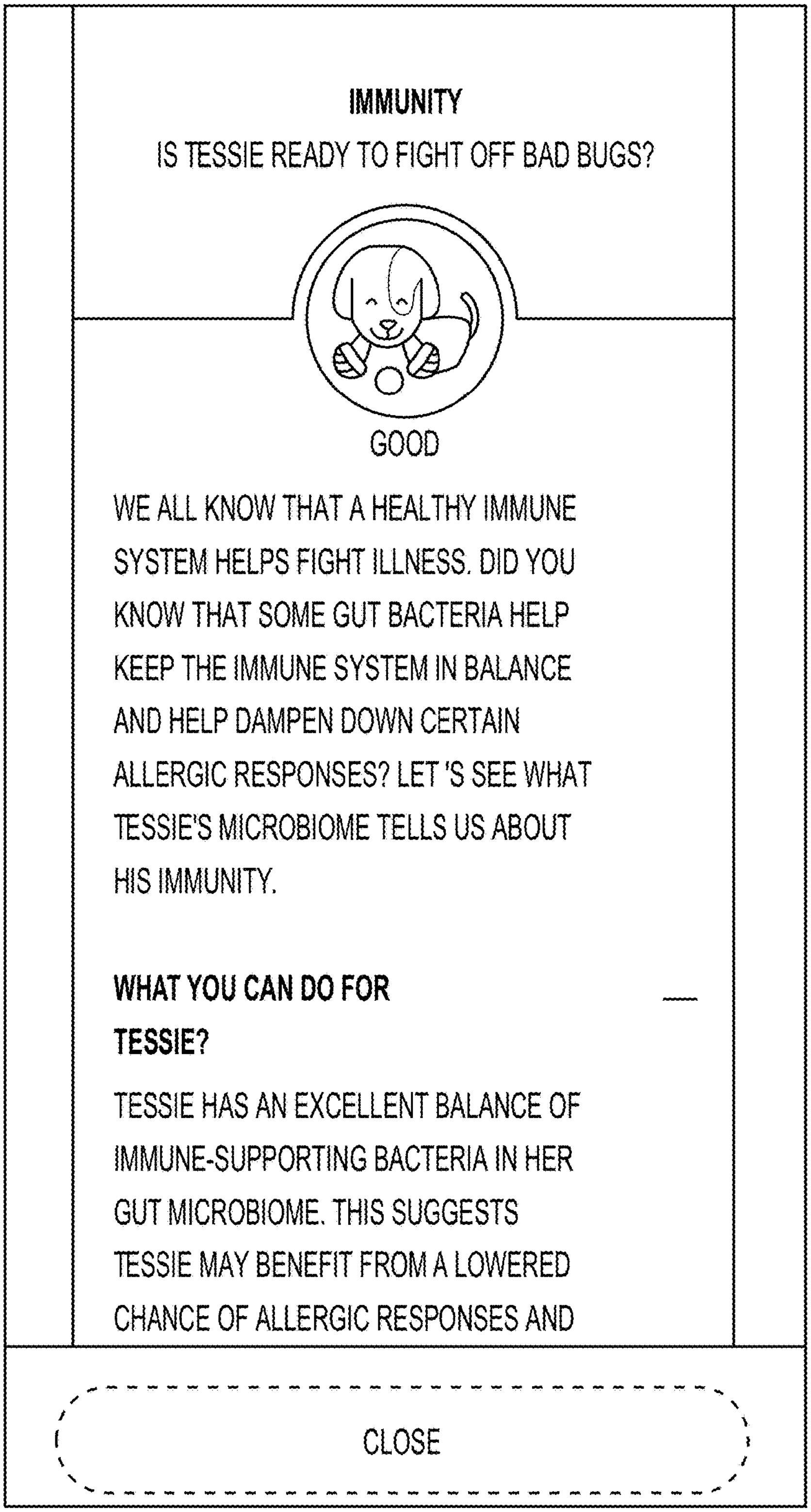
Figure 5P:
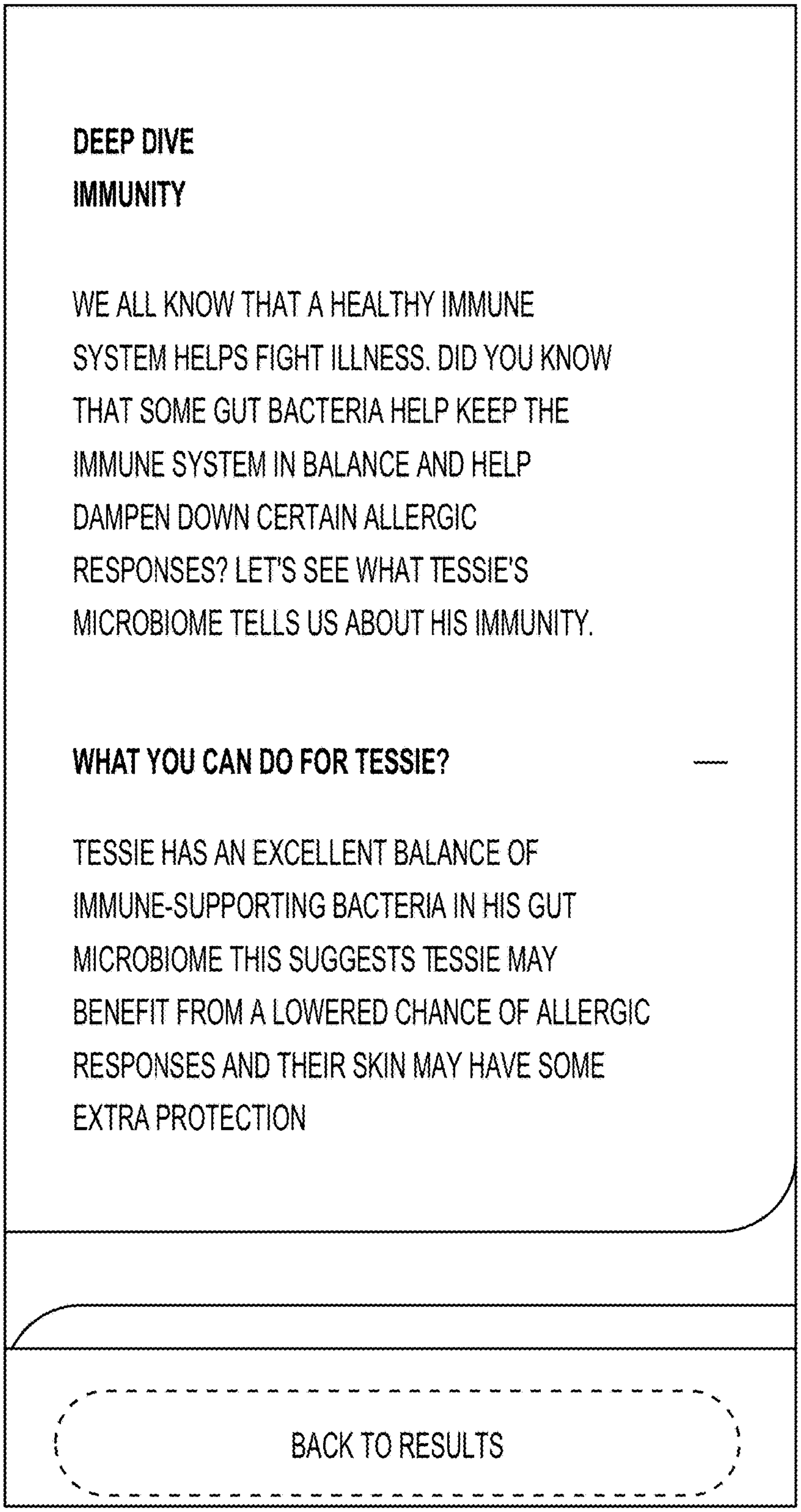
Figure 5Q:
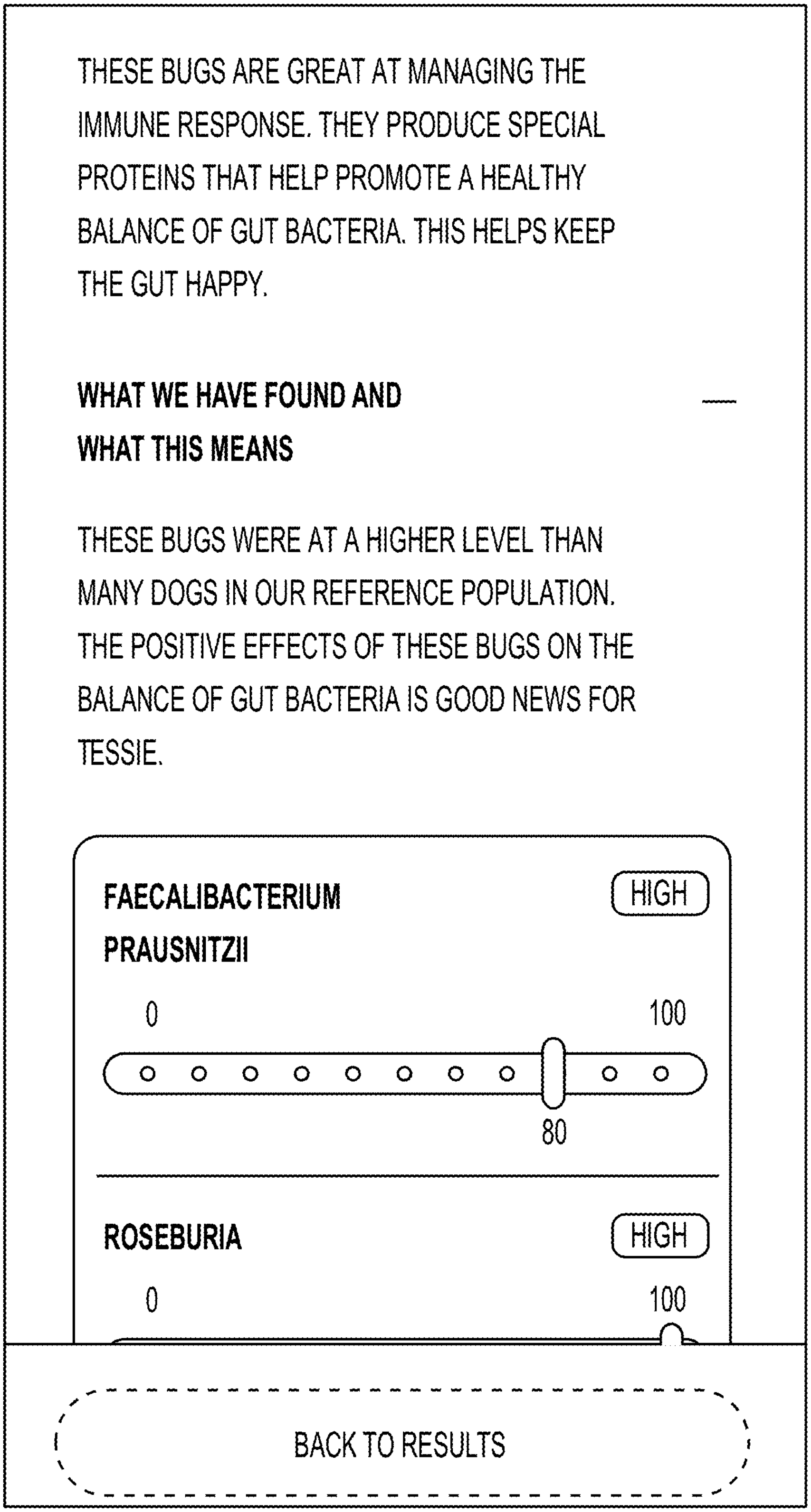
Figure 5R:
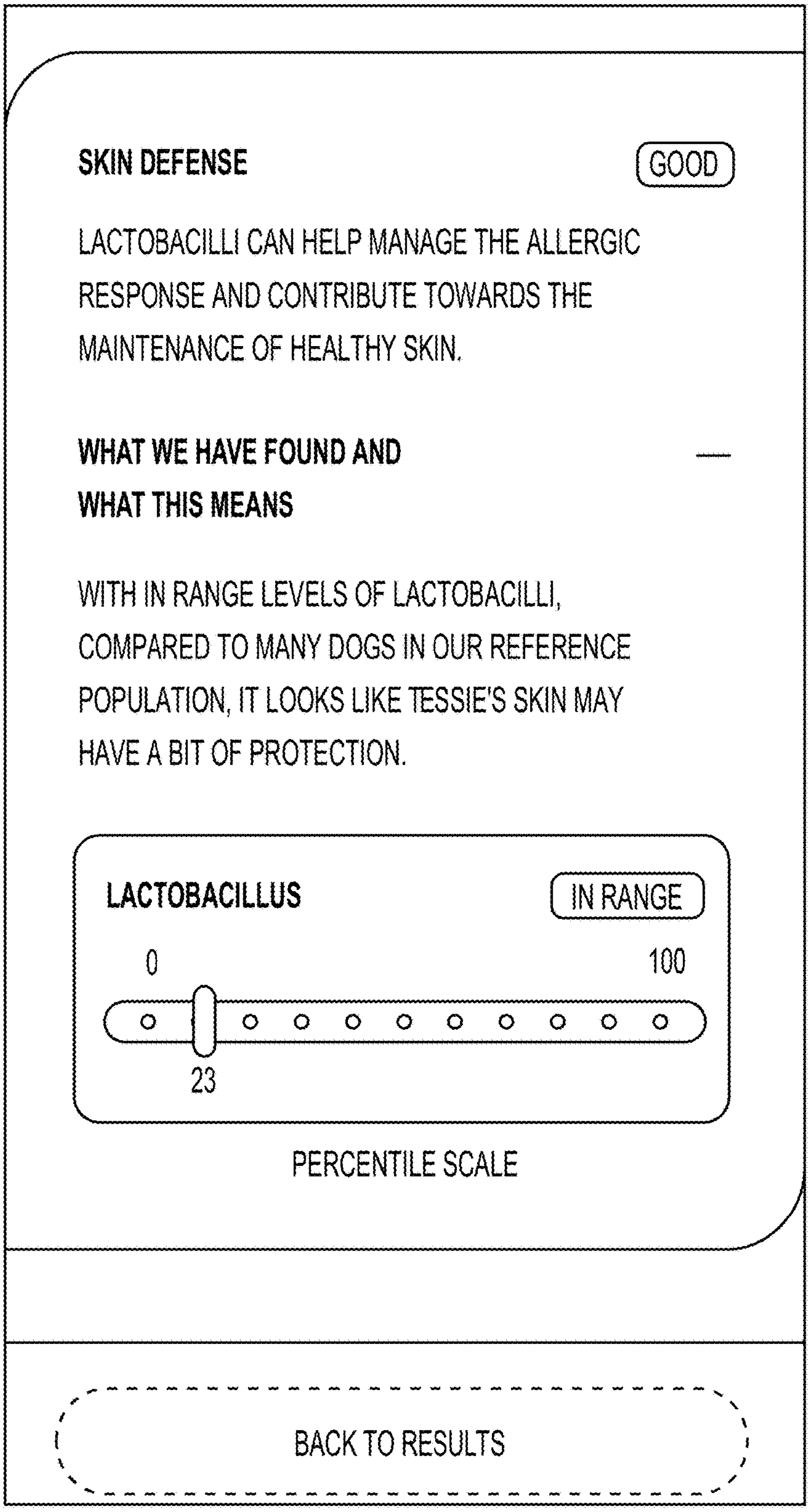
Figure 5S:
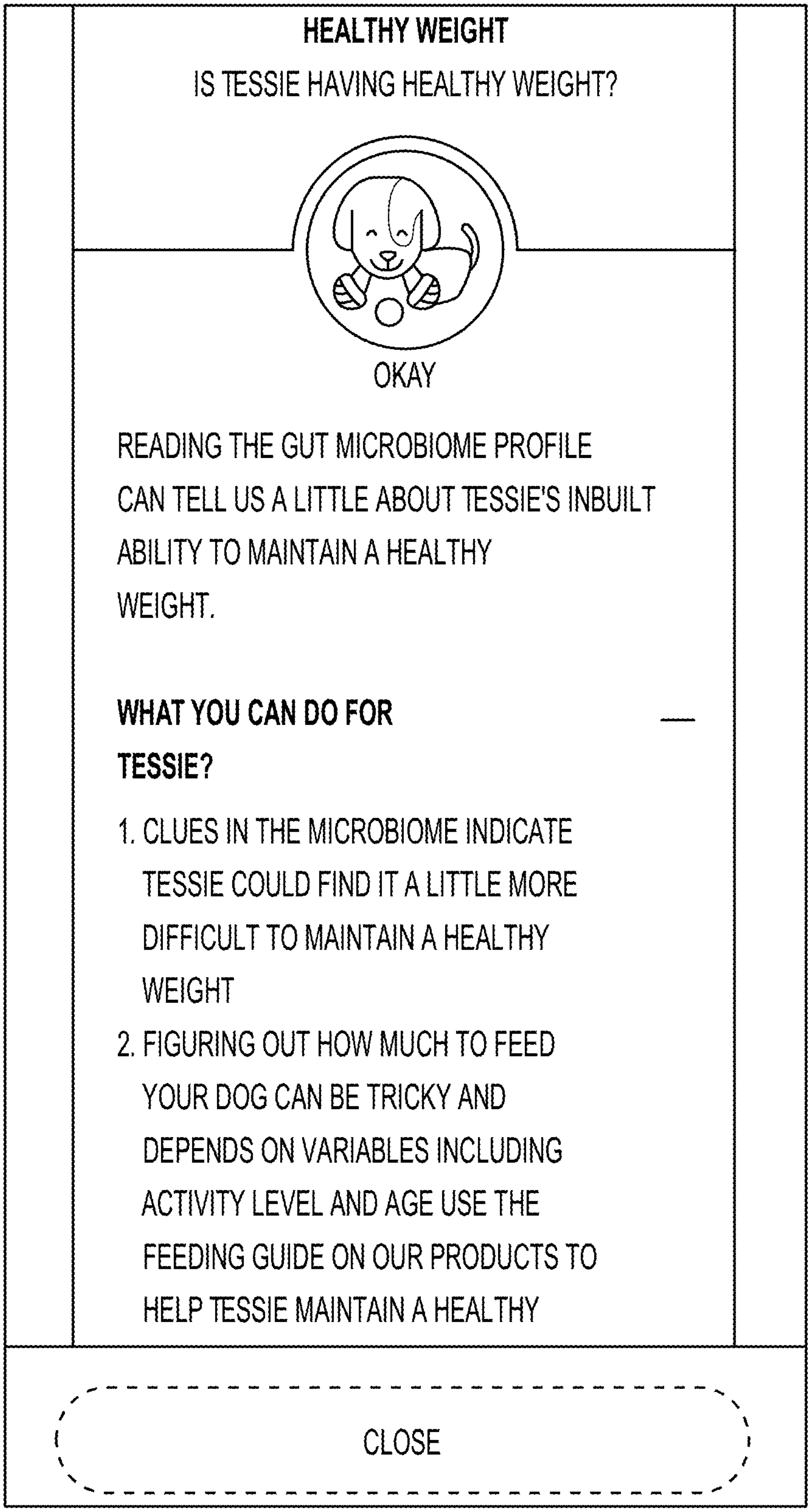
Figure 5T:
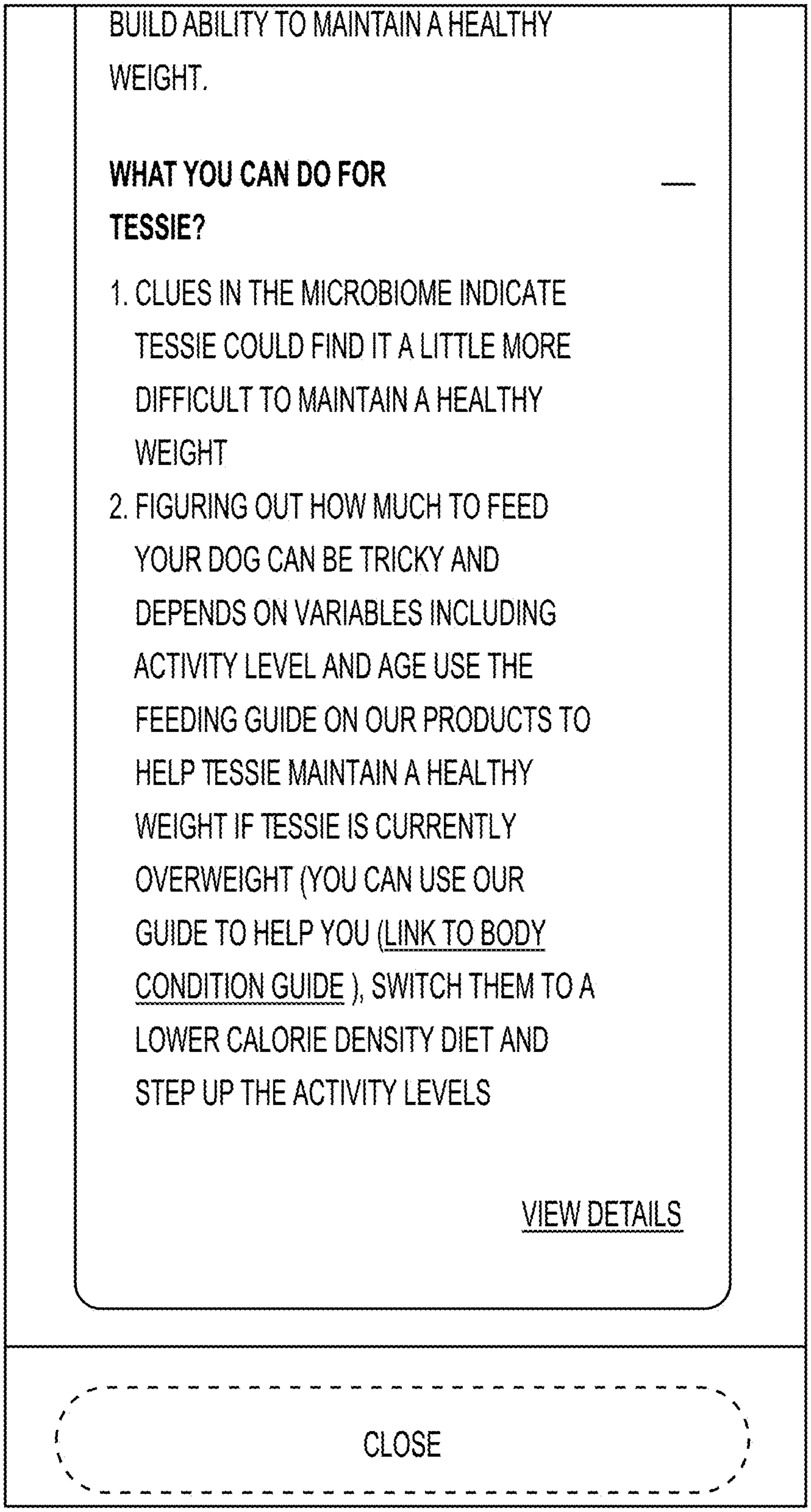
Figure 5W:
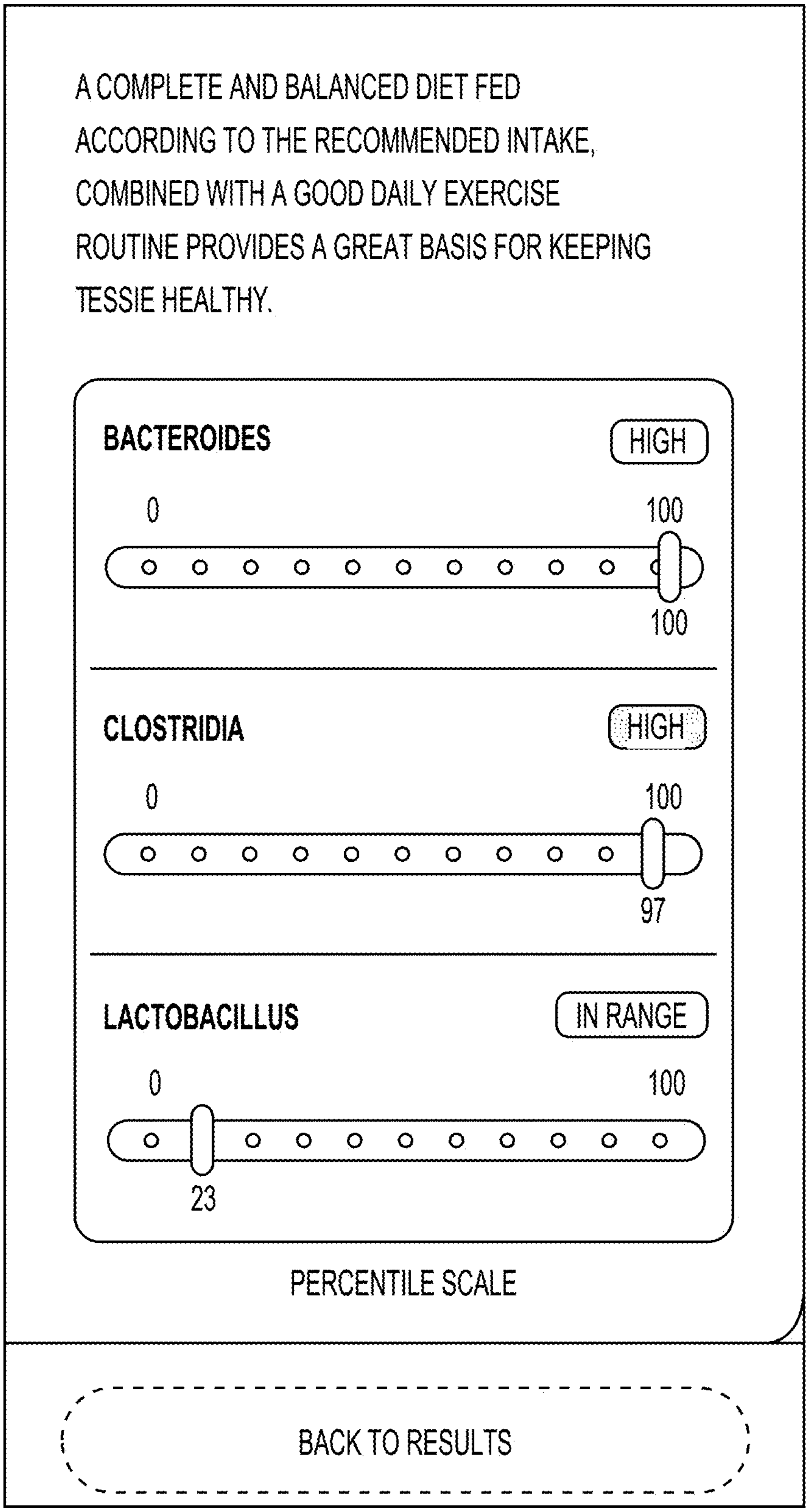
Figure 5X:
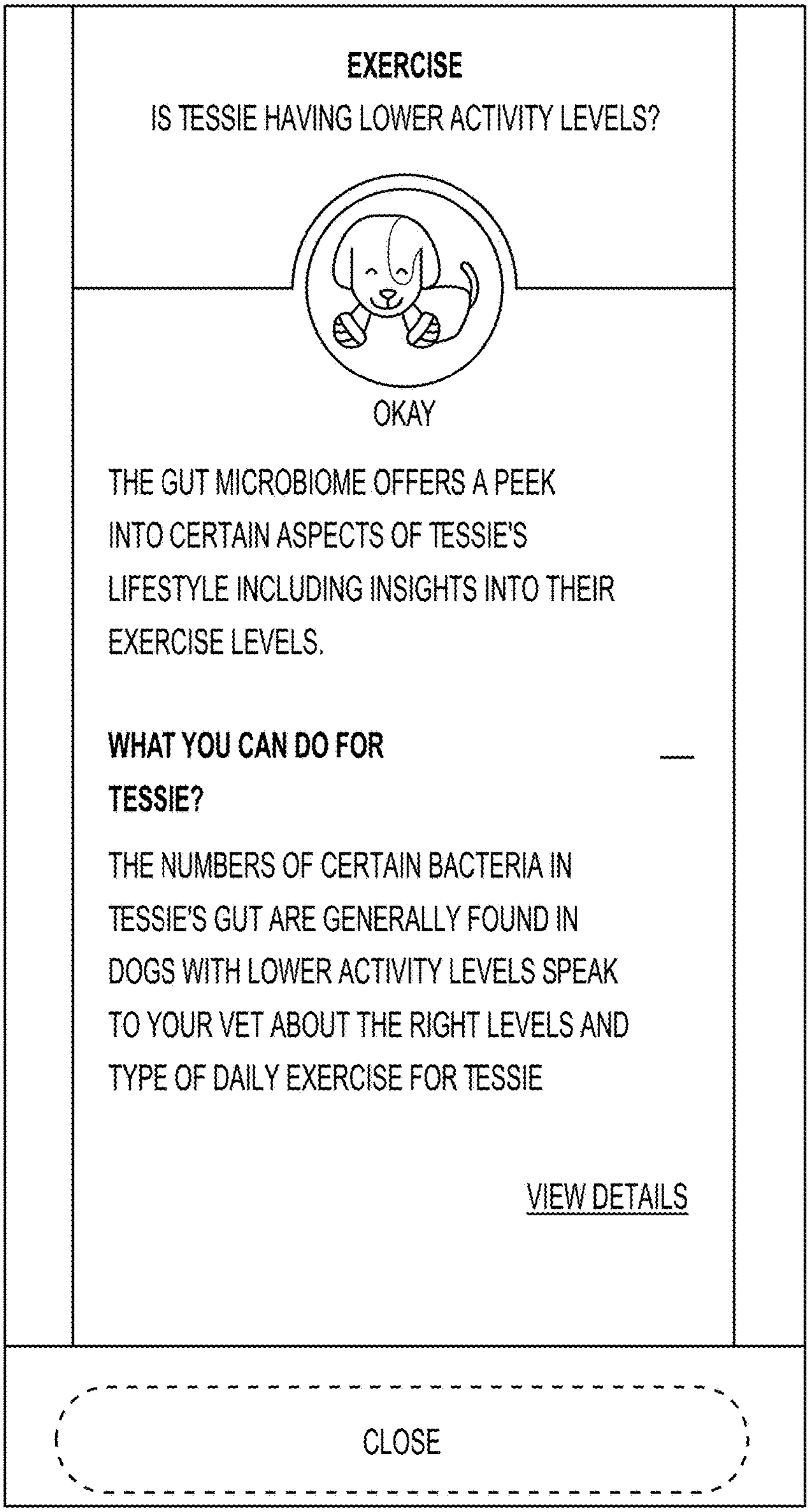
Figure 5Y:
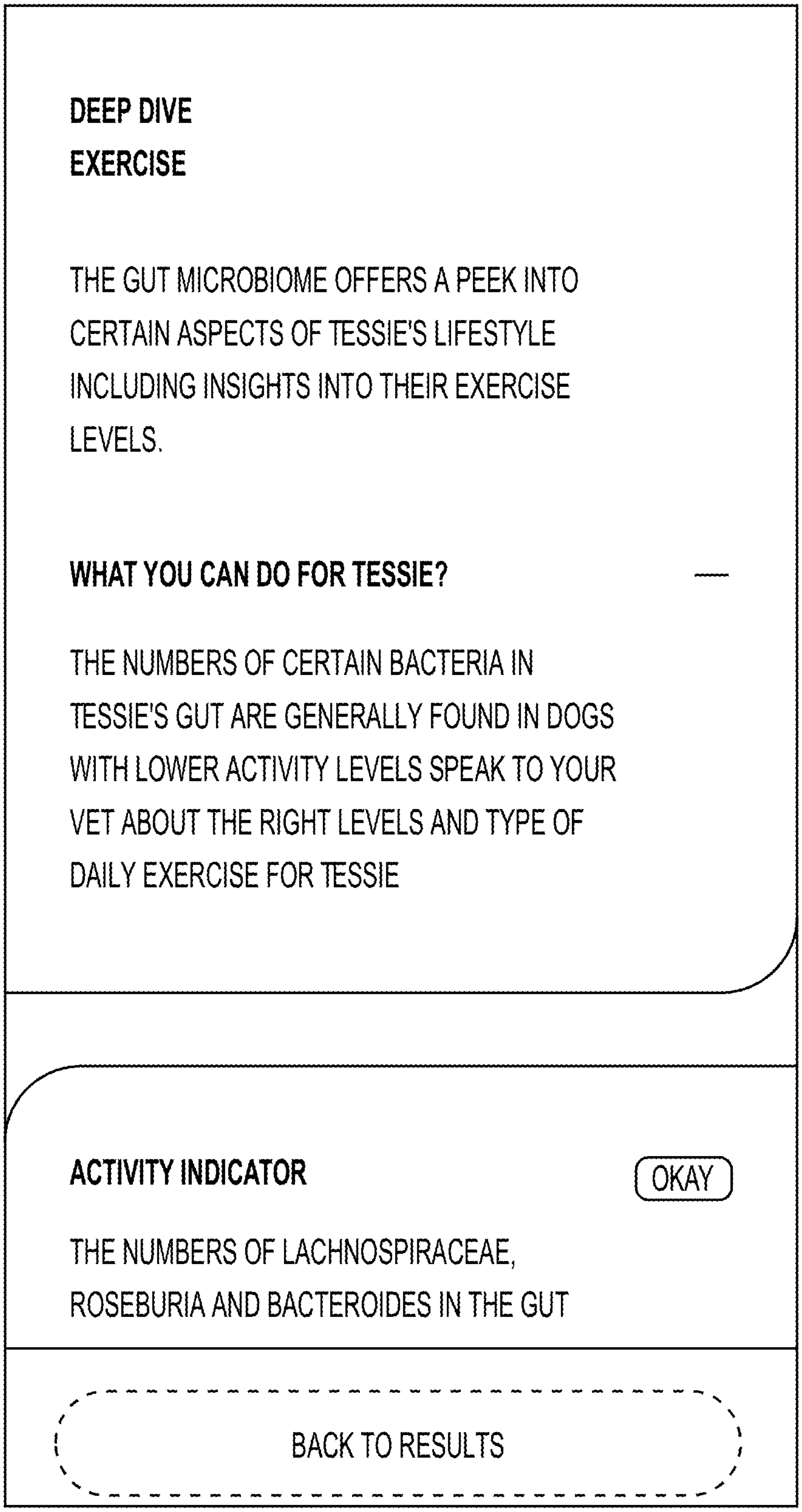
Figure 5A:
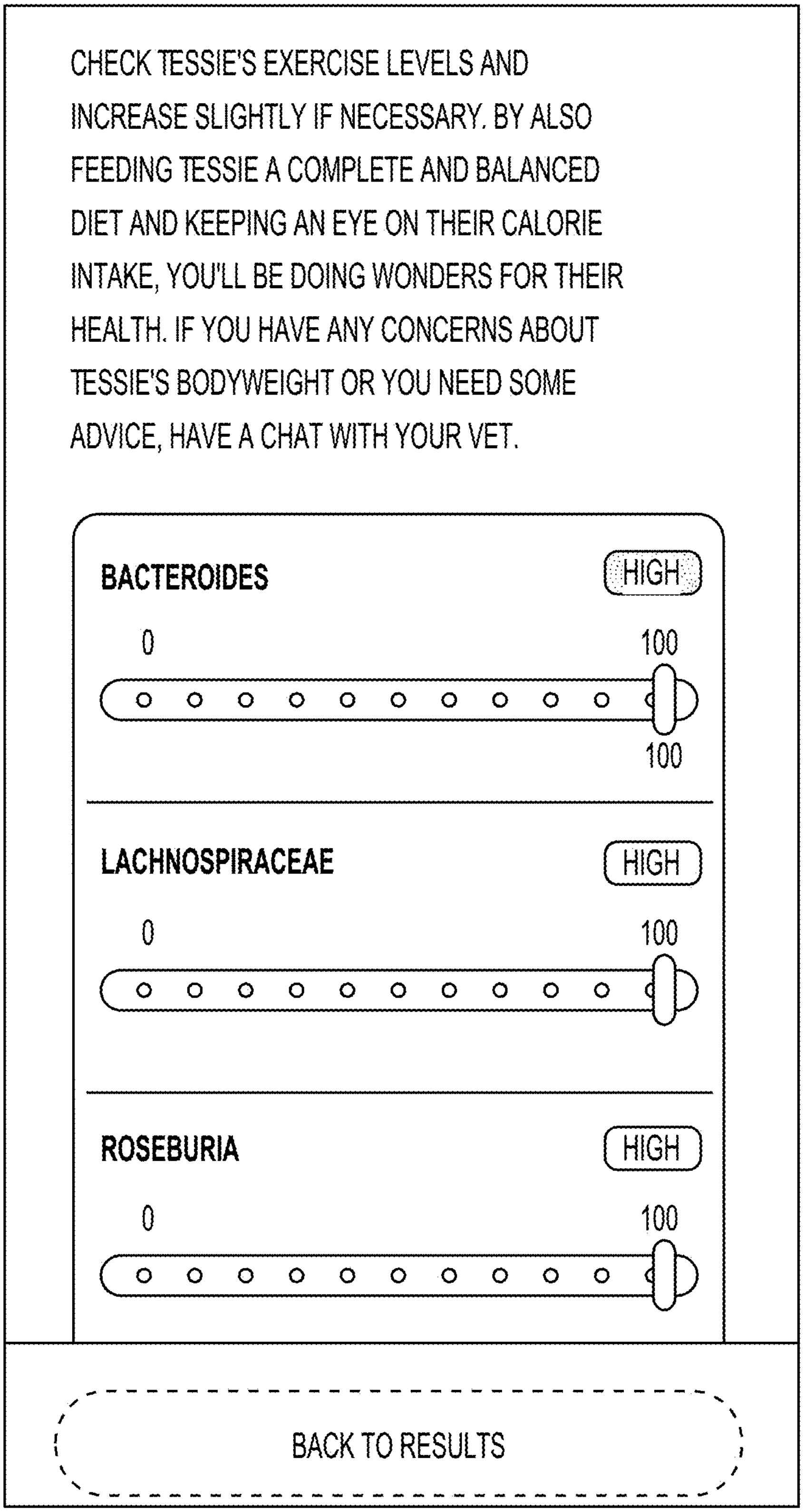
Figure 5C:
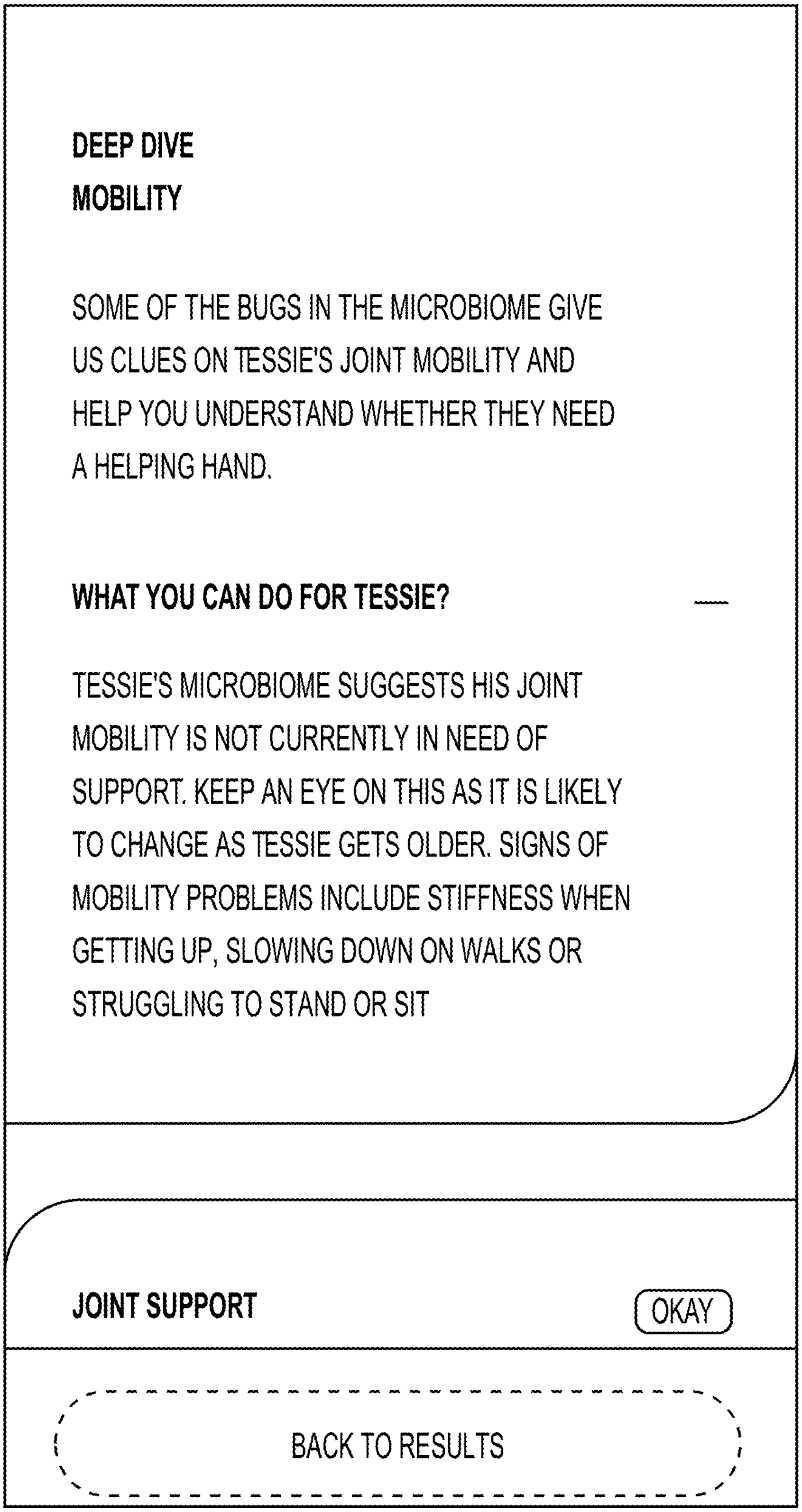
Figure 5D:
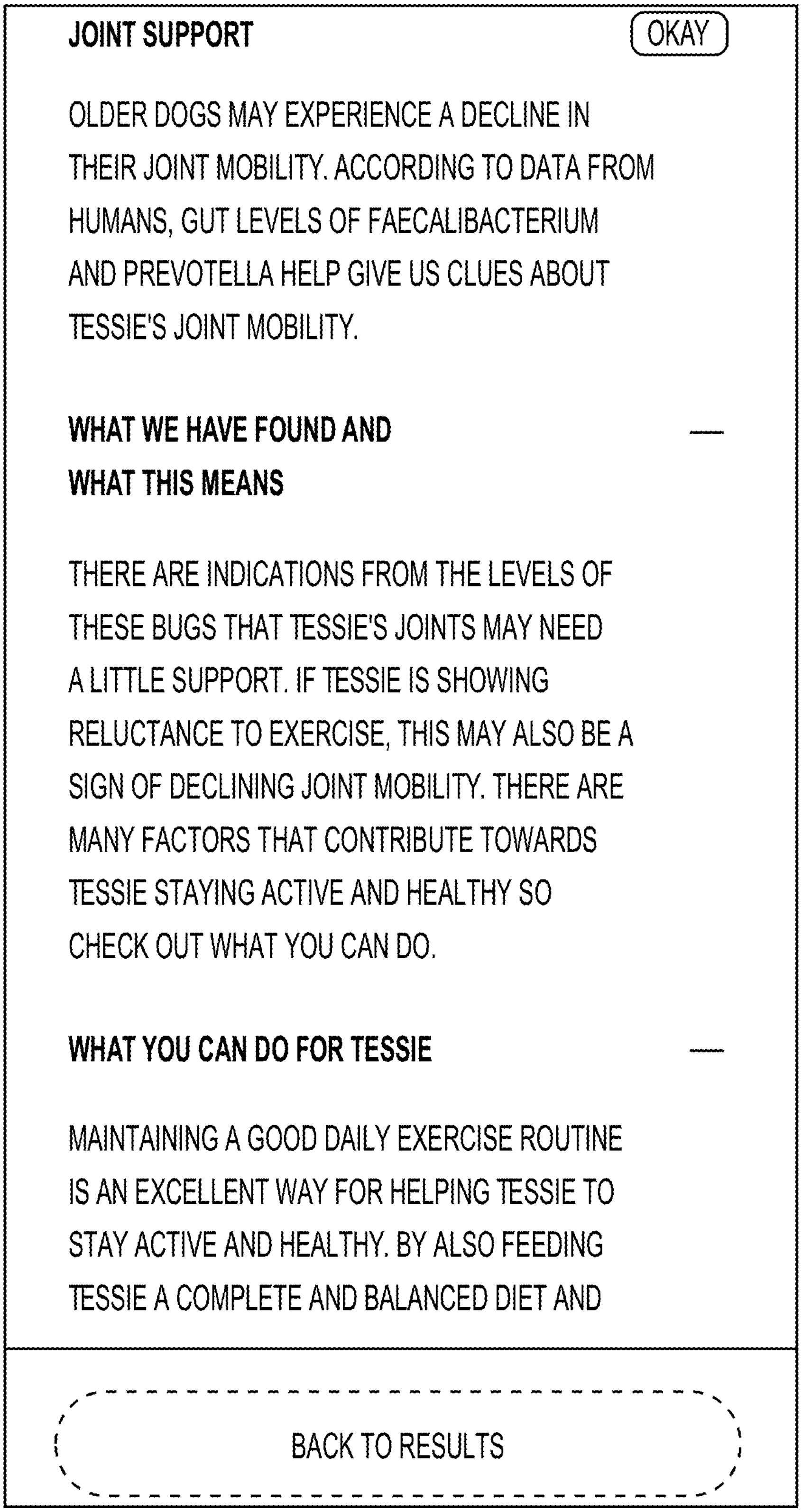
Figure 5E:
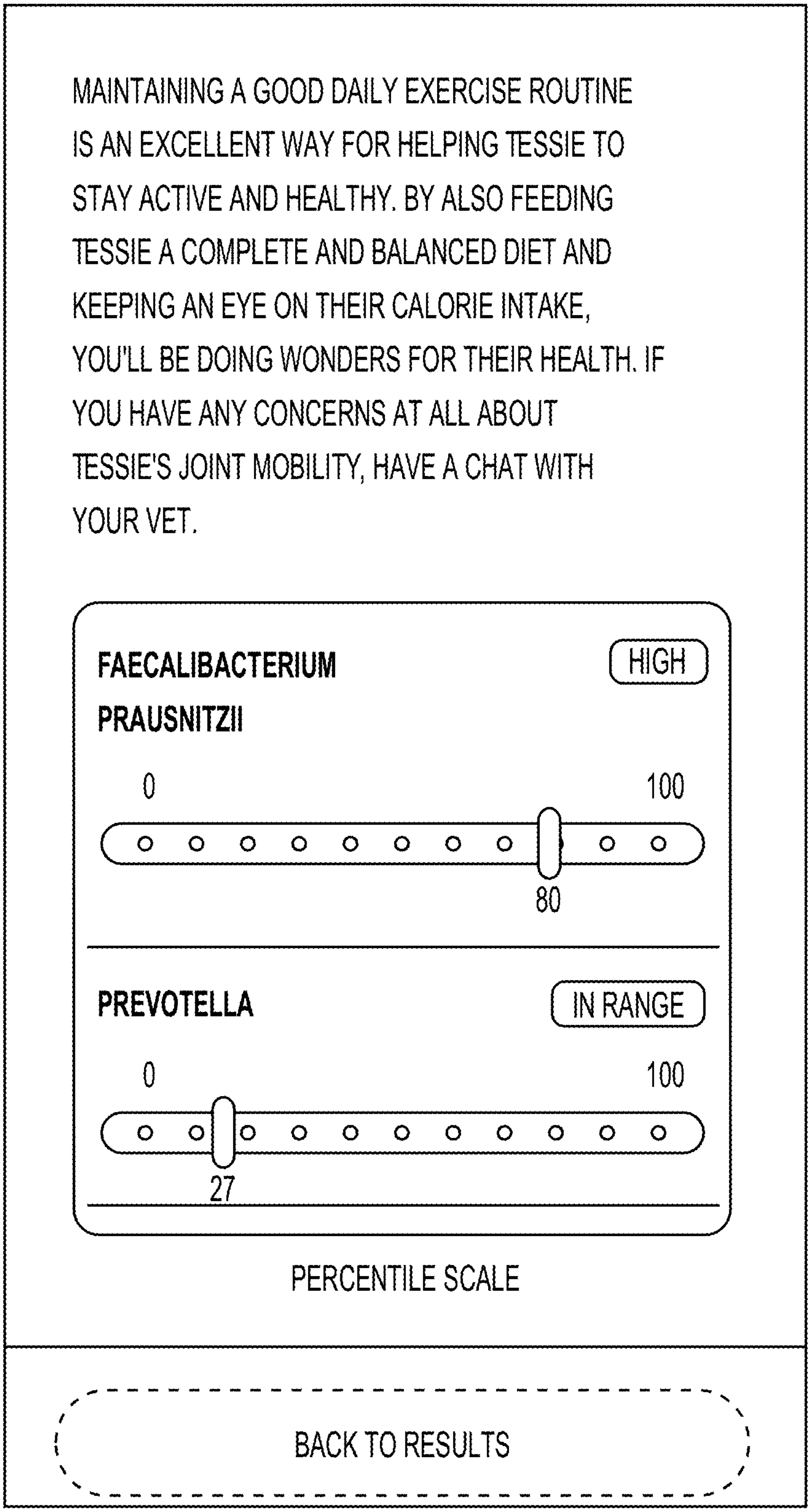
Figure 5F:
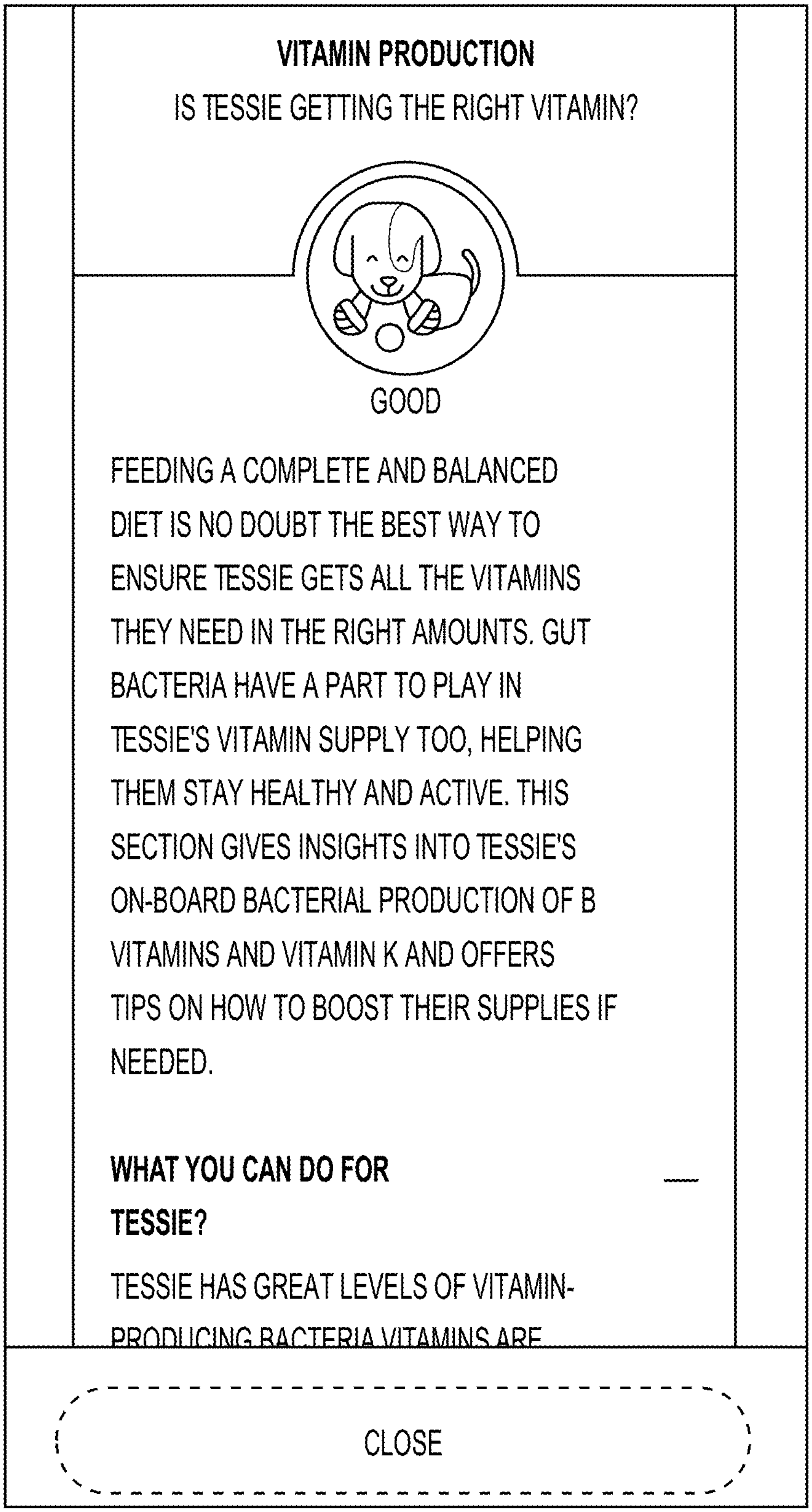
Figure 5G:
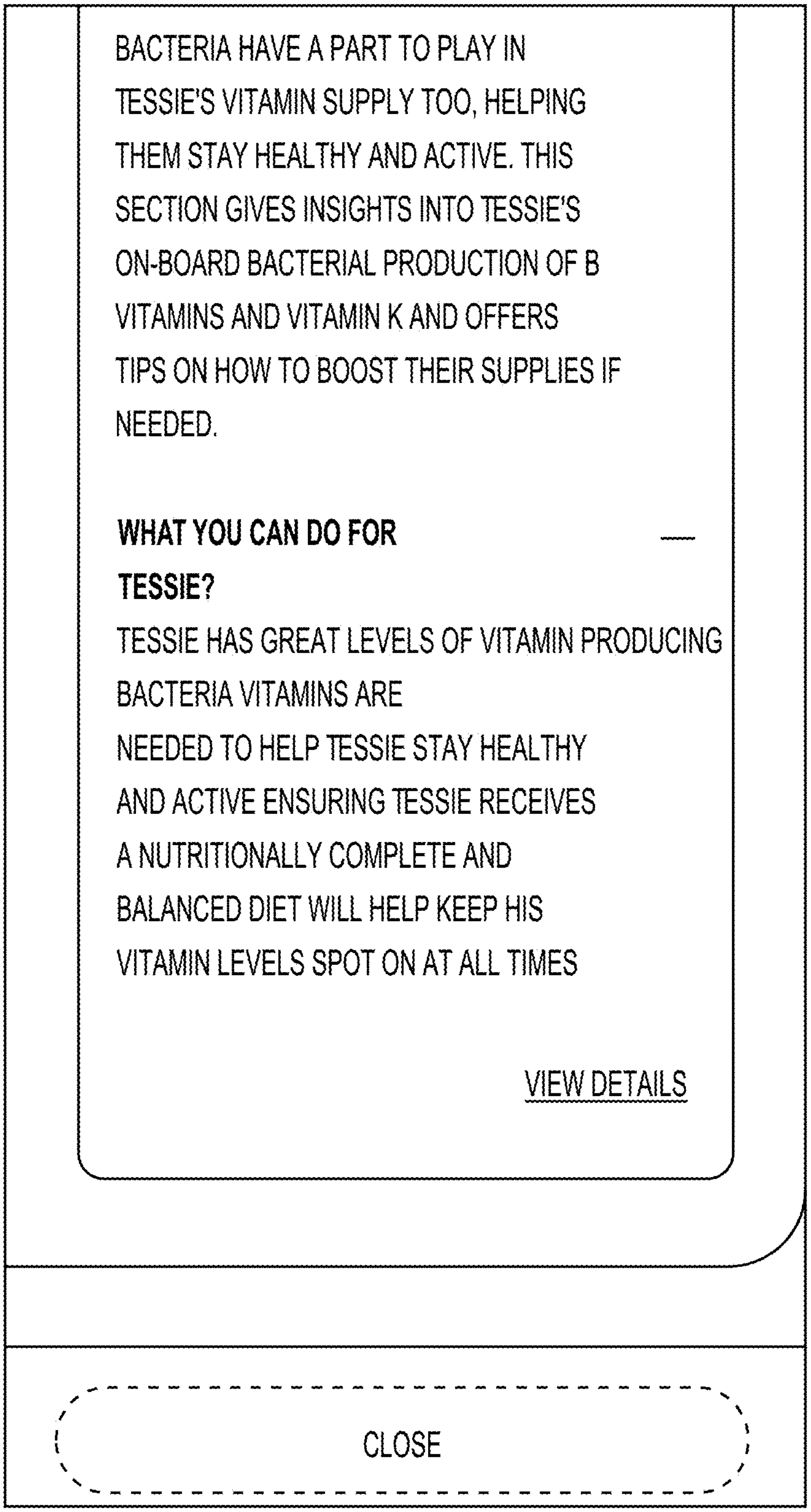
Figure 5I:
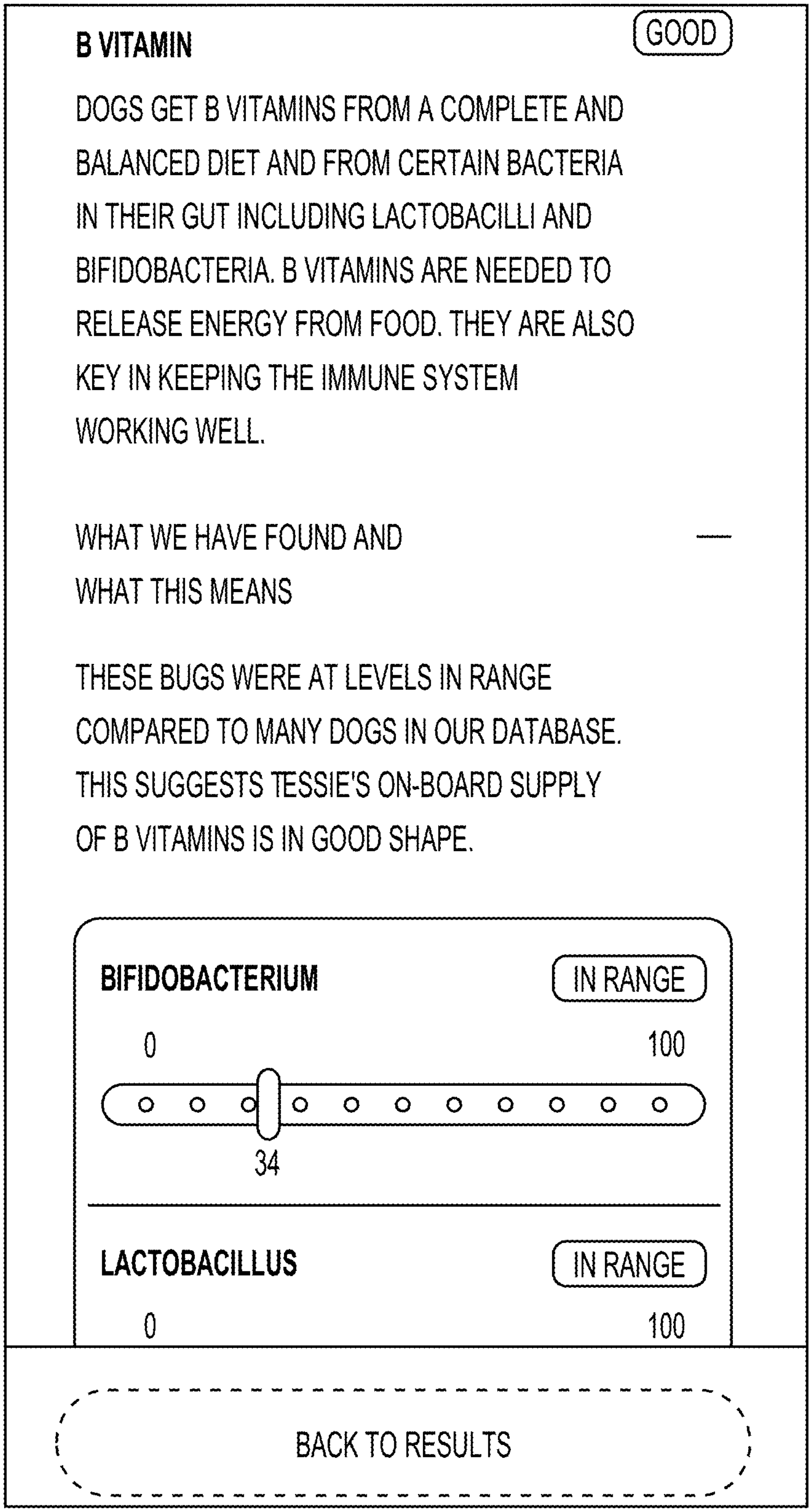
Figure 5J:
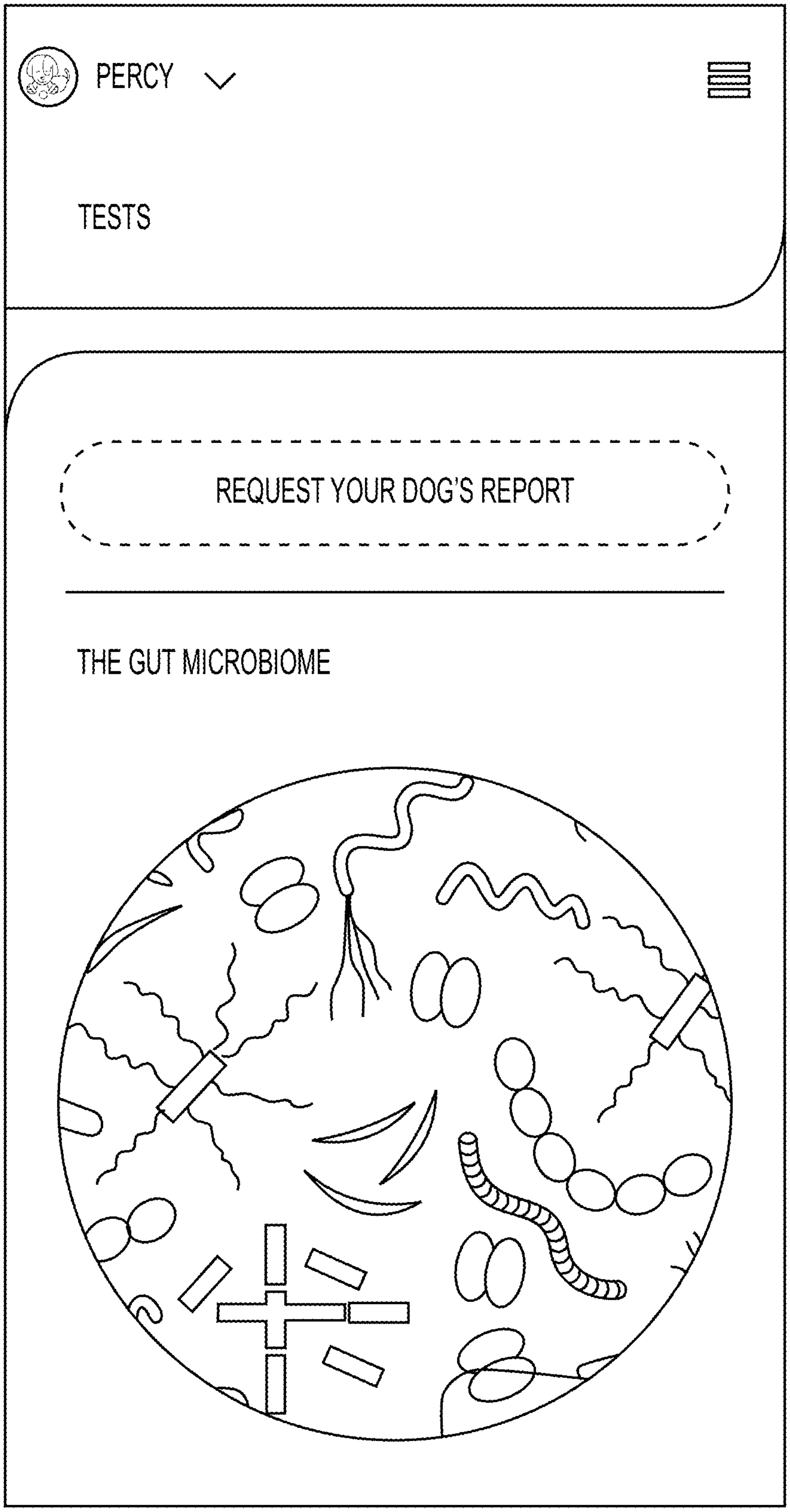

FIGS. 5C-E further illustrate a "The Headlines" page of an exemplary environment of a platform for gathering, analyzing, and displaying results corresponding to a pet's fecal sample. The platform may display the pet's "Diversity Score," indicating the diversity of the pet's microbiome in comparison to other pets that may share similar traits (e.g., similar age). The "Diversity Score" may be displayed as a scale, where the scale indicates the particular pet's "Diversity Score," as well as the "Diversity Score" of the other pets that may share one or more similar traits. The platform may also display a personalized analysis of the "Diversity Score" results, where the personalized analysis may be in a written form, as illustrated in FIGS. 5C-E. Additionally, the platform may display the "Diversity Score" personalized analysis of the results in an easily digestible manner for the user, where common terms and words are used.

FIG. 5F further illustrates an "Our Recommendations" page of an exemplary environment of a platform for gathering, analyzing, and displaying results corresponding to a pet's fecal sample. The platform may display one or more personalized recommendations for the pet, where the one or more recommendations (e.g., "Consider the amount of exercise Tessie gets" or "Ensure Tessie's diet contains natural fibers") are directed towards improving the pet's "Diversity Score." The platform may also provide an option for the user to receive one or more recommended diets (e.g., by the user selecting a "Discover your dog's recommended diets" button).

FIGS. 5G-K further illustrate a "The Details" page of an exemplary environment of a platform for gathering, analyzing, and displaying results corresponding to a pet's fecal sample. The platform may display one or more areas or categories associated with the pet's health that the microbiome may provide clues about the pet's wellbeing. Such areas may include "Digestive Health," "Immunity," "Healthy Weight," "Exercise," "Mobility," and/or "Vitamin Production." The platform may display further details regarding each area, as described in further detail below.

FIGS. 5H-N further illustrate a "Digestive Health" page of an exemplary environment of a platform for gathering, analyzing, and displaying results corresponding to a pet's fecal sample. The platform may display a notification (e.g., "Good") indicating if the pet's digestive health is on track. The platform may also display a personalized analysis of the "Digestive Health" of the pet, where the personalized analysis may be in a written form, as illustrated in FIGS. 5H-J. Additionally, the platform may display the "Digestive Health" personalized analysis of the results in an easily digestible manner for the user, where common terms and words are used.

The platform may also display a notification (e.g., "Good") indicating if the pet's energy use is on track, as illustrated in FIG. 5J. The platform may also display one or more sliding scales of which bugs/bacteria (e.g., "*Bacteroides,*" "*Bifidobacterium*," or "Ruminococcaceae") were found in the pet, as illustrated in FIG. 5K. Additionally, the platform may display where the pet's results fall on one or more sliding scales by placing an indicator on the one or more scales. The platform may further display an analysis of each indicator (e.g., "High," "In Range," and the like).

The platform may also display a notification (e.g., "Good") indicating if the pet's gut defense is on track, as illustrated in FIG. 5L. The platform may also display one or more sliding scales of which bugs (e.g., "*Lactobacillus*") was found in the pet, as illustrated in FIG. 5L. Additionally, the platform may display where the pet's results fall on one or more sliding scales by placing an indicator on the one or more scales. The platform may further display an analysis of each indicator (e.g., "In Range").

The platform may also display a notification (e.g., "Good") indicating if the pet's gut wall support is on track, as illustrated in FIG. 5M. The platform may also display one or more sliding scales of which bugs (e.g., "*Roseburia*," "Ruminococcaceae," and the like) were found in the pet, as illustrated in FIG. 5M. Additionally, the platform may display where the pet's results fall on one or more sliding scales by placing an indicator on the one or more scales. The platform may further display an analysis of each indicator (e.g., "High").

The platform may also display a notification (e.g., "Good") indicating if the pet has any "tummy troublers" bacteria, as illustrated in FIG. 5N. The platform may also display one or more sliding scales of which bugs (e.g., "*Clostridium perfringens*") were found in the pet, as illustrated in FIG. 5N. Additionally, the platform may display where the pet's results fall on one or more sliding scales by placing an indicator on the one or more scales. The platform may further display an analysis of each indicator (e.g., "In Range").

FIGS. 5O-R further illustrate an "Immunity" page of an exemplary environment of a platform for gathering, analyzing, and displaying results corresponding to a pet's fecal sample. The platform may display a notification (e.g., "Good") indicating if the pet's immune system is on track. The platform may also display a personalized analysis of the "Immunity" of the pet, where the personalized analysis may be in a written form, as illustrated in FIGS. 5O-R. Additionally, the platform may display the "Immunity" personalized analysis of the results in an easily digestible manner for the user, where common terms and words are used.

The platform may also display a notification (e.g., "Good") indicating if the pet has any bugs for managing the pet's immune response, as illustrated in FIG. 5Q. The platform may also display one or more sliding scales of which bugs (e.g., "*Faecalibacterium prausnitzii,*" "*Roseburia,*" and the like) were found in the pet, as illustrated in FIG. 5Q. Additionally, the platform may display where the pet's results fall on one or more sliding scales by placing an indicator on the one or more scales. The platform may further display an analysis of each indicator (e.g., "High," "In Range," and the like).

The platform may also display a notification (e.g., "Good") indicating if the pet has any bugs for managing the pet's skin defense, as illustrated in FIG. 5R. The platform may also display one or more sliding scales of which bugs (e.g., "*Lactobacillus*") were found in the pet, as illustrated in FIG. 5R. Additionally, the platform may display where the pet's results fall on one or more sliding scales by placing an indicator on the one or more scales. The platform may further display an analysis of each indicator (e.g., "High," "In Range," and the like).

FIGS. 5S-W further illustrate a "Healthy Weight" page of an exemplary environment of a platform for gathering, analyzing, and displaying results corresponding to a pet's fecal sample. The platform may display a notification (e.g., "Okay") indicating if the pet is able to maintain a healthy weight. The platform may also display a personalized analysis of the "Healthy Weight" of the pet, where the personalized analysis may be in a written form, as illustrated in FIGS. 5S-W. Additionally, the platform may display the "Healthy Weight" personalized analysis of the results in an easily digestible manner for the user, where common terms and words are used.

The platform may also display a notification (e.g., "Okay") indicating if the pet has any bugs for managing the pet's weight, as illustrated in FIG. 5V. The platform may also display one or more sliding scales of which bugs (e.g., "*Bacteroides,*" "*Clostridia,*" "*Lactobacillus,*" and the like) were found in the pet, as illustrated in FIG. 5W. Additionally, the platform may display where the pet's results fall on one or more sliding scales by placing an indicator on the one or more scales. The platform may further display an analysis of each indicator (e.g., "High," "In Range," and the like).

FIGS. 5X-AA further illustrate an "Exercise" page of an exemplary environment of a platform for gathering, analyzing, and displaying results corresponding to a pet's fecal sample. The platform may display a notification (e.g., "Okay") indicating if the pet has a good exercise level. The platform may also display a personalized analysis of the "Exercise" of the pet, where the personalized analysis may be in a written form, as illustrated in FIGS. 5X-AA. Additionally, the platform may display the "Exercise" personalized analysis of the results in an easily digestible manner for the user, where common terms and words are used.

The platform may also display a notification (e.g., "Okay") corresponding to the pet's activity level, as illustrated in FIGS. 5Y-Z. The platform may also display one or more sliding scales of which bugs (e.g., "*Bacteroides*," "Lachnospiraceae," "*Roseburia*," and the like) were found in the pet, as illustrated in FIG. 5AA. Additionally, the platform may display where the pet's results fall on one or more sliding scales by placing an indicator on the one or more scales. The platform may further display an analysis of each indicator (e.g., "High," "In Range," and the like).

FIGS. 5BB-EE further illustrate a "Mobility" page of an exemplary environment of a platform for gathering, analyzing, and displaying results corresponding to a pet's fecal sample. The platform may display a notification (e.g., "Okay") indicating if the pet has good mobility. The platform may also display a personalized analysis of the "Mobility" of the pet, where the personalized analysis may be in a written form, as illustrated in FIGS. 5BB-EE. Additionally, the platform may display the "Mobility" personalized analysis of the results in an easily digestible manner for the user, where common terms and words are used.

The platform may also display a notification (e.g., "Okay") corresponding to the pet's joint support, as illustrated in FIGS. 5CC-DD. The platform may also display one or more sliding scales of which bugs (e.g., "*Faecalibacterium Prausnitzii,*" "*Prevotella,*" and the like) were found in the pet, as illustrated in FIG. 5EE. Additionally, the platform may display where the pet's results fall on one or more sliding scales by placing an indicator on the one or more scales. The platform may further display an analysis of each indicator (e.g., "High," "In Range," and the like).

FIGS. 5FF-II further illustrate a "Vitamin Production" page of an exemplary environment of a platform for gathering, analyzing, and displaying results corresponding to a pet's fecal sample. The platform may display a notification (e.g., "Good") indicating if the pet is getting the right vitamins. The platform may also display a personalized analysis of the "Vitamin Production" of the pet, where the personalized analysis may be in a written form, as illustrated in FIGS. 5FF-II. Additionally, the platform may display the "Vitamin Production" personalized analysis of the results in an easily digestible manner for the user, where common terms and words are used.

The platform may also display a notification (e.g., "Good") corresponding to the pet's vitamin levels, as illustrated in FIG. 5II. The platform may also display one or more sliding scales of which bugs (e.g., "*Bifidobacterium,*" "*Lactobacillus*," and the like) were found in the pet, as illustrated in FIG. 5II. Additionally, the platform may display where the pet's results fall on one or more sliding scales by placing an indicator on the one or more scales. The platform may further display an analysis of each indicator (e.g., "High," "In Range," and the like).

FIG. 5JJ further illustrates a "Tests" page of an exemplary environment of a platform for gathering, analyzing, and displaying results corresponding to a pet's fecal sample. The platform may display a summary of the fecal sample testing process.

Notably, the pages or user interfaces displayed for each area/category pertaining to the pet's health (e.g., digestive health, immunity, healthy weight, exercise, mobility, and vitamin production) are organized in a user-friendly manner that may aid the user's understanding of the results and may also improve the user's convenience. For example, the platform may first display a general overview/summary of the results pertaining to the corresponding area/category (e.g., FIGS. 5H, 5O, 5S-5T, 5X, 5BB, 5FF-5GG), followed by a more detailed, in-depth discussion (e.g., FIGS. 5I-5N, 5P-5R, 5U-5W, 5Y-5AA, 5CC-5EE, 5HH-5II) including bacterial levels relevant to the area/category and what the bacterial levels mean.

Figure 6A:
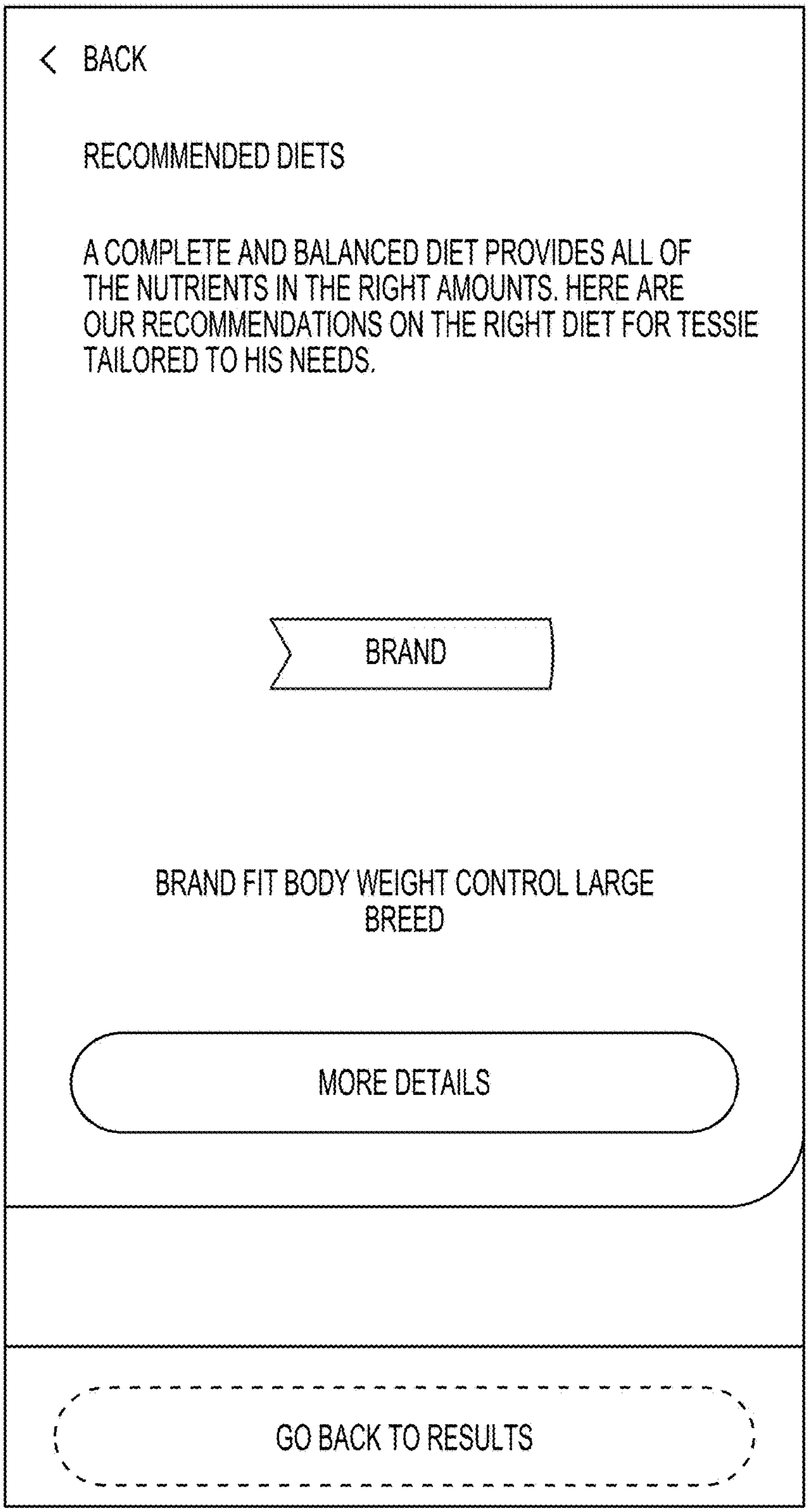
FIGS. 6A-6C describe exemplary environments of a platform for displaying pet product recommendations, according to one or more embodiments.
Figure 6B:
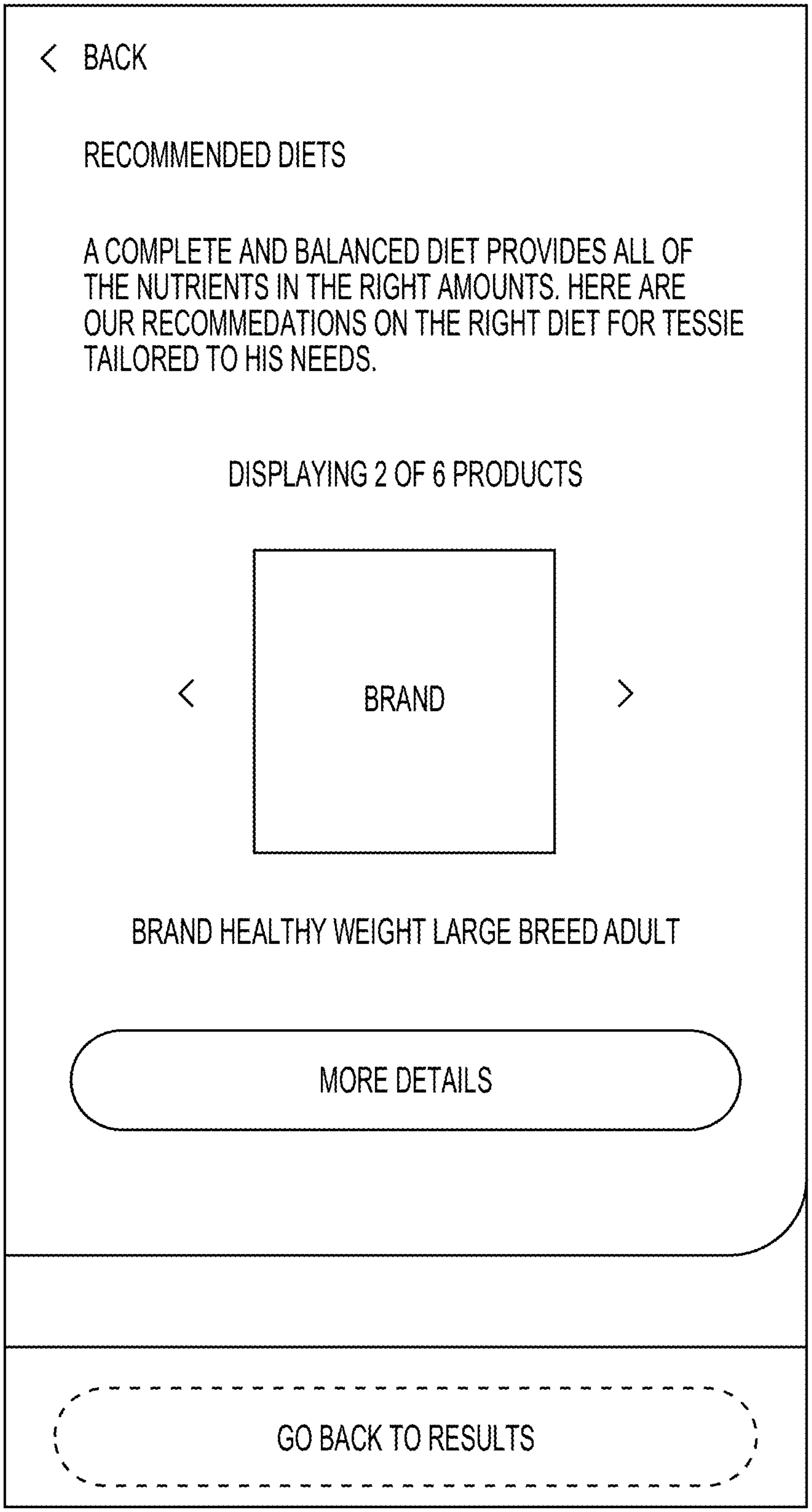
Figure 6C:

FIGS. 6A-C describe exemplary environments of a platform for recommending a particular diet based on an analysis of a pet's fecal sample, according to one or more embodiments. In some embodiments, the platform may display FIGS. 6A-C in response to a user selecting the "Discover your dog's recommended diets" button in FIG. 5F. The platform may display one or more "Recommended Diets" (e.g., pet products) to the user. Each of the one or more "Recommended Diets" may be personalized recommendations to the pet, where the personalized recommendations are based on an analysis of the pet's fecal sample and/or pet metadata provided by user. Additionally, FIGS. 7-11B may provide additional detail regarding the process for determining one or more recommended diets.

Exemplary Methods for Determining Pet Product Recommendations Based on a Hierarchy of Factors FIGS. 7-10 illustrates exemplary processes for determining a pet product recommendation, according to one or more embodiments.

Figure 7:
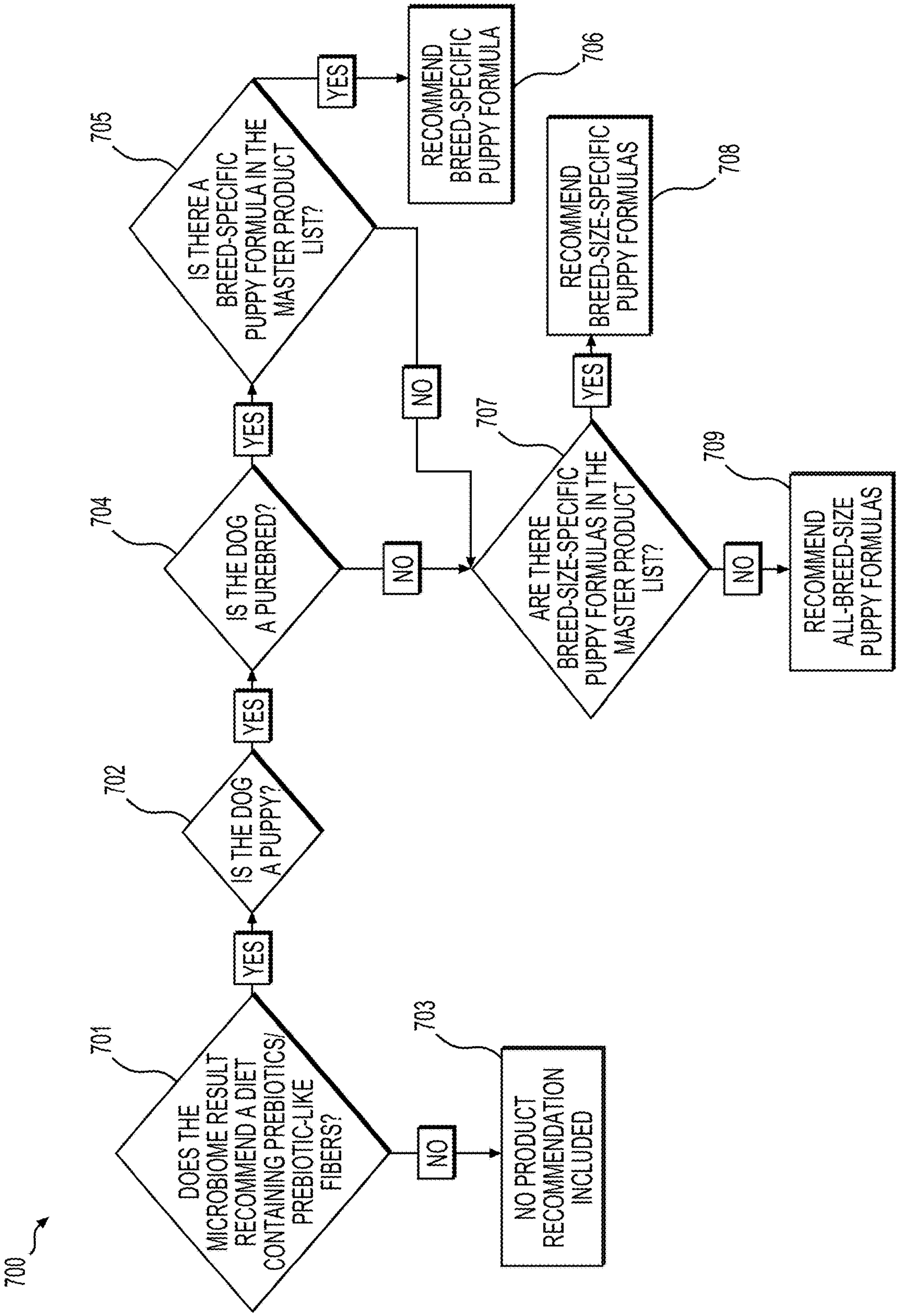
FIG. 7 depicts a flowchart of an exemplary method for determining a pet product recommendation for a puppy, according to one or more embodiments.

FIG. 7 depicts a flowchart of an exemplary method 700 for determining a pet product recommendation for a puppy, according to one or more embodiments. A platform may determine whether a microbiome result recommends a diet containing prebiotics or prebiotic-like fibers (Step 701). Based on determining that the microbiome result recommends a diet containing prebiotics or prebiotic-like fibers (Step 701—YES), the platform may determine whether the dog is a puppy (Step 702). Additionally, the recommendation that the diet contains prebiotics or prebiotic-like fibers may include a range of prebiotics or prebiotic-like fibers. For example, the range may include a number corresponding to a threshold amount of prebiotics or prebiotic-like fibers that should be included in the pet product recommendation. Alternatively, for example, the range may include a range of specific prebiotics or prebiotic-like fibers that should be included in the pet product recommendation.

Alternatively, based on determining that the microbiome result does not recommend a diet containing prebiotics or prebiotic-like fibers (Step 701—NO), the platform may not provide a product recommendation (Step 703). Additionally, in some embodiments, the platform may determine whether a microbiome test has been performed, or whether a microbiome result is available. If a microbiome test has not been performed, or a microbiome result does not exist or cannot be provided, the platform may skip Step 701 and begin at Step 702. In other words, the method 700 may begin at step 702 and may be performed without a microbiome result.

Based on determining that the dog is a puppy (Step 702—YES), the platform may determine whether the dog is a purebred (704). Based on determining that the dog is a purebred (Step 704—YES), the platform may determine whether there is a breed-specific puppy formula in a master product list (Step 705) containing a plurality of pet products. Based on determining that there is a breed-specific puppy formula in the master product list (Step 705—YES), the platform may recommend the breed-specific puppy formula (Step 706).

Alternatively, based on determining that the dog is not a purebred (Step 704—NO) or determining that there is not a breed-specific puppy formula in the master product list (Step 705—NO), the platform may determine whether there are breed-size-specific puppy formulas in the master product list (Step 707).

Based on determining that there are breed-size-specific puppy formulas in the master product list (Step 707—YES), the platform may recommend the breed-size-specific puppy formulas (Step 708). Alternatively, based on determining that there are not breed-size-specific puppy formulas in the master product list (Step 707—NO), the platform may recommend all-breed-size puppy formulas (Step 709).

Figure 8:
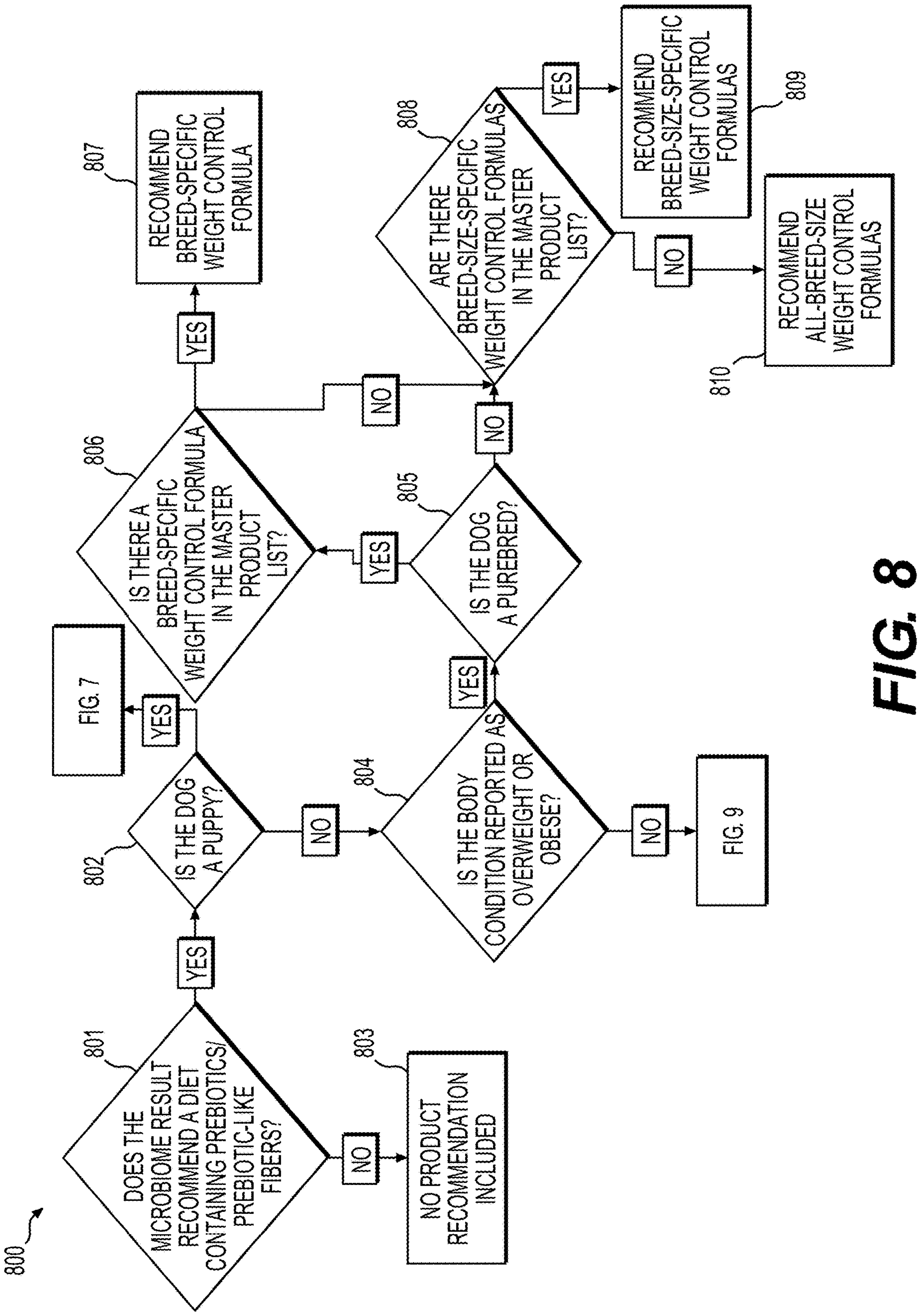
FIG. 8 depicts a flowchart of an exemplary method for determining a pet product recommendation for an overweight pet, according to one or more embodiments.

FIG. 8 depicts a flowchart of an exemplary method 800 for determining a pet product recommendation for an overweight pet, according to one or more embodiments.

A platform may determine whether a microbiome result recommends a diet containing prebiotics or prebiotic-like fibers (Step 801). Based on determining that the microbiome results recommends a diet containing prebiotics or prebiotic-like fibers (Step 801—YES), the platform may determine whether the dog is a puppy (Step 802). Additionally, the recommendation that the diet contains prebiotics or prebiotic-like fibers may include a range of prebiotics or prebiotic-like fibers. For example, the range may include a number corresponding to a threshold amount of prebiotics or prebiotic-like fibers that should be included in the pet product recommendation. Alternatively, for example, the range may include a range of specific prebiotics or prebiotic-like fibers that should be included in the pet product recommendation.

Alternatively, based on determining that the microbiome result does not recommend a diet containing prebiotics or prebiotic-like fibers (Step 801—NO), the platform may not provide a product recommendation (Step 803). Additionally, in some embodiments, the platform may determine whether a microbiome test has been performed, or whether a microbiome result is available. If a microbiome test has not been performed, or a microbiome result does not exist or cannot be provided, the platform may skip Step 801 and begin at Step 802. In other words, the method 800 may begin at step 802 and may be performed without a microbiome result.

Based on determining that the dog is a puppy (Step 802—YES), the platform may proceed to perform one or more Steps of the method 700 of FIG. 7. Alternatively, based on determining that the dog is not a puppy (Step 802—NO), the platform may determine whether a body condition of the dog is reported as being overweight or obese (Step 804). Based on determining that body condition of the dog is reported as being overweight or obese (Step 804—YES), the platform may determine whether the dog is a purebred (Step 805). Alternatively, based on determining that the body condition of the dog is not reported as being overweight or obese (Step 804—NO), the platform may perform one or more Steps of the method 900 of FIG. 9.

Based on determining that the dog is a purebred (Step 805—YES), the platform may determine whether there is a breed-specific weight control formula in a master product list (Step 806). Based on determining that there is a breed-specific weight control formula in the master product list (Step 806—YES), the platform may recommend the breed-specific weight control formula (Step 807).

Alternatively, based on determining that the dog is not a purebred (Step 805—NO) or determining that there is not a breed-specific weight control formula in the master product list (Step 806—NO), the platform may determine whether there are breed-size-specific weight control formulas in the master product list (Step 808). Based on determining that there are breed-size-specific weight control formulas in the master product list (Step 808—YES), the platform may recommend the breed-size-specific weight control formulas (Step 809). Alternatively, based on determining that there are not breed-size-specific weight control formulas in the master product list (Step 808—NO), the platform may recommend all-breed-size weight control formulas (Step 810).

Figure 9:
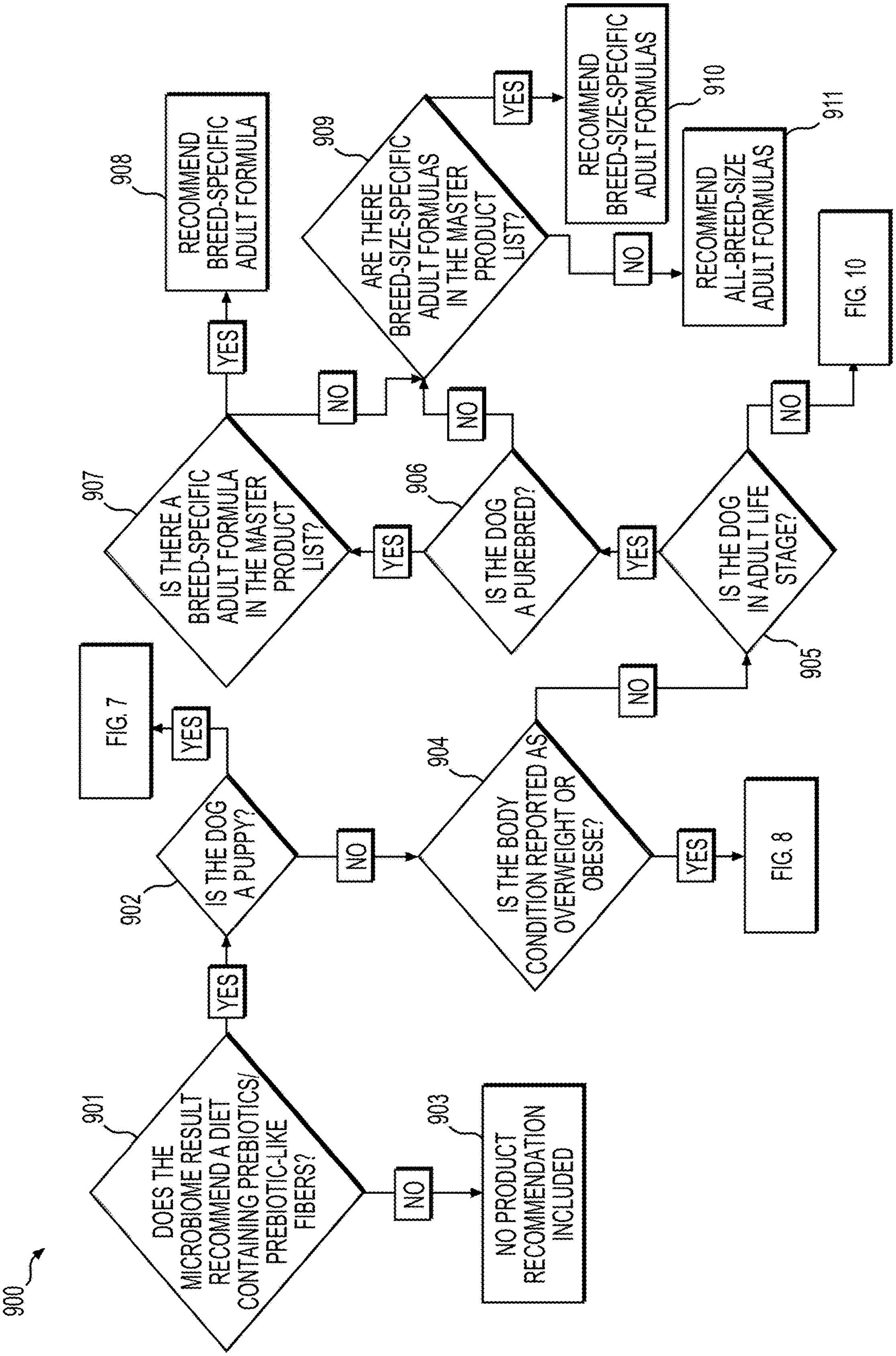
FIG. 9 depicts a flowchart of an exemplary method for determining a pet product recommendation for a normal weight adult pet, according to one or more embodiments.

FIG. 9 depicts a flowchart of an exemplary method 900 for determining a pet product recommendation for a normal weight adult pet, according to one or more embodiments.

A platform may determine whether a microbiome result recommends a diet containing prebiotics or prebiotic-like fibers (Step 901). Based on determining that the microbiome result recommends a diet containing prebiotics or prebiotic-like fibers (Step 901—YES), the platform may determine whether the dog is a puppy (Step 902). Additionally, the recommendation that the diet contains prebiotics or prebiotic-like fibers may include a range of prebiotics or prebiotic-like fibers. For example, the range may include a number corresponding to a threshold of prebiotics or prebiotic-like fibers that should be included in the pet product recommendation. Alternatively, for example, the range may include a range of specific prebiotics or prebiotic-like fibers that should be included in the pet product recommendation.

Alternatively, based on determining that the microbiome result does not recommend a diet containing prebiotics or prebiotic-like fibers (Step 901—NO), the platform may not provide a product recommendation (Step 903). Additionally, in some embodiments, the platform may determine whether a microbiome test has been performed, or whether a microbiome result is available. If a microbiome test has not been performed, or a microbiome result does not exist or cannot be provided, the platform may skip Step 901 and begin at Step 902. In other words, the method 900 may begin at step 902 and may be performed without a microbiome result.

Based on determining that the dog is a puppy (Step 902—YES), the platform may perform one or more Steps of the method 700 of FIG. 7. Alternatively, based on determining that the dog is not a puppy (Step 902—NO), the platform may determine whether a body condition of the dog is reported as being overweight or obese (Step 904). Based on determining that the body condition of the dog is reported as being overweight or obese (Step 904—YES), the platform may perform one or more Steps of the method 800 of FIG. 8. Alternatively, based on determining that the body condition of the dog is not reported as being overweight or obese (Step 904—NO), the platform may determine whether the dog is in an adult life stage (Step 905).

Figure 10:
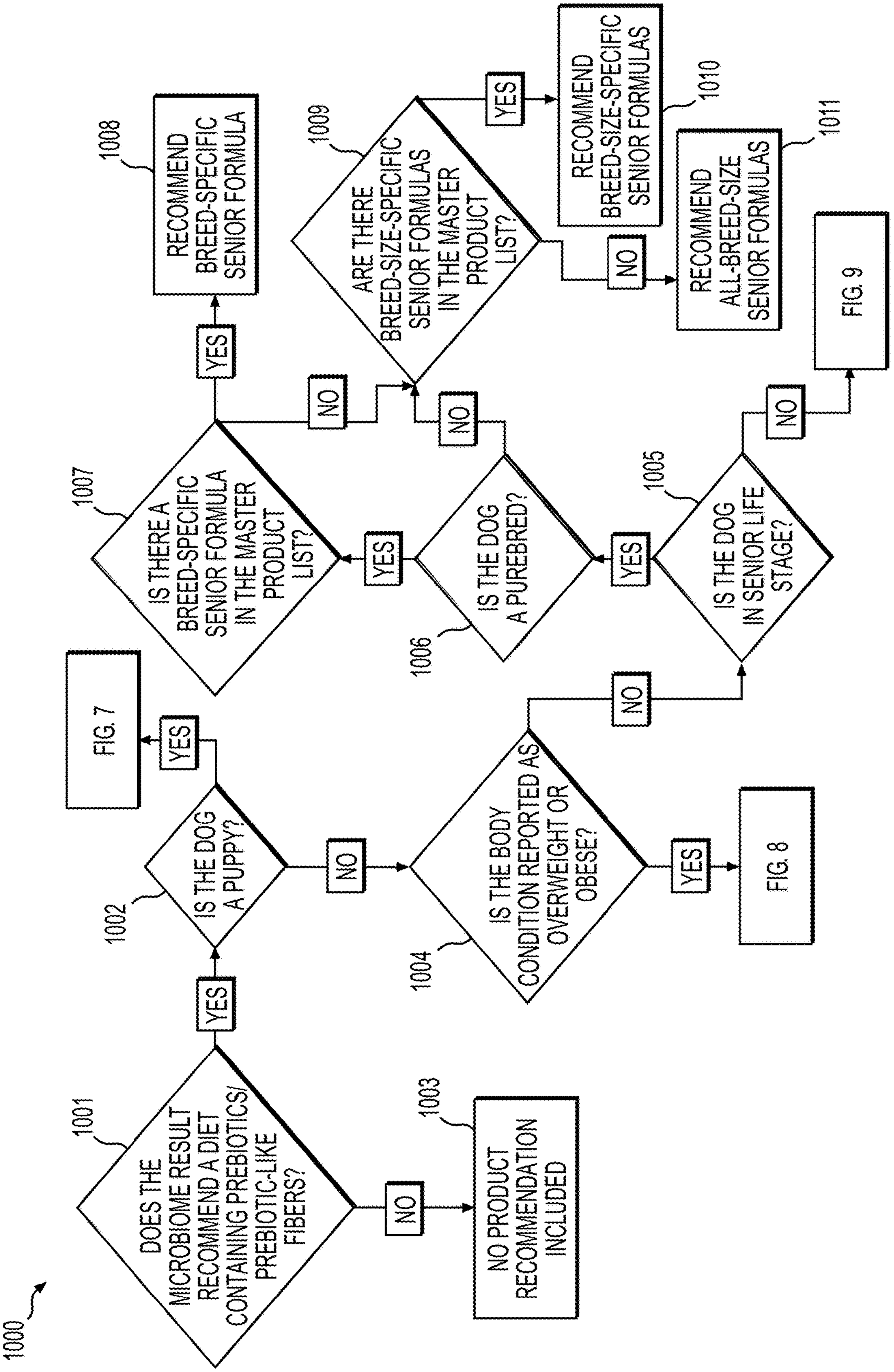
FIG. 10 depicts a flowchart of an exemplary method for determining a pet product recommendation for a normal weight senior pet, according to one or more embodiments.

Based on determining that that the dog is not in an adult life stage (Step 905—NO), the platform may perform one or more Steps of the method 1000 of FIG. 10. Alternatively, based on determining that the dog is in an adult life stage (Step 905—YES), the platform may determine whether the dog is a purebred (Step 906).

Based on determining that the dog is a purebred (Step 906—YES), the platform may determine whether there is a breed-specific adult formula in a master product list (Step 907). Based on determining that there is a breed-specific adult formula in the master product list (Step 907—YES), the platform may recommend the breed-specific adult formula (Step 908).

Alternatively, based on determining that the dog is not a purebred (Step 906—NO) or determining that there is not a breed-specific adult formula in the master product list (Step 907—NO), the platform may determine whether there are breed-size-specific adult formulas in the master product list (Step 909).

Based on determining that there are breed-size-specific adult formulas in the master product list (Step 909—YES), the platform may recommend the breed-size-specific adult formulas (Step 910). Alternatively, based on determining that there are not breed-size-specific adult formulas in the master product list (Step 909—NO), the platform may recommend all-breed-size adult formulas (Step 911).

FIG. 10 depicts a flowchart of an exemplary method 1000 for determining a pet product recommendation for a normal weight senior pet, according to one or more embodiments.

A platform may determine whether a microbiome result recommends a diet containing prebiotics or prebiotic-like fibers (Step 1001). Based on determining that the microbiome result recommends a diet containing prebiotics or prebiotic-like fibers (Step 1001—YES), the platform may determine whether the dog is a puppy (Step 1002). Additionally, in some embodiments, the platform may determine whether a microbiome test has been performed, or whether a microbiome result is available. If a microbiome test has not been performed, the platform may skip Step 1001 and begin at Step 1002. In other words, the method 1000 may begin at step 1002 and may be performed without a microbiome result. Alternatively, based on determining that the microbiome result does not recommend a diet containing prebiotics or prebiotic-like fibers (Step 1001—NO), the platform may not provide a product recommendation (Step 1003).

Based on determining that the dog is a puppy (Step 1002—YES), the platform may perform one or more Steps of the method 700 of FIG. 7. Alternatively, based on determining that the dog is not a puppy (Step 1002—NO), the platform may determine whether a body condition of the dog is reported as being overweight or obese (Step 1004).

Based on determining that the body condition of the dog is reported as being overweight or obese (Step 1004—YES), the platform may perform one or more Steps of the method FIG. 8 of FIG. 8. Alternatively, based on determining that the body condition of the dog is not reported as being overweight or obese (Step 1004—NO), the platform may determine whether the dog is in a senior life stage (Step 1005).

Based on determining that the dog is not in a senior life stage (Step 1005—NO), the platform may perform one or more Steps of the method 900 of FIG. 9. Alternatively, based on determining that the dog is in a senior life stage (Step 1005—YES), the platform may determine whether the dog is a purebred (Step 1006).

Based on determining that the dog is a purebred (Step 1006—YES), the platform may determine whether there is a breed-specific senior formula in a master product list (Step 1007). Based on determining that there is a breed-specific senior formula in a master product list (Step 1007—YES), the platform may recommend the breed-specific senior formula (Step 1008).

Alternatively, based on determining that the dog is not a purebred (Step 1006—NO) or determining that there is not a breed-specific senior formula in the master product list (Step 1007—NO), the platform may determine whether there are breed-size-specific senior formulas in the master product list (Step 1009). Based on determining that there are breed-size-specific senior formulas in the master product list (Step 1009—YES), the platform may recommend the breed-size-specific senior formulas (Step 1010). Alternatively, based on determining that there are not breed-size-specific senior formulas in the master product list (Step 1009—NO), the platform may recommend all-breed-size senior formulas (Step 1011).

Exemplary Method for Providing Personalized Pet Product Recommendations

Figure 11A:
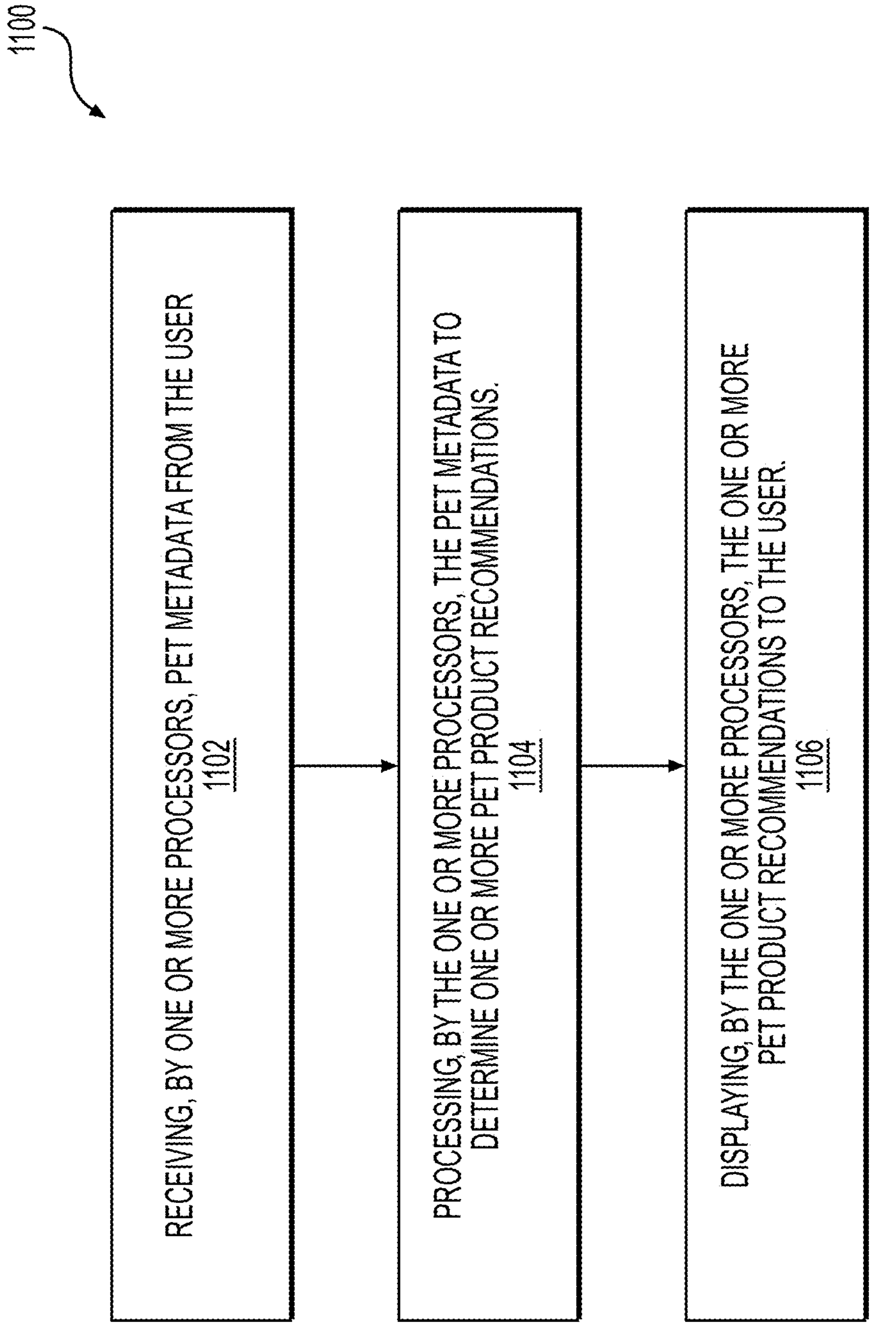
FIG. 11A depicts a flowchart of an exemplary method for providing one or more personalized pet product recommendations based on pet metadata to a user, according to one or more embodiments.

FIG. 11A illustrates an exemplary process 1100 for providing one or more personalized pet product recommendations based on pet metadata to a user, according to one or more embodiments.

The method may include receiving, by one or more processors, pet metadata from a user (Step 1102). The pet metadata may include at least one of: a pet name, a pet age, a pet breed, a pet life stage, a pet body condition, or a pet health condition. The pet breed may indicate one or more breeds that correspond to the pet. Additionally, the pet breed may indicate whether the pet is a purebred or a mixed breed pet. The pet life stage may indicate whether the pet is a puppy, adult, senior pet, and the like. The pet body condition may indicate whether the pet is underweight, overweight, obese, and the like. The pet health condition may indicate whether the pet has any medical conditions, such as diabetes, low blood pressure, and the like.

The method may further include processing, by the one or more processors, the pet metadata to determine one or more pet product recommendations (Step 1104). The processing the pet metadata is based at least in part on a hierarchy of a plurality of factors. The hierarchy of the plurality of factors may include a pet life stage factor, a pet body condition factor, and/or a pet breed factor. The pet life stage factor may correspond to whether the pet is a puppy, an adult, or a senior. The pet body condition factor may correspond to whether the pet is underweight, overweight, or obese. The pet breed factor may correspond to whether the pet is a pure breed or a mixed breed. Such hierarchy of a plurality of factors may be further described in FIGS. 7-10.

In some embodiments, the method may also include correlating, by the one or more processors, the processed pet metadata with a list of pet products that contain a minimum level of fiber, the correlating resulting in a list of the one or more pet product recommendations. For example, a list of pet products may be received from an external system. The method may include filtering such a list of pet products to determine which pet products meet a particular threshold regarding one or more ingredients. The processed pet metadata may then be correlated to the list of pet products to determine at least one pet product recommendation.

The method may further include displaying, by the one or more processors, the one or more pet product recommendations to the user (Step 1106). An example embodiment of displaying the one or more pet product recommendations may be found in FIGS. 6A-6C. The one or more pet product recommendations may include a link to facilitate a purchase of one or more pet products corresponding to the one or more pet product recommendations. Such link may be to an external service.

Although FIG. 11A shows example blocks of exemplary method 1100, in some implementations, the exemplary method 1100 may include additional blocks, fewer blocks, different blocks, or differently arranged blocks than those depicted in FIG. 11A. Additionally, or alternatively, two or more of the blocks of the exemplary method 1100 may be performed in parallel.

Figure 11B:
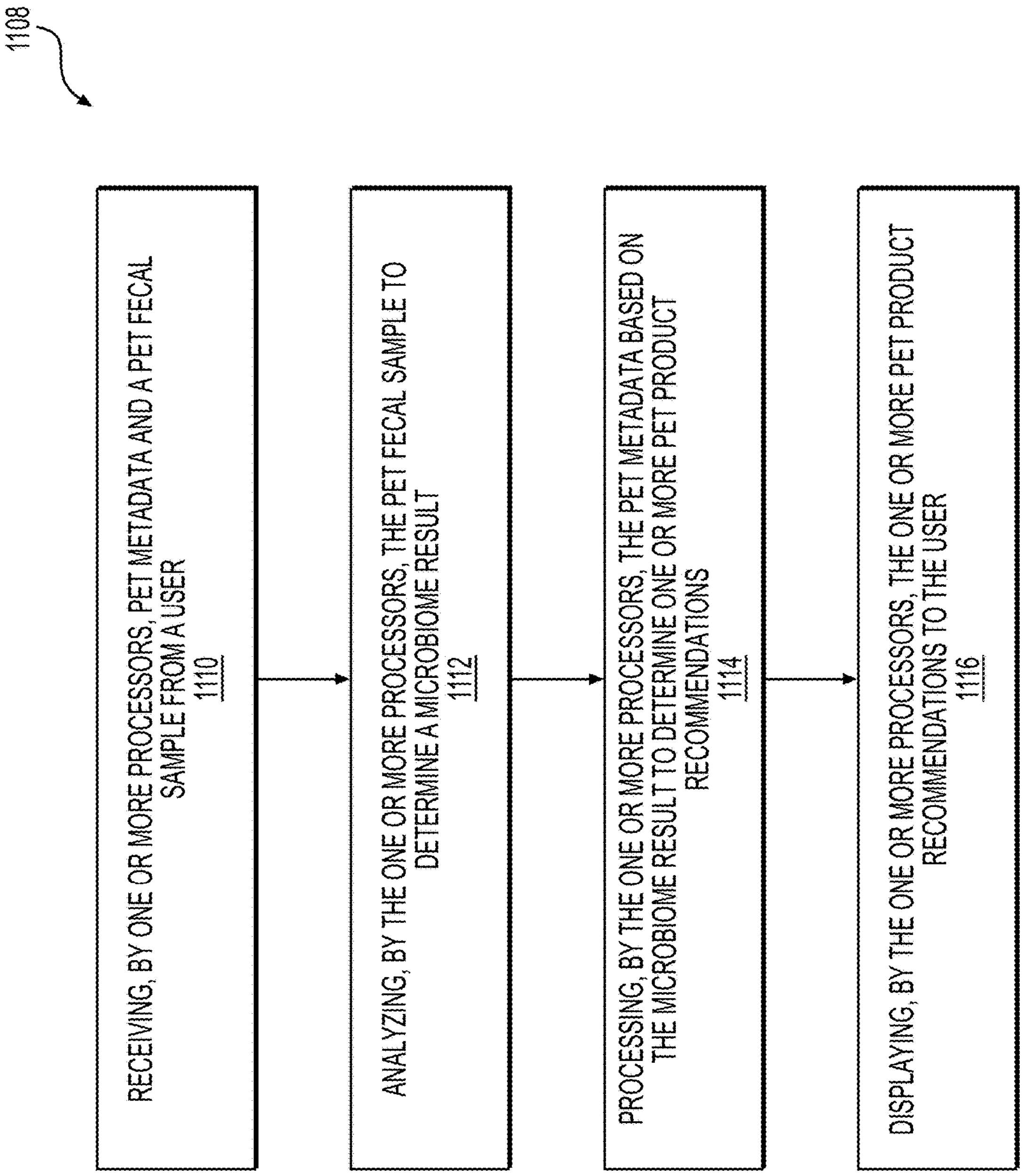
FIG. 11B depicts a flowchart of an exemplary method for providing one or more personalized pet product recommendations based on a microbiome result and pet metadata to a user, according to one or more embodiments.

FIG. 11B illustrates an exemplary process 1108 for providing one or more personalized pet product recommendations based on a microbiome result and pet metadata to a user, according to one or more embodiments.

The method may include receiving, by one or more processors, pet metadata and a pet fecal sample from the user (Step 1110). The pet metadata may include at least one of: a pet name, a pet age, a pet breed, a pet life stage, a pet body condition, or a pet health condition. The pet breed may indicate one or more breeds that correspond to the pet. Additionally, the pet breed may indicate whether the pet is a purebred or a mixed breed pet. The pet life stage may indicate whether the pet is a puppy, adult, senior pet, and the like. The pet body condition may indicate whether the pet is underweight, overweight, obese, and the like. The pet health condition may indicate whether the pet has any medical conditions, such as diabetes, low blood pressure, and the like. The pet fecal sample may include an image of the pet fecal sample and/or a physical pet fecal sample. The image of the pet fecal sample may be received from a user's device.

The method may further include analyzing, by the one or more processors, the pet fecal sample to determine a microbiome result (Step 1112). The analyzing may be described in further detail regarding FIG. 5. The microbiome result may include at least one recommendation for a pet product containing prebiotics or prebiotic-like fibers. For example, the at least one recommendation may include pet food that has a minimum amount of fiber and/or prebiotics.

In some embodiments, analyzing the pet fecal sample to determine a microbiome result may include detecting and quantitating bacterial taxa. For example, techniques for detecting and quantitating bacterial taxa may include, for example, polymerase chain reaction (PCR), quantitative PCR, 16S rDNA amplicon sequencing, shotgun sequencing, metagenome sequencing, Illumina sequencing, and nanopore sequencing. The bacterial taxa may be determined by sequencing the 16s rDNA sequence. Other methods may include shotgun sequencing to determine characteristic non-16SrDNA gene sequences or other metabolites and biomarkers for identification of the species.

In some embodiments, the bacterial taxa may be determined by sequencing the V4-V6 region, for example using Illumina sequencing. These methods may use the primers 319F: CAAGCAGAAGACGGCATACGAGATGTGACTGGAGTTCAGACGTGTGCTCTTCCGA TCT (SEQ ID NO: 1) and 806R: AATGATACGGCGACCACCGAGATCTACACTCTTTCCCTACACG ACGCTCTTCCGATCT (SEQ ID NO: 2).

The bacterial species may also be detected by other methods such as, for example, RNA sequencing, protein sequence homology or other biological marker indicative of the bacterial species.

Additionally, in some embodiments, the sequencing data can then be used to determine the presence or absence of different bacterial taxa in the sample. For example, the sequences may be clustered at about 98%, about 99% or 100% identity and abundant taxa (e.g., those representing more than 0.001 of the total sequences) may then be assessed for their relative proportions. Suitable techniques may include, for example, logistic regression, partial least squares discriminate analysis (PLSDA) or random forest analysis and other multivariate methods.

In some embodiments, if the pet fecal sample includes an image of the pet fecal sample, the analyzing may include comparing the pet fecal sample to stool chart pictures, in order to indicate whether there is good bowel performance. In some embodiments, if the pet fecal sample includes a physical pet fecal sample, the analyzing may include specifics about the bacteria included in the gut and/or feces of the pet.

The method may also include determining, by the one or more processors, whether the microbiome result recommends a pet product containing prebiotics or prebiotic-like fibers. For example, in some embodiments, the microbiome result may indicate that a pet product recommendation is not needed. This may be the case where the result has not met a particular threshold, or alternatively, where the result has surpassed a particular threshold. Additionally, in response to determining that the microbiome result recommends the pet product containing prebiotics or prebiotic-like fibers, determining, by the one or more processors, that a pet product recommendation is needed.

The method may further include processing, by the one or more processors, the pet metadata based on the microbiome result to determine one or more pet product recommendations (Step 1114). The processing the pet metadata is based at least in part on a hierarchy of a plurality of factors. The hierarchy of the plurality of factors may include a pet life stage factor, a pet body condition factor, and/or a pet breed factor. The pet life stage factor may correspond to whether the pet is a puppy, an adult, or a senior. The pet body condition factor may correspond to whether the pet is underweight, overweight, or obese. The pet breed factor may correspond to whether the pet is a pure breed or a mixed breed. Such hierarchy of a plurality of factors may be further described in FIGS. 7-10.

Additionally, the method may include correlating, by the one or more processors, the processed pet metadata with a list of pet products that contain a minimum level of fiber, the correlating resulting in a list of the one or more pet product recommendations. For example, a list of pet products may be received from an external system. The method may include filtering such a list of pet products to determine which pet products meet a particular threshold regarding one or more ingredients. The processed pet metadata may then be correlated to the list of pet products to determine at least one pet product recommendation.

The method may further include displaying, by the one or more processors, the one or more pet product recommendations to the user (Step 1116). An example embodiment of displaying the one or more pet product recommendations may be found in FIGS. 6A-6C. The one or more pet product recommendations may include a link to facilitate a purchase of one or more pet products corresponding to the one or more pet product recommendations. Such link may be to an external service.

Although FIG. 11B shows example blocks of exemplary method 1108, in some implementations, the exemplary method 1108 may include additional blocks, fewer blocks, different blocks, or differently arranged blocks than those depicted in FIG. 11B. Additionally, or alternatively, two or more of the blocks of the exemplary method 1108 may be performed in parallel.

Exemplary Environment and Exemplary Device

Figure 12:
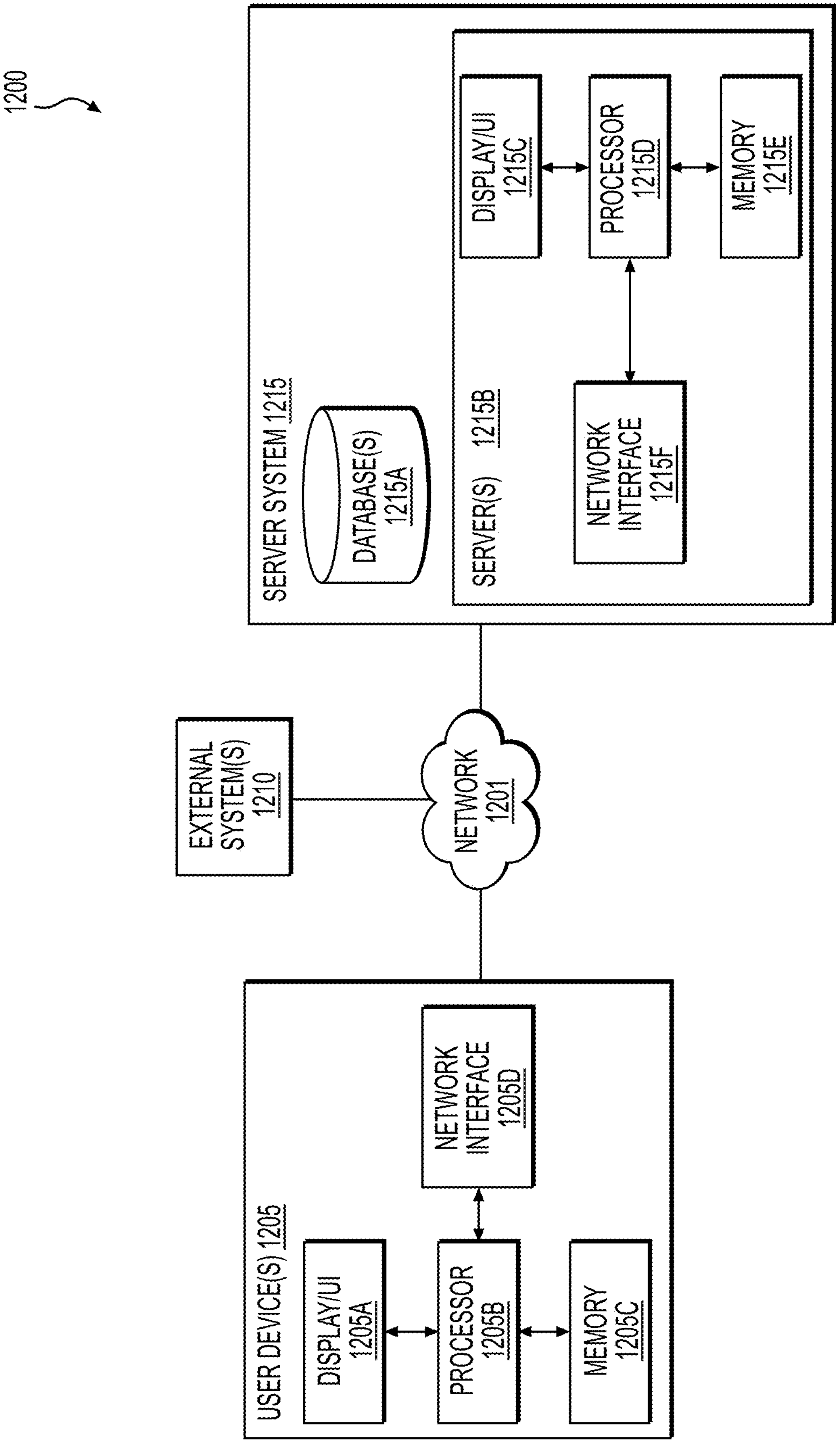
FIG. 12 depicts an exemplary environment that may be utilized with techniques presented herein, according to one or more embodiments.

FIG. 12 depicts an exemplary environment 1200 that may be utilized with techniques presented herein. One or more user device(s) 1205, one or more external system(s) 1210, and one or more server system(s) 1215 may communicate across a network 1201. As will be discussed in further detail below, one or more server system(s) 1215 may communicate with one or more of the other components of the environment 1200 across network 1201. The one or more user device(s) 1205 may be associated with a user.

In some embodiments, the components of the environment 1200 are associated with a common entity, e.g., a veterinarian, clinic, animal specialist, research center, or the like. In some embodiments, one or more of the components of the environment is associated with a different entity than another. The systems and devices of the environment 1200 may communicate in any arrangement.

The user device 1205 may be configured to enable the user to access and/or interact with other systems in the environment 1200. For example, the user device 1205 may be a computer system such as, for example, a desktop computer, a mobile device, a tablet, etc. In some embodiments, the user device 1205 may include one or more electronic application(s), e.g., a program, plugin, browser extension, etc., installed on a memory of the user device 1205.

The user device 1205 may include a display/user interface (UI) 1205A, a processor 1205B, a memory 1205C, and/or a network interface 1205D. The user device 1205 may execute, by the processor 1205B, an operating system (O/S) and at least one electronic application (each stored in memory 1205C). The electronic application may be a desktop program, a browser program, a web client, or a mobile application program (which may also be a browser program in a mobile O/S), an applicant specific program, system control software, system monitoring software, software development tools, or the like. For example, environment 1200 may extend information on a web client that may be accessed through a web browser. In some embodiments, the electronic application(s) may be associated with one or more of the other components in the environment 1200. The application may manage the memory 1205C, such as a database, to transmit streaming data to network 1201. The display/UI 1205A may be a touch screen or a display with other input systems (e.g., mouse, keyboard, etc.) so that the user(s) may interact with the application and/or the O/S. The network interface 1205D may be a TCP/IP network interface for, e.g., Ethernet or wireless communications with the network 1201. The processor 1205B, while executing the application, may generate data and/or receive user inputs from the display/UI 1205A and/or receive/transmit messages to the server system 1215, and may further perform one or more operations prior to providing an output to the network 1201.

External systems 1210 may be, for example, one or more third party and/or auxiliary systems that integrate and/or communicate with the server system 1215 in performing various product recommendation and/or gut microbiome testing tasks. External systems 1210 may be in communication with other device(s) or system(s) in the environment 1200 over the one or more networks 1201. For example, external systems 1210 may communicate with the server system 1215 via API (application programming interface) access over the one or more networks 1201, and also communicate with the user device(s) 1205 via web browser access over the one or more networks 1201.

In various embodiments, the network 1201 may be a wide area network ("WAN"), a local area network ("LAN"), a personal area network ("PAN"), or the like. In some embodiments, network 1201 includes the Internet, and information and data provided between various systems occurs online.

"Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The server system 1215 may include an electronic data system, e.g., a computer-readable memory such as a hard drive, flash drive, disk, etc. In some embodiments, the server system 1215 includes and/or interacts with an application programming interface for exchanging data to other systems, e.g., one or more of the other components of the environment.

The server system 1215 may include a database 1215A and at least one server 1215B. The server system 1215 may be a computer, system of computers (e.g., rack server(s)), and/or or a cloud service computer system. The server system may store or have access to database 1215A (e.g., hosted on a third party server or in memory 1215E). The server(s) may include a display/UI 1215C, a processor 1215D, a memory 1215E, and/or a network interface 1215F. The display/UI 1215C may be a touch screen or a display with other input systems (e.g., mouse, keyboard, etc.) for an operator of the server 1215B to control the functions of the server 1215B. The server system 1215 may execute, by the processor 1215D, an operating system (O/S) and at least one instance of a servlet program (each stored in memory 1215E).

Although depicted as separate components in FIG. 12, it should be understood that a component or portion of a component in the environment 1200 may, in some embodiments, be integrated with or incorporated into one or more other components. For example, a portion of the display 1215C may be integrated into the user device 1205 or the like. In some embodiments, operations or aspects of one or more of the components discussed above may be distributed amongst one or more other components. Any suitable arrangement and/or integration of the various systems and devices of the environment 1200 may be used.

In the previous and following methods, various acts may be described as performed or executed by a component from FIG. 12, such as the server system 1215, the user device 1205, or components thereof. However, it should be understood that in various embodiments, various components of the environment 1200 discussed above may execute instructions or perform acts including the acts discussed above. An act performed by a device may be considered to be performed by a processor, actuator, or the like associated with that device. Further, it should be understood that in various embodiments, various steps may be added, omitted, and/or rearranged in any suitable manner.

In general, any process or operation discussed in this disclosure that is understood to be computer-implementable, such as the processes illustrated in FIGS. 1-11B, may be performed by one or more processors of a computer system, such any of the systems or devices in the environment 1200 of FIG. 12, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 12. One or more processors of a computer system may be included in a single computing device or distributed among a plurality of computing devices. A memory of the computer system may include the respective memory of each computing device of the plurality of computing devices.

Figure 13:
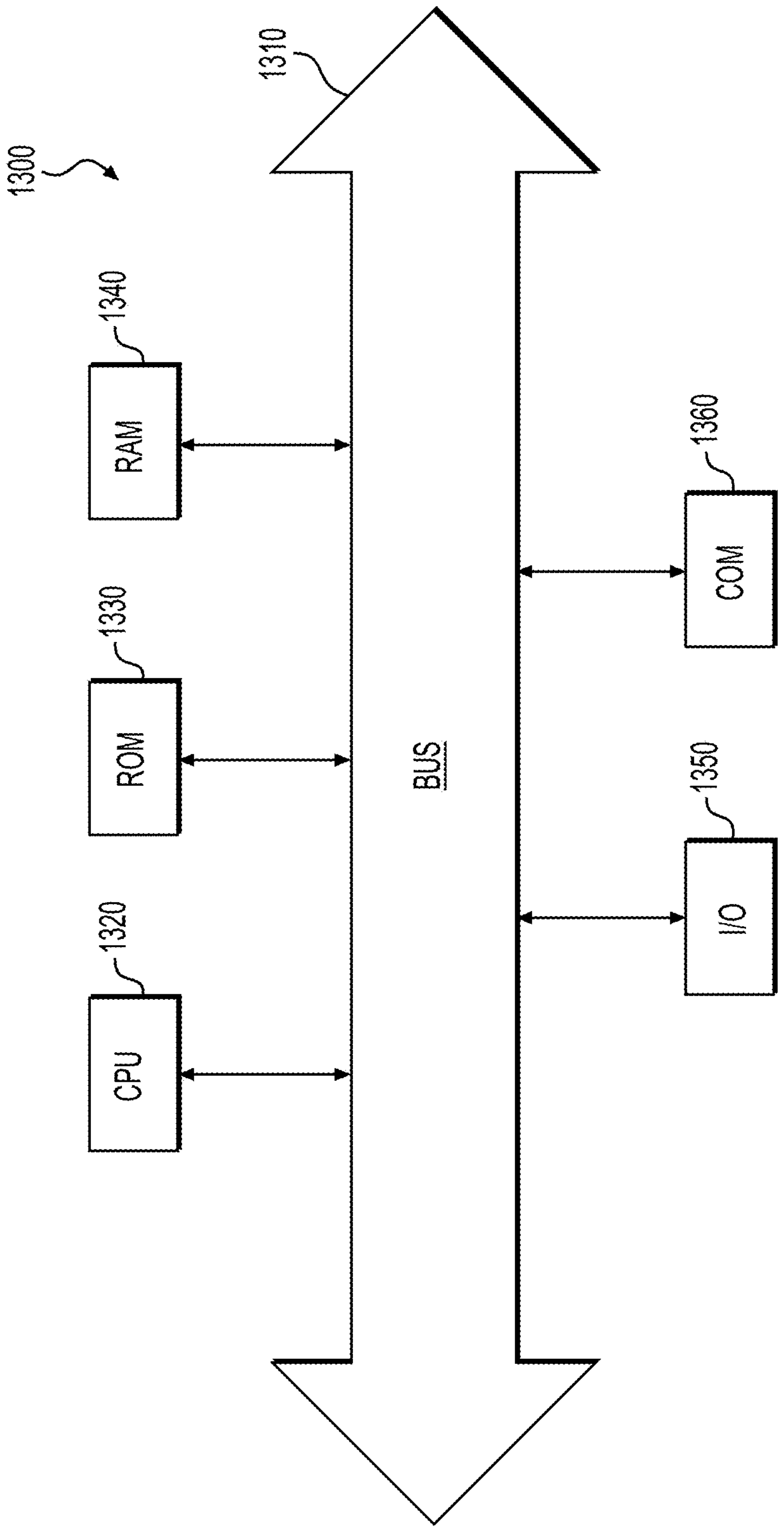
FIG. 13 depicts an example of a computing device that may execute the techniques described herein, according to one or more embodiments.

FIG. 13 is a simplified functional block diagram of a computer 1300 that may be configured as a device for executing the environments and/or the methods of FIGS. 1-11B, according to exemplary embodiments of the present disclosure. For example, device 1300 may include a central processing unit (CPU) 1320. CPU 1320 may be any type of processor device including, for example, any type of special purpose or a general-purpose microprocessor device. As will be appreciated by persons skilled in the relevant art, CPU 1320 also may be a single processor in a multi-core/multiprocessor system, such system operating alone, or in a cluster of computing devices operating in a cluster or server farm. CPU 1320 may be connected to a data communication infrastructure 1310, for example, a bus, message queue, network, or multi-core message-passing scheme.

Device 1300 also may include a main memory 1340, for example, random access memory (RAM), and also may include a secondary memory 1330. Secondary memory 1330, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1330 may include other similar means for allowing computer programs or other instructions to be loaded into device 1300. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1300.

Device 1300 also may include a communications interface ("COM") 1360. Communications interface 1360 allows software and data to be transferred between device 1300 and external devices. Communications interface 1360 may include a modem, a network interface (such as an Ethernet card), a communications port, a PCMCIA slot and card, or the like. Software and data transferred via communications interface 1360 may be in the form of signals, which may be electronic, electromagnetic, optical, or other signals capable of being received by communications interface 1360. These signals may be provided to communications interface 1360 via a communications path of device 1300, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1300 also may include input and output ports 1350 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the general description and the detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

As used herein, a term such as "user" or the like generally encompasses a pet parent and/or pet parents. A term such as "pet" or the like generally encompasses a user's pet, where the term may encompass multiple pets. Also, the term "pet" refers to any type of animal, including domesticated animals. A term such as "provider" or the like generally encompasses a pet care business It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method including:
receiving, by one or more processors and from a device of a user, pet metadata for a pet;
receiving, by the one or more processors, a fecal result associated with a fecal sample for the pet;
determining, by the one or more processors, the fecal result satisfies a threshold indicative of a condition associated with a health of a gastrointestinal tract of the pet;
in response to determining the fecal result satisfies the threshold, automatically processing, by the one or more processors, the pet metadata based on the fecal result to determine one or more pet products to support the condition; and
providing, by the one or more processors to the device for display, the one or more pet products.

2. The computer-implemented method of claim 1, wherein the pet metadata includes at least one of: a pet name, a pet age, a pet breed, a pet life stage, a pet body condition, or a pet health condition.

3. The computer-implemented method of claim 1, wherein the processing the pet metadata is based at least in part on a hierarchy of a plurality of factors, and wherein the hierarchy defines an order in which the plurality of factors are evaluated among one another to determine the one or more pet products.

4. The computer-implemented method of claim 3, wherein the hierarchy of the plurality of factors includes a pet life stage factor, a pet body condition factor, and a pet breed factor.

5. The computer-implemented method of claim 1, the method further comprising:
correlating, by the one or more processors, the processed pet metadata with a list of a plurality of pet products, including the one or more pet products, that contain a minimum level of fiber.

6. The computer-implemented method of claim 1, wherein one or more links are provided to the device for display in association with the one or more pet products to facilitate a purchase of one or more pet products.

7. The computer-implemented method of claim 1, wherein receiving the fecal result further comprises:
receiving, by the one or more processors, a microbiome result associated with a physical pet fecal sample.

8. The computer-implemented method of claim 7, wherein, based on the microbiome result, the one or more pet products include prebiotics or prebiotic-like fibers.

9. The computer-implemented method of claim 7, further comprising:
determining, by the one or more processors, a diet containing prebiotics or prebiotic-like fibers is recommended based on the microbiome result; and
in response to the determination, determining, by the one or more processors, the one or more pet products based on the processing of the pet metadata.

10. The computer-implemented method of claim 1, wherein the fecal sample for the pet is an image of the fecal sample, and receiving the fecal result comprises:
processing, by the one or more processors, the image of the fecal sample to determine the fecal result.

11. A computer system comprising:
at least one memory storing instructions; and
at least one processor configured to execute the instructions to perform operations comprising:
receiving, from a device of a user, pet metadata for a pet;
receiving a fecal result associated with a fecal sample for the pet;
determining the fecal result satisfies a threshold indicative of a condition associated with a health of a gastrointestinal tract of the pet;
in response to determining the fecal result satisfies the threshold, automatically processing the pet metadata based on the fecal result to determine one or more pet products to support the condition; and
providing, to the device for display, the one or more pet products.

12. The computer system of claim 11, wherein the pet metadata includes at least one of: a pet name, a pet age, a pet breed, a pet life stage, a pet body condition, or a pet health condition.

13. The computer system of claim 11, the operations further comprising:
correlating the processed pet metadata with a list of a plurality of pet products, including the one or more pet products, that contain a minimum level of fiber.

14. The computer system of claim 11, wherein the processing the pet metadata is based at least in part on a hierarchy of a plurality of factors, and wherein the hierarchy defines an order in which the plurality of factors are evaluated to determine the one or more pet products.

15. The computer system of claim 14, wherein the hierarchy of the plurality of factors includes a pet life stage factor, a pet body condition factor, and a pet breed factor.

16. The computer system of claim 11, wherein one or more links are provided to the device for display in association with the one or more pet products to facilitate a purchase of one or more pet products.

17. A non-transitory computer-readable medium containing instructions that, when executed by a processor, cause the processor to perform operations, the operations comprising:
receiving, from a device of a user, pet metadata for a pet;
receiving a fecal result associated with a fecal sample for the pet;
determining the fecal result satisfies a threshold indicative of a condition associated with a health of a gastrointestinal tract of the pet;
in response to determining the fecal result satisfies the threshold, automatically processing the pet metadata based on the fecal result to determine one or more pet products to support the condition; and
providing, to the device for display, the one or more pet products.

18. The non-transitory computer-readable medium of claim 17, wherein one or more links are provided to the device for display in association with the one or more pet products to facilitate a purchase of one or more pet products.

19. The non-transitory computer-readable medium of claim 17, the operations further comprising:
correlating the processed pet metadata with a list of a plurality of pet products, including the one or more pet products, that contain a minimum level of fiber.

20. The non-transitory computer-readable medium of claim 19, wherein the pet metadata includes at least one of:

a pet name, a pet age, a pet breed, a pet life stage, a pet body condition, or a pet health condition.

* * * * *